US 10,240,831 B2

(12) United States Patent
Ito et al.

(10) Patent No.: US 10,240,831 B2
(45) Date of Patent: Mar. 26, 2019

(54) EXPANSION VALVE

(71) Applicant: DENSO CORPORATION, Kariya, Aichi-pref. (JP)

(72) Inventors: Shigeki Ito, Kariya (JP); Ryu Fukushima, Kariya (JP); Hiromi Ohta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 215 days.

(21) Appl. No.: 14/917,407

(22) PCT Filed: Sep. 2, 2014

(86) PCT No.: PCT/JP2014/004490
§ 371 (c)(1),
(2) Date: Mar. 8, 2016

(87) PCT Pub. No.: WO2015/037208
PCT Pub. Date: Mar. 19, 2015

(65) Prior Publication Data
US 2016/0223232 A1    Aug. 4, 2016

(30) Foreign Application Priority Data

Sep. 11, 2013 (JP) .................. 2013-188183
Sep. 11, 2013 (JP) .................. 2013-188184

(51) Int. Cl.
*F25B 41/06* (2006.01)
*F16K 31/00* (2006.01)
*G05D 23/185* (2006.01)

(52) U.S. Cl.
CPC .......... *F25B 41/062* (2013.01); *F16K 31/002* (2013.01); *G05D 23/1852* (2013.01)

(58) Field of Classification Search
CPC ............ F25B 41/062; F25B 2341/0683; F25B 2500/01; F16K 31/002
See application file for complete search history.

(56) References Cited

U.S. PATENT DOCUMENTS 3,388,864 A * 6/1968 Noakes ................. F25B 41/062
137/454.2
3,937,358 A * 2/1976 Smith ................ B60K 15/0406
220/203.18

(Continued)

FOREIGN PATENT DOCUMENTS

JP      S57208375 A    12/1982
JP      S62019575 U    2/1987

(Continued)

OTHER PUBLICATIONS

Nishida, Pressure Control Valve, Apr. 17, 2008, JP2008089220A, Whole Document.*

(Continued)

*Primary Examiner* — Larry Furdge
(74) *Attorney, Agent, or Firm* — Harness, Dickey & Pierce, P.L.C.

(57) ABSTRACT

A power element has a closed space provided between a first diaphragm and a second diaphragm. An interposing member is interposed between the first diaphragm and the second diaphragm. Accordingly, a size of the closed space can be optionally determined in accordance with a shape such as a thickness of the interposing member. Therefore, limitations on the size of the closed space due to a shape of the first diaphragm and the second diaphragm can be reduced. Accordingly, limitations on the size of a fluid enclosing space due to a shape of a diagram can be reduced.

13 Claims, 47 Drawing Sheets

(56) References Cited

U.S. PATENT DOCUMENTS

| | | | | |
|---|---|---|---|---|
| 4,632,305 A | * | 12/1986 | Fujiwara | F25B 41/062 236/92 B |
| 2006/0198740 A1 | | 9/2006 | Yamamoto et al. | |
| 2008/0110506 A1 | * | 5/2008 | Igarashi | F16K 31/1268 137/488 |
| 2010/0163637 A1 | | 7/2010 | Ikegami et al. | |

FOREIGN PATENT DOCUMENTS

| | | | |
|---|---|---|---|
| JP | H03038600 Y2 | | 8/1991 |
| JP | H04070968 U | | 6/1992 |
| JP | H08004992 A | | 1/1996 |
| JP | H08028785 A | | 2/1996 |
| JP | 2000193347 A | * | 7/2000 |
| JP | 2002310539 A | | 10/2002 |
| JP | 2004028491 A | | 1/2004 |
| JP | 2006242007 A | | 9/2006 |
| JP | 2008089220 A | * | 4/2008 |
| JP | 2009097808 A | | 5/2009 |
| JP | 2010230249 A | | 10/2010 |
| JP | 2012107641 A | | 6/2012 |
| JP | 2012174256 A | | 9/2012 |
| JP | 2013029241 A | | 2/2013 |
| WO | WO-2011122435 A1 | | 10/2011 |
| WO | WO-2015037207 A1 | | 3/2015 |

OTHER PUBLICATIONS

Tomatsu et al., Pressure Control Valve, Jul. 14, 2000, JP2000193347A, Whole Document.*

International Search Report and Written Opinion (in Japanese with English Translation) for PCT/JP2014/004490, dated Nov. 25, 2014; ISA/JP.

* cited by examiner

EXPANSION VALVE

CROSS-REFERENCE TO RELATED APPLICATIONS

This application is a U.S. National Phase Application under 35 U.S.C. 371 of International Application No. PCT/JP2014/004490 filed on Sept. 2, 2014 and published in Japanese as WO 2015/037208 A1 on Mar. 19, 2015. This application is based on and claims the benefit of priority from Japanese Patent Applications No. 2013-188183 filed on Sep. 11, 2013 and No. 2013-188184 filed on Sep. 11, 2013. The entire disclosures of all of the above applications are incorporated herein by reference.

TECHNICAL FIELD

This disclosure relates to an expansion valve which decompresses a fluid.

BACKGROUND ART

PTL 1 discloses an expansion valve having a power element on which two diaphragms are stacked and peripheral edges thereof are joined to each other over the entire circumference. A fluid enclosing space having an enclosed fluid is sealed between the two diaphragms in the power element disclosed in PTL 1. If a temperature of the enclosed fluid rises, the two diaphragms are deformed so as to respectively expand, and a flow rate of a fluid to be decompressed by the expansion valve is controlled according to a deformation amount thereof.

The expansion valve disclosed in PTL 1 includes the two diaphragms. Accordingly, compared to an expansion valve including one diaphragm, it is possible to decrease the deformation amount per one diaphragm in order to obtain a predetermined deformation amount of the power element which corresponds to a temperature change in the enclosed fluid.

PTL 2 discloses an expansion valve including a first channel which has a decompressing channel for decompressing a flowing fluid and in which the flowing fluid flows, an expansion unit which has an enclosed fluid and which expands in a uniaxial center direction as the temperature of the enclosed fluid rises, and a flow rate control unit which controls a flow rate of the flowing fluid in the first channel in accordance with an expansion amount of the expansion unit. In addition to the above-described first channel, the expansion valve disclosed in PTL 2 includes a low pressure channel serving as a second channel in which the flowing fluid flows after being decompressed in the first channel. A power element which is the expansion unit is disposed so as to sense a temperature and a pressure of the flowing fluid which flows in the low pressure channel. A fluid having multiple refrigerants mixed therewith is enclosed as the enclosed fluid in the power element.

PRIOR ART LITERATURE

Patent Literature

PTL 1: JPH03-38600 Y
PTL 2: JP 2002-310539 A

SUMMARY OF THE INVENTION

According to PTL 1, the fluid enclosing space is provided by the peripheral edges of the two diaphragms being joined to each other over the entire circumference. Consequently, a capacity of the fluid enclosing space depends on a shape of the two diaphragms, thereby imposing limitations on the size of the fluid enclosing space.

According to the expansion valve disclosed in PTL 2, multiple types of refrigerants are enclosed in the power element. Therefore, a control characteristic of the expansion valve which cannot be obtained by only one enclosed refrigerant, that is, a flow rate control characteristic of the flow rate control unit can be obtained.

However, according to the flow rate control characteristic of the flow rate control unit, which is obtained by the expansion valve disclosed in PTL 2, for example, during a process when a refrigerant temperature rises, the flow rate control characteristic is dominantly shown in an individual refrigerant which is most likely to evaporate among the multiple types of refrigerants enclosed in the power element. In addition, according to the flow rate control characteristic of the flow rate control unit, after the refrigerant which is most likely to evaporate is completely vaporized, the flow rate control characteristic is shown in an individual refrigerant which is the next most likely to evaporate. For this reason, all of the flow rate control characteristics of the flow rate control unit are obtained by joining the respective flow rate control characteristics of the individual refrigerants together.

Therefore, according to the expansion valve disclosed in PTL 2, the flow rate control characteristics of the flow rate control unit are obtained by joining characteristics obtained using the power element which encloses a single refrigerant, that is, a single fluid. Thus, a place where the multiple characteristics are joined together has an inflection point. Consequently, it is difficult to obtain the flow rate control characteristic for the flow rate control unit which is optionally determined. For example, in a case of PTL 2, the flow rate control characteristic of the flow rate control unit is represented by a relationship between the temperature and the pressure inside the low pressure channel which is a boundary to determine whether or not the flow rate control unit causes the flowing fluid to flow in the first channel.

In view of the above-described points, this disclosure aims to provide an expansion valve which can reduce limitations on the size of a fluid enclosing space due to a shape of a diaphragm. Furthermore, this disclosure aims to provide an expansion valve which can easily obtain, as intended, a flow rate control characteristic of a flow rate control unit.

In a first aspect of the present disclosure, an expansion valve including:

an expansion unit that has a first diaphragm and a second diaphragm stacked with the first diaphragm in an axial direction of a uniaxial center, a fluid enclosing space in which an enclosed fluid is sealed being defined between the first diaphragm and the second diaphragm, each of the first diaphragm and the second diaphragm outwardly expanding in the axial direction of the uniaxial center as a pressure inside the fluid enclosing space increases;

a first channel through which a flowing fluid flows, the first channel having a decompressing channel to decompress the flowing fluid; and a flow rate control unit that controls a flow rate of the flowing fluid in the first channel in accordance with deformation of the first diaphragm and the second diaphragm in the axial direction of the uniaxial center, wherein the expansion unit includes an interposing member interposed between the first diaphragm and the second diaphragm, and the interposing member is interposed between the first diaphragm and the second diaphragm to define the fluid enclosing space.

According to the first aspect, the interposing member is interposed between the first diaphragm and the second diaphragm, thereby providing the fluid enclosing space between the first diaphragm and the second diaphragm. Accordingly, a size of the fluid enclosing space can be optionally determined in accordance with a shape such as a thickness of the interposing member. Therefore, limitations on the size of the fluid enclosing space due to the shape of the first diaphragm and the second diaphragm can be reduced.

In a second aspect of the present disclosure, an expansion valve including:

a first channel that has a decompressing channel to decompress a flowing fluid, the flowing fluid flowing through the first channel;

a first expansion unit in which a first fluid is sealed, the first expansion unit expanding in an axial direction of a uniaxial center as a temperature of the first fluid rises;

a second expansion unit that is stacked with the first expansion unit in the axial direction of the uniaxial center and that expands in the axial direction of the uniaxial center as a temperature of the second fluid rises, a second fluid different from the first fluid being sealed in the second expansion unit; and a flow rate control unit that controls a flow rate of the flowing fluid in the first channel in accordance with the expansion of both the first expansion unit and the second expansion unit in the axial direction of the uniaxial center.

According to the second aspect, the first expansion unit has the first fluid sealed therein, and the second expansion unit has the second fluid sealed therein which is different from the first fluid. The flow rate control unit controls the flow rate of the flowing fluid in the first channel in accordance with the expansion of both the first expansion unit and the second expansion unit in the axial direction of the uniaxial center. Therefore, the flow rate control characteristic of the flow rate control unit has, as a whole, an intermediate value between a flow rate control characteristic of only the first expansion unit and a flow rate control characteristic of only the second expansion unit. Accordingly, compared to the expansion valve disclosed in PTL 1, the flow rate control characteristics of the flow rate control unit can be more easily obtained as intended.

EMBODIMENTS FOR CARRYING OUT INVENTION

Figure 1:
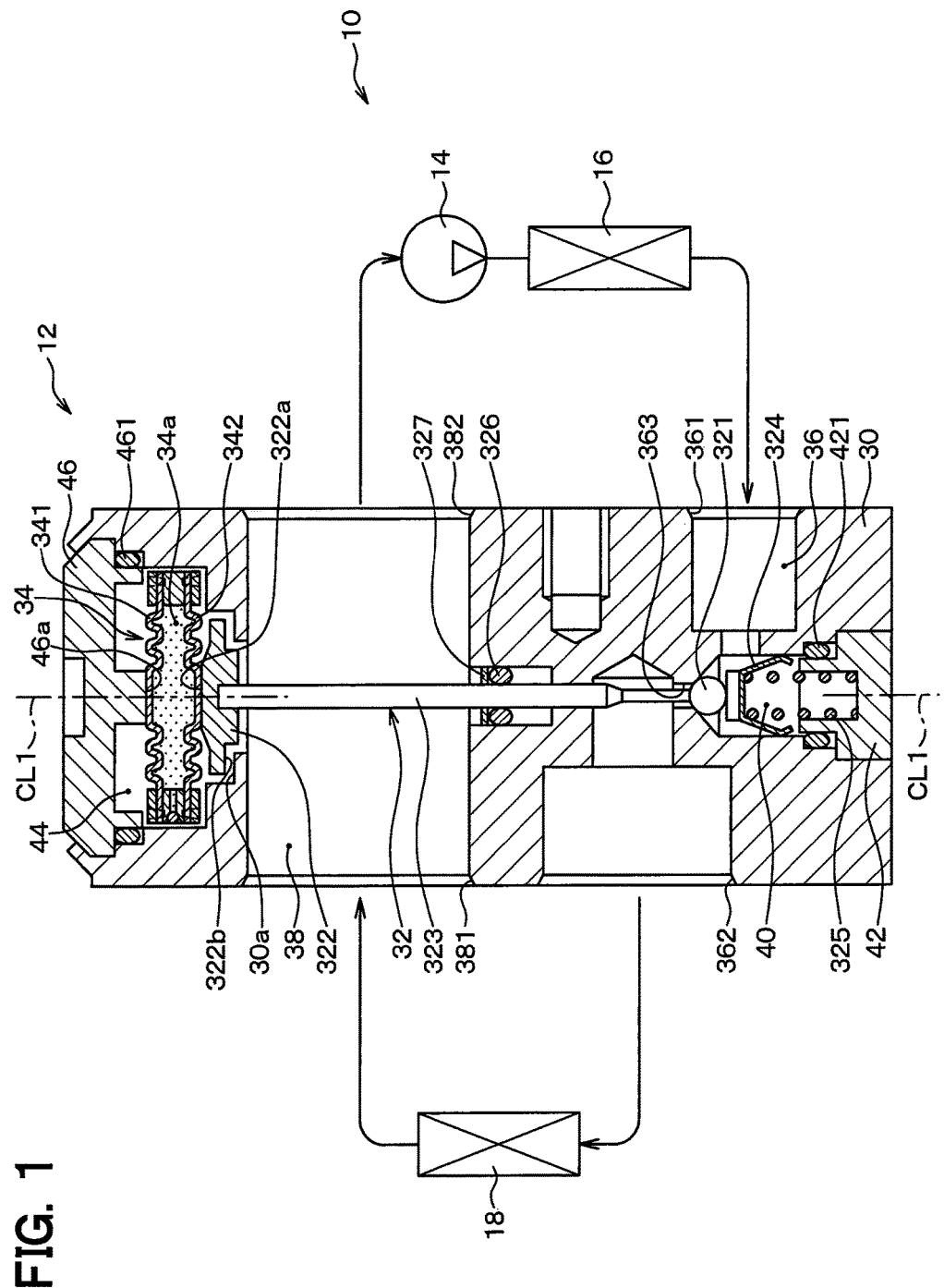
FIG. 1 is a cross-sectional view of a temperature type expansion valve 12 according to a first embodiment.

Hereinafter, embodiments according to this disclosure will be described with reference to the drawings. In some cases, the same reference numerals are given to elements corresponding to points described in previous forms according to each embodiment, and repeated description thereof will be omitted. When only a part of a configuration according to each embodiment is described, the other forms previously described can be applied to the other part of the configuration. The elements whose combinations are specifically and clearly described as possible in each embodiment can be combined with each other. Moreover, if nothing particularly intervenes in the combinations, even though clear description is not made therein, embodiments can be partially combined with each other.

(First Embodiment)

FIG. 1 is a cross-sectional view of a temperature type expansion valve 12 which is an expansion valve according to this disclosure. The temperature type expansion valve 12 configures a part of an in-vehicle vapor compression type refrigeration cycle 10. FIG. 1 also schematically illustrates a connection relationship between the temperature type expansion valve 12 and each configuration device of the vapor compression type refrigeration cycle 10.

The vapor compression type refrigeration cycle 10 employs a fluorocarbon refrigerant (for example, R134a) as a refrigerant. The vapor compression type refrigeration cycle 10 configures a subcritical cycle in which a high pressure-side refrigerant pressure does not exceed a critical pressure of the refrigerant. First, in the vapor compression type refrigeration cycle 10 illustrated in FIG. 1, a compressor 14 sucks and compresses the refrigerant by obtaining a driving force from a vehicle traveling engine (not illustrated) via an electromagnetic clutch.

A condenser 16 is a radiation heat exchanger in which a high-pressure refrigerant is subjected to heat radiation and condensed by performing heat exchange between the high-pressure refrigerant discharged from the compressor 14 and air outside a vehicle which is outside air blown by a cooling fan (not illustrated). For example, an outlet side of the condenser 16 is connected to the temperature type expansion valve 12 via a receiver (not illustrated) which separates gas and liquid.

The temperature type expansion valve 12 decompresses and expands the high-pressure refrigerant which has flowed out from the condenser 16. Based on a temperature and a pressure of an evaporator outflow refrigerant which has flowed out from an evaporator 18, the temperature type expansion valve 12 changes a throttle passage area so that a degree of superheat of the evaporator outflow refrigerant is close to a predetermined value, and controls a refrigerant flow rate which is caused to flow to an inlet side of the evaporator 18. A detailed configuration of the temperature type expansion valve 12 will be described later.

The evaporator 18 is a heat-absorbing heat exchanger in which a heat absorbing effect is achieved by evaporating a low-pressure refrigerant through heat exchange between the low-pressure refrigerant decompressed and expanded in the temperature type expansion valve 12 and air blown by a blower fan (not illustrated). Furthermore, an outlet side of the evaporator 18 is connected to an intake side of the compressor 14 via a second refrigerant passage 38 provided inside the temperature type expansion valve 12.

Next, a detailed configuration of the temperature type expansion valve 12 will be described. As illustrated in FIG. 1, the temperature type expansion valve 12 is configured to have a body unit 30, a valve mechanism 32, and a power element 34.

The body unit 30 configures an outer shell of the temperature type expansion valve 12 and a refrigerant passage inside the temperature type expansion valve 12. For example, the body unit 30 is provided by performing drilling work on a cylindrical or prismatic metal block made of an aluminum alloy. The body unit 30 is a housing which forms an outer shape of the temperature type expansion valve 12. A first refrigerant passage 36, the second refrigerant passage 38, and a valve chamber 40 are provided in the body unit 30.

The first refrigerant passage 36 is a first channel through which a refrigerant serving as a flowing fluid flows, and is a channel disposed in order to decompress the refrigerant. The first refrigerant passage 36 has a first inlet port 361 in one end thereof, and has a first outlet port 362 in the other end. The first inlet port 361 is connected to the outlet side of the condenser 16, and the first outlet port 362 is connected to the inlet side of the evaporator 18.

The second refrigerant passage 38 is a channel through which the refrigerant flows, and is a second channel which is separate from the first refrigerant passage 36. The second refrigerant passage 38 has a second outlet port 382 in one end thereof, and has a second inlet port 381 in the other end. The second inlet port 381 is connected to the outlet side of the evaporator 18, and the second outlet port 382 is connected to the intake side of the compressor 14.

The valve chamber 40 is a space which is disposed in an intermediate portion of the first refrigerant passage 36 and internally accommodates a spherical valve 321 of the valve mechanism 32 (to be described later). Specifically, the valve chamber 40 directly communicates with the first inlet port 361, and communicates with the first outlet port 362 via a throttle passage 363. The throttle passage 363 configures a portion of the first refrigerant passage 36, and is a decompressing channel which decompresses the refrigerant by throttling a refrigerant flow. That is, the throttle passage 363 is a passage in which the refrigerant flowing from the first inlet port 361 to the valve chamber 40 is guided from the valve chamber 40 side to the first outlet port 362 side while the refrigerant is decompressed and expanded.

The valve mechanism 32 includes the spherical valve 321, a stopper 322, an actuating bar 323, a vibration-isolating spring 324, and a coil spring 325, and is accommodated inside the body unit 30. The spherical valve 321, the stopper 322, the actuating bar 323, the vibration-isolating spring 324, and the coil spring 325 are arranged on a uniaxial center CL1, and the spherical valve 321 is operated in a direction of the uniaxial center CL1. The valve mechanism 32 corresponds to a flow rate control unit according to this disclosure.

The spherical valve 321 is a valve body which controls a refrigerant passage area of the throttle passage 363 by being displaced in the direction of the uniaxial center CL1, that is, a valve body which controls a valve opening degree. The valve chamber 40 accommodates the vibration-isolating spring 324 and the coil spring 325 together with the spherical valve 321. The vibration-isolating spring 324 restricts unnecessary vibrations of the spherical valve 321 by sliding on the valve chamber 40. The coil spring 325 applies a load for actuating the throttle passage 363 to be close, to the spherical valve 321 via the vibration-isolating spring 324. FIG. 1 illustrates a state where the valve mechanism 32 completely closes the throttle passage 363, that is, a fully closed state of the first refrigerant passage 36.

The expansion valve 12 includes an adjusting screw 42 which is screwed into the body unit 30 so as to press the spherical valve 321 against an end portion of the throttle passage 363 via the coil spring 325. A load of the coil spring 325 for actuating the spherical valve 321 can be adjusted by rotating the adjusting screw 42. An O-ring 421 is disposed between the adjusting screw 42 and the body unit 30. The O-ring 421 prevents the refrigerant from leaking out from the valve chamber 40 to the outside of the expansion valve 12.

The stopper 322 has a disc shape, for example, and is in contact with a second diaphragm 342 of the power element 34 on a pressing surface 322a provided on one side in the direction of the uniaxial center CL1. The stopper 322 presses the second diaphragm 342 in the direction of the uniaxial center CL1, on the pressing surface 322a.

The actuating bar 323 has a cylindrical shape, for example, and is interposed between the stopper 322 and the spherical valve 321. One end of the actuating bar 323 is in contact with the stopper 322. The other end of the actuating bar 323 is inserted into the throttle passage 363, and abuts against the spherical valve 321. The spherical valve 321, the stopper 322, and the actuating bar 323 correspond to an operation member according to this disclosure, and increase or decrease a refrigerant flow rate of the first refrigerant passage 36 by being displaced in the direction of the uniaxial center CL1.

An O-ring 326 into which the actuating bar 323 is inserted is held in the body unit 30 by a retaining ring 327. The O-ring 326 prevents the refrigerant from flowing between the first refrigerant passage 36 and the second refrigerant passage 38 by passing through a gap between the actuating bar 323 and the body unit 30.

The power element 34 is stacked with the stopper 322, and is accommodated together with the stopper 322 inside an accommodating space 44 provided in the body unit 30. In detail, the accommodating space 44 is provided by the body unit 30 and a lid member 46 which is fitted and joined to the body unit 30 by means of caulking. An O-ring 461 is disposed between the lid member 46 and the body unit 30. The O-ring 461 prevents the refrigerant from flowing from the accommodating space 44 to the outside of the expansion valve 12. The power element 34 corresponds to an expansion unit according to this disclosure.

The lid member 46 configures a part of the accommodating space 44, and isolates the power element 34 from an outer space of the expansion valve 12. A contact surface 46a which is in contact with a first diaphragm 341 of the power element 34 in the direction of the uniaxial center CL1 is provided in the lid member 46. The lid member 46 presses the first diaphragm 341 in the direction of the uniaxial center CL1, on the contact surface 46a.

Preferably, the lid member 46 is configured to have a material excellent in heat insulating performance, for example, a resin. The contact surface 46a is a fixed surface which is not movable in the direction of the uniaxial center CL1, since the lid member 46 is joined to the body unit 30 by means of caulking.

The power element 34 is pinched between the contact surface 46a of the lid member 46 and the pressing surface 322a of the stopper 322 in the direction of the uniaxial center CL1. In this manner, the power element 34 is held in the direction of the uniaxial center CL1. The power element 34 is not restrained in the direction of the uniaxial center CL1, that is, in an axial direction of the uniaxial center CL1 by the body unit 30. However, since a clearance is present between the body unit 30 and the power element 34 in a radial direction of the uniaxial center CL1, the movement of the power element 34 is restricted. In other words, the power element 34 is movable in the radial direction inside the accommodating space 44 within a range of the clearance.

Figure 2:
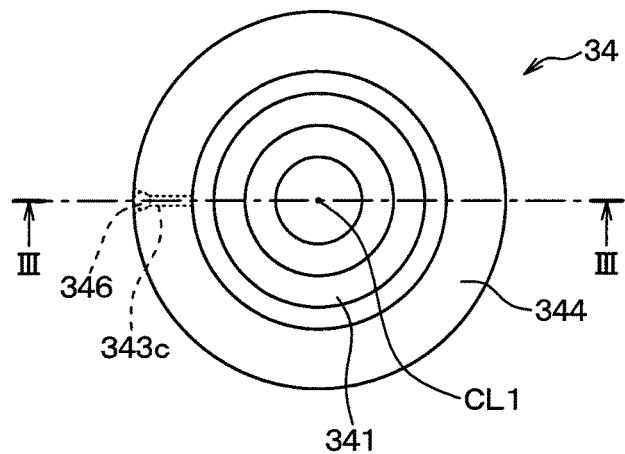
FIG. 2 is a top view of a power element 34 when viewed in a direction of a uniaxial center CL1 in FIG. 1.
Figure 3:
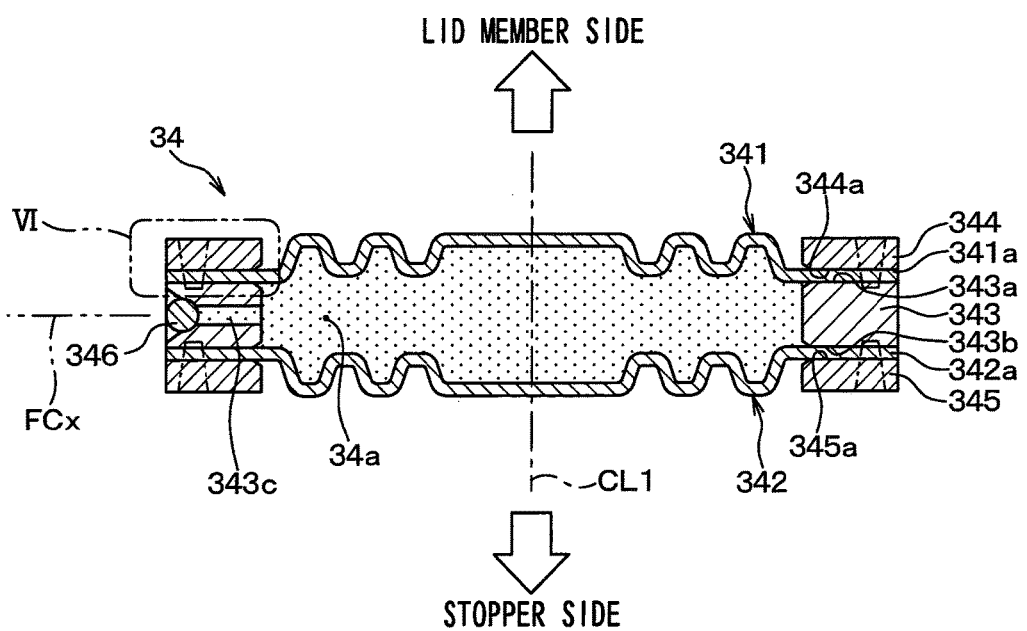
FIG. 3 is a cross-sectional view taken along line III-III in FIG. 2.

As illustrated in FIGS. 2 and 3, the power element 34 includes the first diaphragm 341 and the second diaphragm 342 which have a disc shape, an annular interposing member 343, and a first collar 344 and a second collar 345 which have a flat and annular shape. FIG. 2 is a top view of the power element 34 when viewed in the direction of the uniaxial center CL1. FIG. 3 is a cross-sectional view taken along line III-III in FIG. 2.

The first diaphragm 341 and the second diaphragm 342 are configured to include a thin spring member, and are stacked in the direction of the uniaxial center CL1. The first diaphragm 341 and the second diaphragm 342 respectively expand outward in the direction of the uniaxial center CL1, in accordance with a pressure difference between an internal pressure of the power element 34 and a pressure inside the accommodating space 44 (refer to FIG. 1). The power element 34 withstands a pressing force applied from the coil spring 325. In short, each central portion of the first diaphragm 341 and the second diaphragm 342 is displaced in accordance with the pressure difference. The accommodating space 44 illustrated in FIG. 1 communicates with the second refrigerant passage 38 so that the temperature and the pressure inside the accommodating space 44 are equal to those inside the second refrigerant passage 38 even if the valve mechanism 32 is located at any stroke position.

As illustrated in FIG. 3, the interposing member 343 is interposed between the first diaphragm 341 and the second diaphragm 342 in the direction of the uniaxial center CL1. Therefore, in the power element 34, a closed space 34a provided by being surrounded with the first diaphragm 341, the second diaphragm 342, and the interposing member 343 is disposed between the first diaphragm 341 and the second diaphragm 342. The closed space 34a is a temperature-sensing chamber for sensing a refrigerant temperature in the second refrigerant passage 38, and corresponds to a fluid enclosing space according to this disclosure.

The interposing member 343 has a first contact surface 343a having an annular shape, and is in contact with a peripheral edge portion 341a included in the first diaphragm 341, on the first contact surface 343a. On the other hand, the interposing member 343 has a second contact surface 343b having an annular shape on a side of the second contact surface 343b opposite to the first contact surface 343a in the direction along the uniaxial center CL1, and is in contact with a peripheral edge portion 342a included in the second diaphragm 342, on the second contact surface 343b. The first contact surface 343a corresponds to a contact surface of an interposing member according to this disclosure.

The interposing member 343 has a fluid introduction path 343c provided for introducing a fluid mixture of the refrigerant and inert gas into the closed space 34a. Specifically, a thin through-hole penetrating in the radial direction of the interposing member 343 is provided as the fluid introduction path 343c. The fluid introduction path 343c is closed by a plug 346 after the above-described fluid mixture is introduced into the closed space 34a. That is, the fluid mixture is an enclosed fluid which is sealed inside the closed space 34a. The temperature inside the accommodating space 44 is transferred to the fluid mixture inside the closed space 34a, and the temperature of the fluid mixture becomes coincident with the temperature inside the accommodating space 44. The pressure inside the accommodating space 44 becomes a reaction force acting against the pressure of the fluid mixture, that is, a reaction force acting against an internal pressure of the power element 34.

The first collar 344 is arranged on a side of the first diaphragm 341 opposite to the interposing member 343 in the direction of the uniaxial center CL1. The first collar 344 has a first collar contact surface 344a, and is in contact with the peripheral edge portion 341a of the first diaphragm 341, on the first collar contact surface 344a. That is, the peripheral edge portion 341a of the first diaphragm 341 is pinched by the first collar contact surface 344a and the first contact surface 343a of the interposing member 343. The first collar 344 corresponds to a collar according to this disclosure, and the first collar contact surface 344a corresponds to a collar contact surface according to this disclosure.

The second collar 345 is arranged on a side of the second diaphragm 342 opposite to the interposing member 343 in the direction of the uniaxial center CL1. The second collar 345 has a second collar contact surface 345a, and is in contact with the peripheral edge portion 342a of the second diaphragm 342, on the second collar contact surface 345a. That is, the peripheral edge portion 342a of the second diaphragm 342 is pinched by the second collar contact surface 345a and the second contact surface 343b of the interposing member 343.

As illustrated in FIG. 3, an outer shape of the power element 34 configured as described above is a symmetrical shape with respect to a virtual plane FCx which passes through the center of the power element 34 and which is orthogonal to the uniaxial center CL1.

Figure 4:
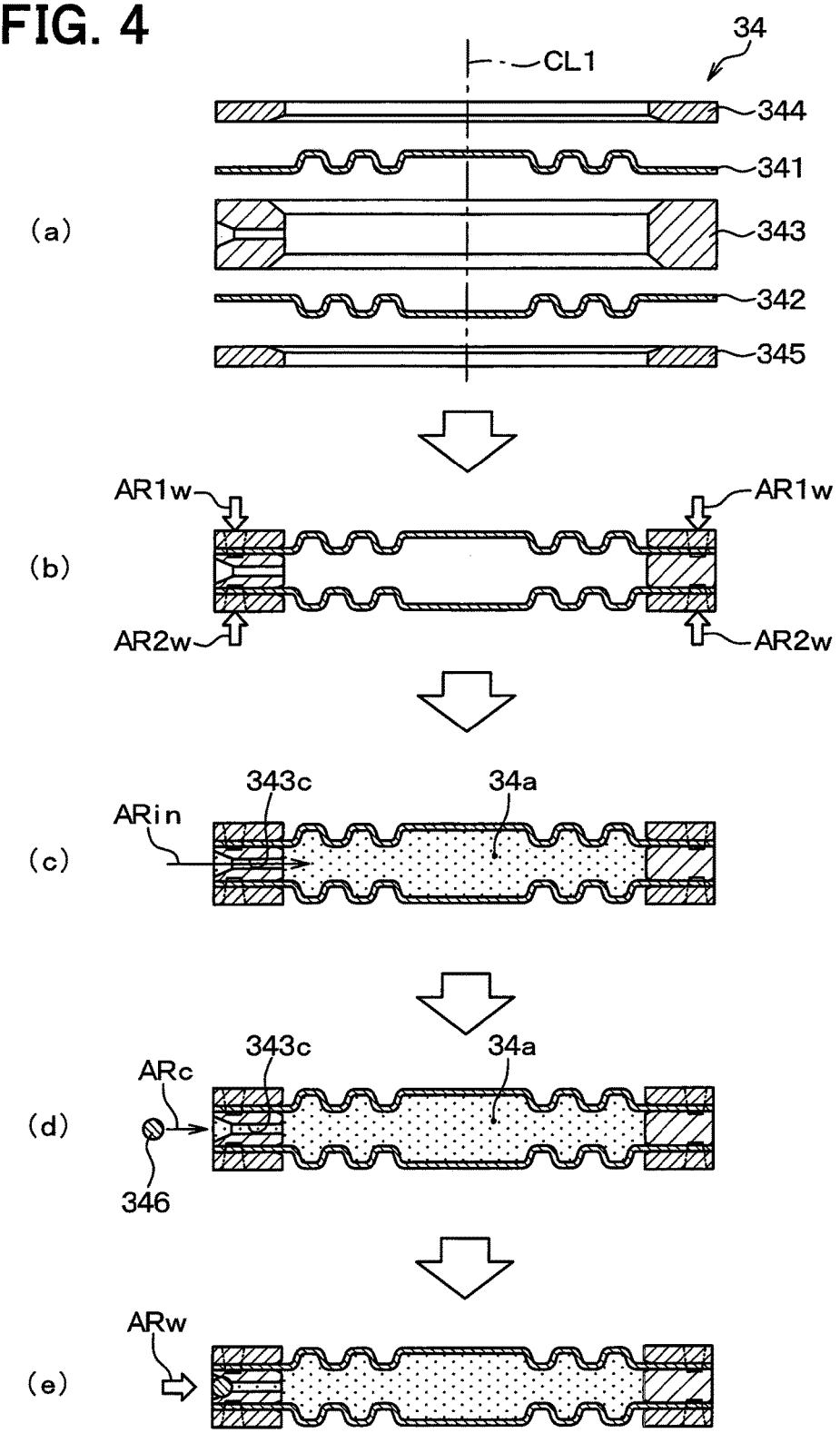
FIG. 4 is a view for describing a manufacturing process of the power element 34 illustrated in FIGS. 2 and 3.

Next, a manufacturing process of the power element 34 will be described with reference to FIG. 4. In FIG. 4, the manufacturing process sequentially proceeds from a state illustrated in (a) to a state illustrated in (e).

First, as illustrated in FIG. 4(a), the first collar 344, the first diaphragm 341, the interposing member 343, the second diaphragm 342, and the second collar 345 are sequentially stacked in the direction of the uniaxial center CL1.

Next, as illustrated by two arrows AR1w in FIG. 4(b), the first collar 344 and the interposing member 343 which pinch the first diaphragm 341 are welded using a laser, for example, over the entire circumference in the circumferential direction of the uniaxial center CL1. At the same time, as illustrated by two arrows AR2w, the second collar 345 and the interposing member 343 which pinch the second diaphragm 342 are welded using a laser, for example, over the entire circumference in the circumferential direction of the uniaxial center CL1. The laser welding is performed in an air-tight manner.

The laser-welded portions are illustrated by a two-dot chain line in FIG. 4 and in FIG. 3 described above. As is understood from FIG. 3, the interposing member 343 is joined to an outer side of the first diaphragm 341 by means of laser welding, and the outer side of the first diaphragm 341 is outward of an inner peripheral end 343d (refer to FIG. 6) of the first contact surface 343a in the radial direction of the uniaxial center CL1. The first collar 344 is joined to an outer side of the first diaphragm 341 by means of laser welding, and the outer side of the first diaphragm 341 is outward of an inner peripheral end 344b (refer to FIG. 6) of the first collar contact surface 344a in the radial direction of the uniaxial center CL1. Similarly to the first diaphragm 341, the interposing member 343 and the second collar 345 are also joined to the second diaphragm 342 by means of laser welding.

Next, as illustrated by an arrow ARin in FIG. 4(c), the fluid mixture of the refrigerant and the inert gas is introduced into the closed space 34a from the fluid introduction path 343c. The refrigerant included in the fluid mixture is a gas-liquid two-phase refrigerant, for example. The refrigerant may be different from or may be the same as the refrigerant flowing in the second refrigerant passage 38.

Next, as illustrated by an arrow ARc in FIG. 4(d), after the above-described fluid mixture is introduced into the closed space 34a, the fluid introduction path 343c is closed by the plug 346. As illustrated by an arrow ARw in FIG. 4(e), in a state where the fluid introduction path 343c is closed, the plug 346 is joined to an opening portion of the fluid introduction path 343c by means of projection welding, for example. The fluid introduction path 343c is closed in this way, thereby causing the closed space 34a to serve as a fluid enclosing space having the above-described fluid mixture enclosed therein.

Figure 5:
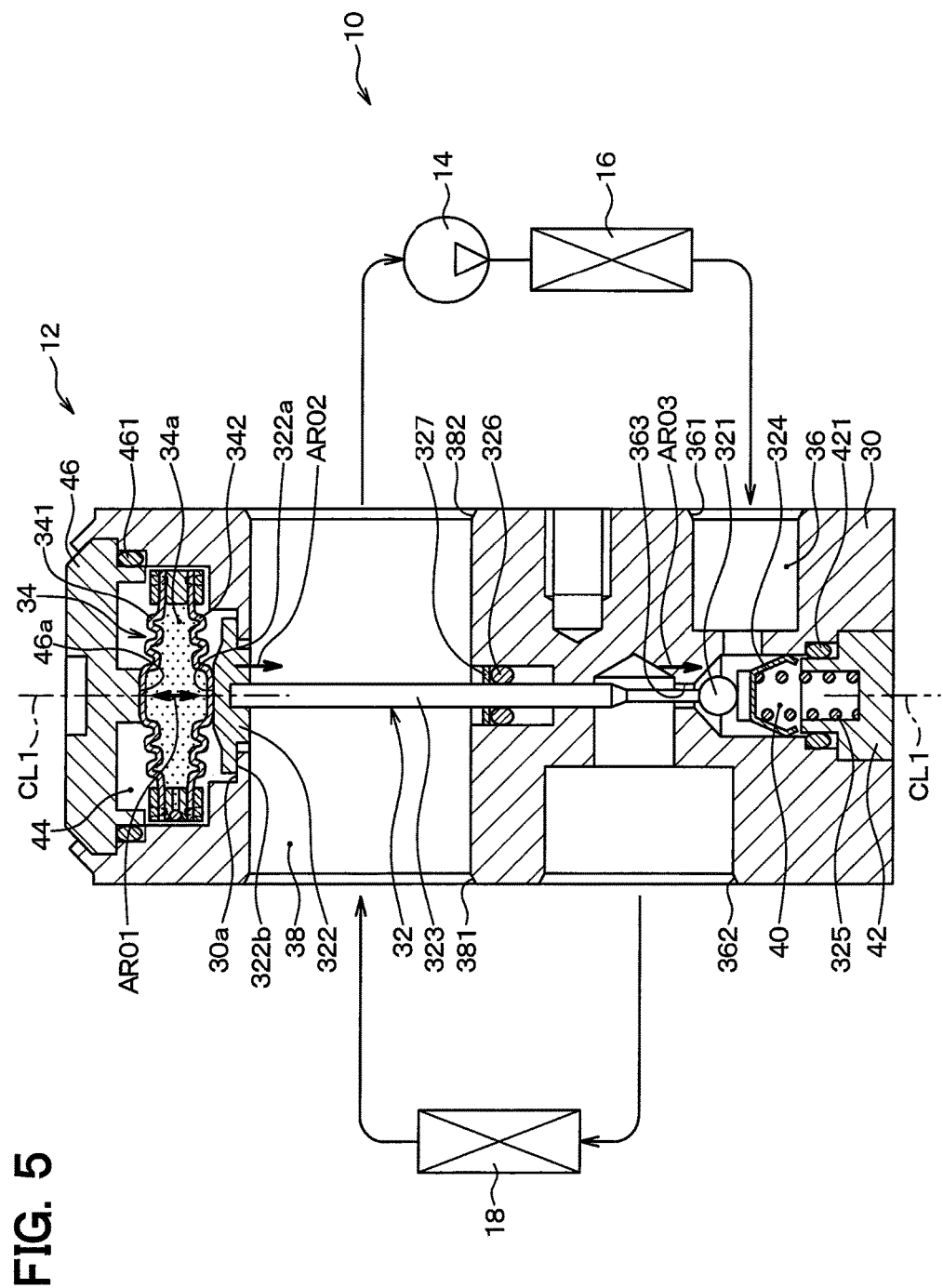
FIG. 5 is a cross-sectional view of the temperature type expansion valve 12 in FIG. 1, and is a view illustrating a state where a valve mechanism 32 maximizes a refrigerant passage area of a throttle passage 363, that is, a fully open state of a first refrigerant passage 36.

Next, an operation of the valve mechanism 32 and the power element 34 will be described with reference to FIG. 5. FIG. 5 illustrates a state where the valve mechanism 32 maximizes a refrigerant passage area of the throttle passage 363, that is, a fully open state of the first refrigerant passage 36.

In the expansion valve 12, if the temperature of the refrigerant flowing in the second refrigerant passage 38 rises, the temperature inside the accommodating space 44 and the temperature of the fluid mixture enclosed inside the closed space 34a of the power element 34 also accordingly rise, thereby increasing the internal pressure of the closed space 34a. If an expansion force of the power element 34 which is generated due to the internal pressure prevails against a reaction force generated by the coil spring 325, the power element 34 expands in the direction of the uniaxial center CL1 as illustrated by an arrow AR01 in FIG. 5. In detail, the first diaphragm 341 and the second diaphragm 342 respectively expand outward in the direction of the uniaxial center CL1.

If the power element 34 expands as illustrated by the arrow AR01, the stopper 322 and the actuating bar 323 are pressed by the second diaphragm 342, and are moved as illustrated by an arrow AR02. At the same time, the spherical valve 321 is pressed by the actuating bar 323, and is moved as illustrated by an arrow AR03. That is, the spherical valve 321 opens the throttle passage 363. An opening degree of the temperature type expansion valve 12 is controlled by a balance between a load applied when the power element 34 presses the spherical valve 321 and a load applied when the coil spring 325 presses the spherical valve 321.

In this case, the first diaphragm 341 is pressed against the contact surface 46a of the lid member 46. Accordingly, the second diaphragm 342 is displaced in the direction of the uniaxial center CL1 with respect to the contact surface 46a. At the same time, the second diaphragm 342 displaces the actuating bar 323 in the direction of the uniaxial center CL1. Therefore, a total of a deformation amount of the first diaphragm 341 and a deformation amount of the second diaphragm 342 in the direction of the uniaxial center CL1 is a stroke amount of the actuating bar 323. That is, the valve mechanism 32 is mechanically interlocked with the total of the deformation amount of the first diaphragm 341 and the deformation amount of the second diaphragm 342, thereby controlling a flow rate of the refrigerant in the first refrigerant passage 36.

If the stopper 322 is moved in the direction of the arrow AR02, a stopper surface 322b provided on a side of the stopper 322 opposite to the power element 34 in the direction of the uniaxial center CL1 collides with a collision surface 30a of the body unit 30 which faces the stopper surface 322b. FIG. 5 illustrates a state where the stopper surface 322b collides with the collision surface 30a. That is, the first refrigerant passage 36 is in a fully open state, when the stopper surface 322b collides with the collision surface 30a.

As described above, according to this embodiment, the interposing member 343 is interposed between the first diaphragm 341 and the second diaphragm 342. In this manner, the closed space 34a is provided between the first diaphragm 341 and the second diaphragm 342. Accordingly, a size of the closed space 34a can be optionally determined in accordance with a shape such as a thickness of the interposing member 343. Therefore, limitations on the size of the closed space 34a due to the shape of the first diaphragm 341 and the second diaphragm 342 can be reduced.

According to this embodiment, the first contact surface 343a of the interposing member 343 is joined to the outer side of the first diaphragm 341 outward of the inner peripheral end 343d (refer to FIG. 6) of the first contact surface 343a in the radial direction of the uniaxial center CL1. At the same time, the first collar 344 is joined to the outer side of the first diaphragm 341 by means of laser welding outward of the inner peripheral end 344b (refer to FIG. 6) of the first collar contact surface 344a in the radial direction of the uniaxial center CL1.

Figure 6:
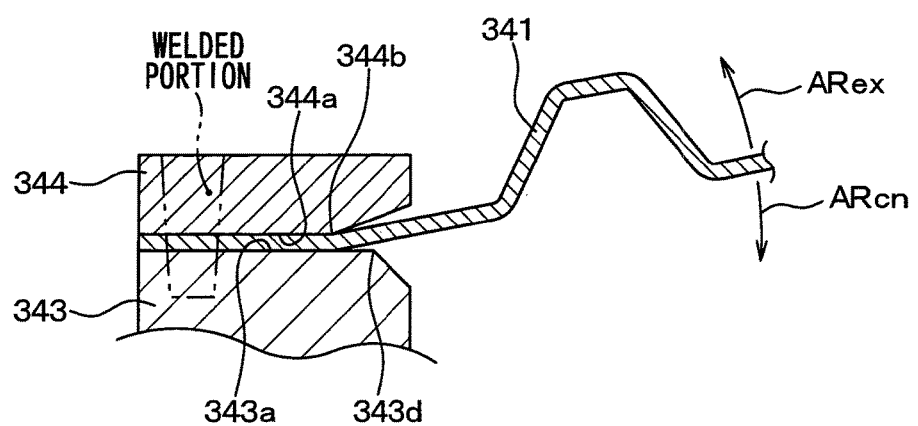
FIG. 6 is an enlarged cross-sectional view illustrating an enlarged portion VI in FIG. 3.

For example, in FIG. 6 illustrating an enlarged portion VI in FIG. 3, when the first diaphragm 341 expands outward in the direction of the uniaxial center CL1, the first diaphragm 341 is bent in a direction of an arrow ARex using the inner peripheral end 344b of the first collar contact surface 344a as a fulcrum. On the other hand, when the first diaphragm 341 contracts inward in the direction of the uniaxial center CL1, the first diaphragm 341 is bent in a direction of an arrow ARcn by using the inner peripheral end 343d of the first contact surface 343a as a fulcrum.

That is, when the first diaphragm 341 is deformed, the first diaphragm 341 is bent using a position deviated from the welded and joined portion of the first diaphragm 341 as a fulcrum. Accordingly, a stress concentration point during the deformation of the first diaphragm 341 is separated from the above-described joined portion. Therefore, the durability of the first diaphragm 341 can be improved.

Similarly to the joining configuration of the first diaphragm 341, the second diaphragm 342 is also joined to the interposing member 343 and the second collar 345. Accordingly, similarly to the first diaphragm 341, the durability of the second diaphragm 342 can also be improved.

According to this embodiment, the interposing member 343 has the fluid introduction path 343c to introduce the fluid mixture of the refrigerant and the inert gas into the closed space 34a. Accordingly, it is not necessary to provide both the first diaphragm 341 and the second diaphragm 342 with a communication hole corresponding to the fluid introduction path 343c. Therefore, the fluid introduction path 343c is easily closed so as to prevent the fluid mixture from leaking out.

According to this embodiment, the power element 34 has the symmetrical outer shape with respect to the virtual plane FCx illustrated in FIG. 3. Accordingly, limitations in an assembling direction of the power element 34 along the direction of the uniaxial center CL1 can be eliminated. Commonizing between the respective diaphragms 341 and 342 and commonizing between the respective collars 344 and 345 can be achieved.

According to this embodiment, the power element 34 is not restrained in the direction of the uniaxial center CL1 by the body unit 30. If the first diaphragm 341 expands outward in the direction of the uniaxial center CL1, the first diaphragm 341 is pressed against the contact surface 46a of the lid member 46. Accordingly, both deformation amounts of the first diaphragm 341 and the second diaphragm 342 can be used for the operation of the spherical valve 321. Therefore, the power element 34 can be miniaturized in diameter while the operation amount of the spherical valve 321 is sufficiently ensured.

According to this embodiment, the power element 34 is accommodated inside the body unit 30 by being isolated from the outer space of the expansion valve 12. Accordingly, waterproofing or sound insulating can be easily conducted between the expansion valve 12 and a member to be arranged adjacent to the expansion valve 12. An advantageous effect is obtained in that the operation of the power element 34 is less likely to be affected by the outside air temperature around the expansion valve 12. The lid member 46 which isolates the power element 34 from the outer space of the expansion valve 12 is made of a resin. Therefore, for example, compared to a case where the lid member 46 is made of metal, the operation of the power element 34 is further less likely to be affected by the outside air temperature.

(Second Embodiment)

Next, a second embodiment of this disclosure will be described. In this embodiment, points which are different from those in the above-described first embodiment will be mainly described. Elements which are the same as or equivalent to those in the above-described embodiment will be omitted or simplified in the description. The omission or the simplification is similarly applied to embodiments subsequent to a third embodiment to be described later.

Figure 7:
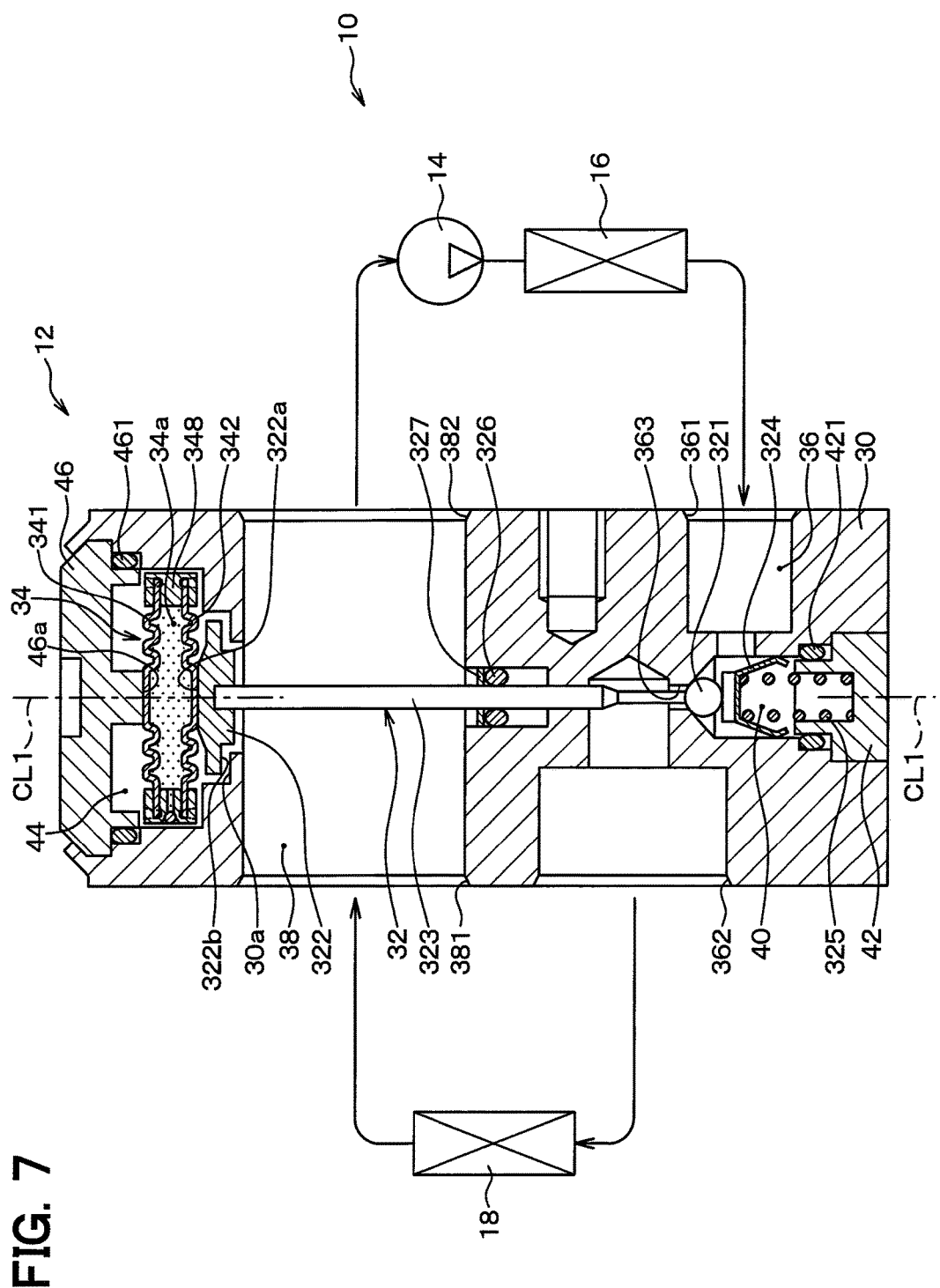
FIG. 7 is a cross-sectional view of the temperature type expansion valve 12 according to a second embodiment.

FIG. 7 is a cross-sectional view of a temperature type expansion valve 12 according to this embodiment. As illustrated in FIG. 7, the temperature type expansion valve 12 according to this embodiment has a power element 34 which is different from that of the temperature type expansion valve 12 according to the first embodiment. In detail, the power element 34 according to this embodiment has an outer shape which is the same as that of the power element 34 according to the first embodiment. However, a different point is that a first collar 344 (refer to FIG. 3) and a second collar 345 according to the first embodiment are integrated with an interposing member 343 and the power element 34 according to this disclosure is configured to include one interposing member 348.

Figure 8:
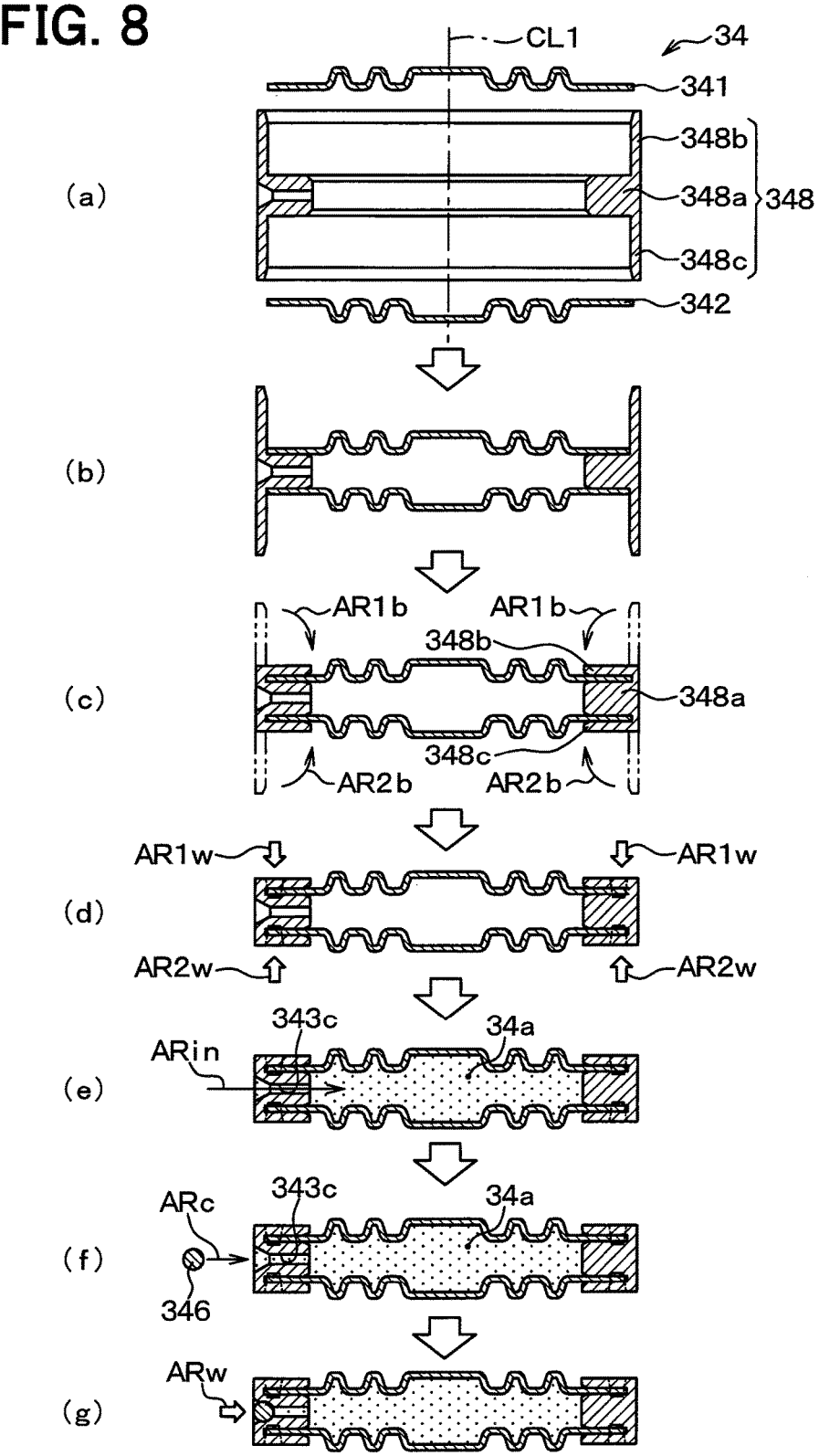
FIG. 8 is a view for describing a manufacturing process of the power element 34 belonging to the temperature type expansion valve 12 in FIG. 7.

A manufacturing process of the power element 34 according to this embodiment will be described with reference to FIG. 8. In FIG. 8, the manufacturing process sequentially proceeds from a state illustrated in (a) to a state illustrated in (g).

First, as illustrated in FIG. 8(a), a first diaphragm 341, an interposing member 348, and a second diaphragm 342 are sequentially stacked in a direction of a uniaxial center CL1. As illustrated in FIG. 8(a), the interposing member 348 is configured to include an interposing portion 348a, a first pinching portion 348b extending from the interposing portion 348a, and a second pinching portion 348c extending from the interposing portion 348a. In FIG. 8(a), the first pinching portion 348b has a cylindrical shape which protrudes from the interposing portion 348a to one side in the direction of the uniaxial center CL1, and has an inner diameter into which the first diaphragm 341 can be fitted. The second pinching portion 348c has a cylindrical shape which protrudes from the interposing portion 348a to the other side in the direction of the uniaxial center CL1, and has an inner diameter into which the second diaphragm 342 can be fitted.

Next, as illustrated in FIG. 8(b), the first diaphragm 341 is fitted into the inner side of the first pinching portion 348b until the first diaphragm 341 comes into contact with the interposing portion 348a. At the same time, the second diaphragm 342 is fitted into the inner side of the second pinching portion 348c until the second diaphragm 342 comes into contact with the interposing portion 348a. In this manner, the interposing portion 348a is interposed between the first diaphragm 341 and the second diaphragm 342.

Next, as illustrated by two arrows AR1b in FIG. 8(c), the first pinching portion 348b is bent radially inward. In this manner, the first pinching portion 348b faces the interposing portion 348a via the first diaphragm 341, and pinches the first diaphragm 341 by using the interposing portion 348a.

Similarly, as illustrated by two arrows AR2b, the second pinching portion 348c is also bent radially inward. In this manner, the second pinching portion 348c faces the interposing portion 348a via the second diaphragm 342, and pinches the second diaphragm 342 by using the interposing portion 348a. According to this configuration, the first pinching portion 348b corresponds to the first collar 344 according to the first embodiment, and the second pinching portion 348c corresponds to the second collar 345 according to the first embodiment.

Next, processes illustrated in FIGS. 8(d) to 8(g) are sequentially performed. The processes illustrated in FIGS. 8(d) to 8(g) are the same as the processes illustrated in FIGS. 4(b) to 4(e) according to the first embodiment.

Figure 9:
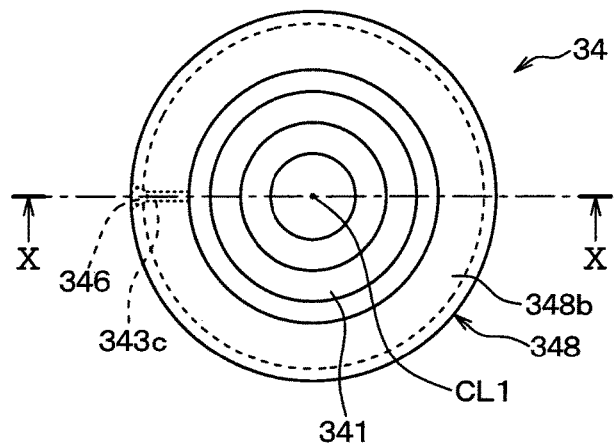
FIG. 9 is a top view of the power element 34 when viewed in the direction of the uniaxial center CL1 in FIG. 7.
Figure 10:
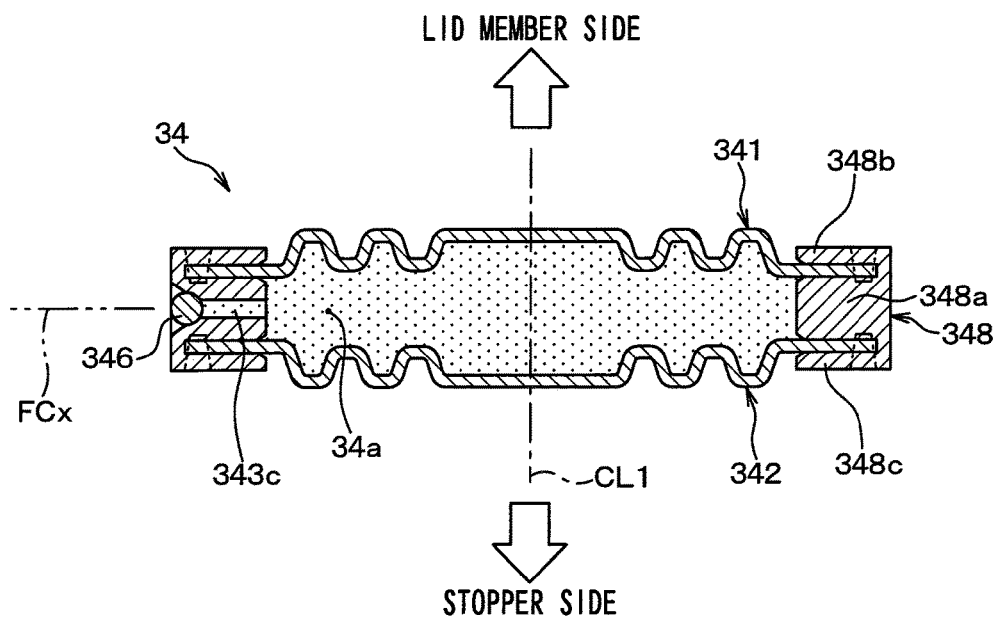
FIG. 10 is a cross-sectional view taken along line X-X in FIG. 9.

FIGS. 9 and 10 illustrate the power element 34 which is manufactured through the processes illustrated in FIGS. 8(a) to 8(g). FIG. 9 is a top view of the power element 34 according to this embodiment when viewed in the direction of the uniaxial center CL1. FIG. 10 is a cross-sectional view taken along line X-X in FIG. 9.

As illustrated in FIGS. 9 and 10, the power element 34 according to this embodiment has an outer shape which is the same as that according to the first embodiment. This embodiment is the same as the first embodiment except for the power element 34. Accordingly, advantageous effects which are the same as those according to the first embodiment can be obtained.

According to this embodiment, the interposing member 348 is configured to include the interposing portion 348a, the first pinching portion 348b, and the second pinching portion 348c. Accordingly, it is not necessary to provide the first collar 344 and the second collar 345 as described in the first embodiment.

According to this embodiment, as illustrated in FIG. 8(b), the first diaphragm 341 is fitted into the inner side of the first pinching portion 348b. Accordingly, an advantageous effect is obtained in that when the first diaphragm 341 and the interposing member 348 are joined to each other, both of these are easily prevented from being misaligned with each other. This advantageous effect is similarly obtained between the second diaphragm 342 and the interposing member 348.

(Third Embodiment)

Next, a third embodiment of this disclosure will be described. In this embodiment, points which are different from those in the above-described first embodiment will be mainly described.

Figure 11:
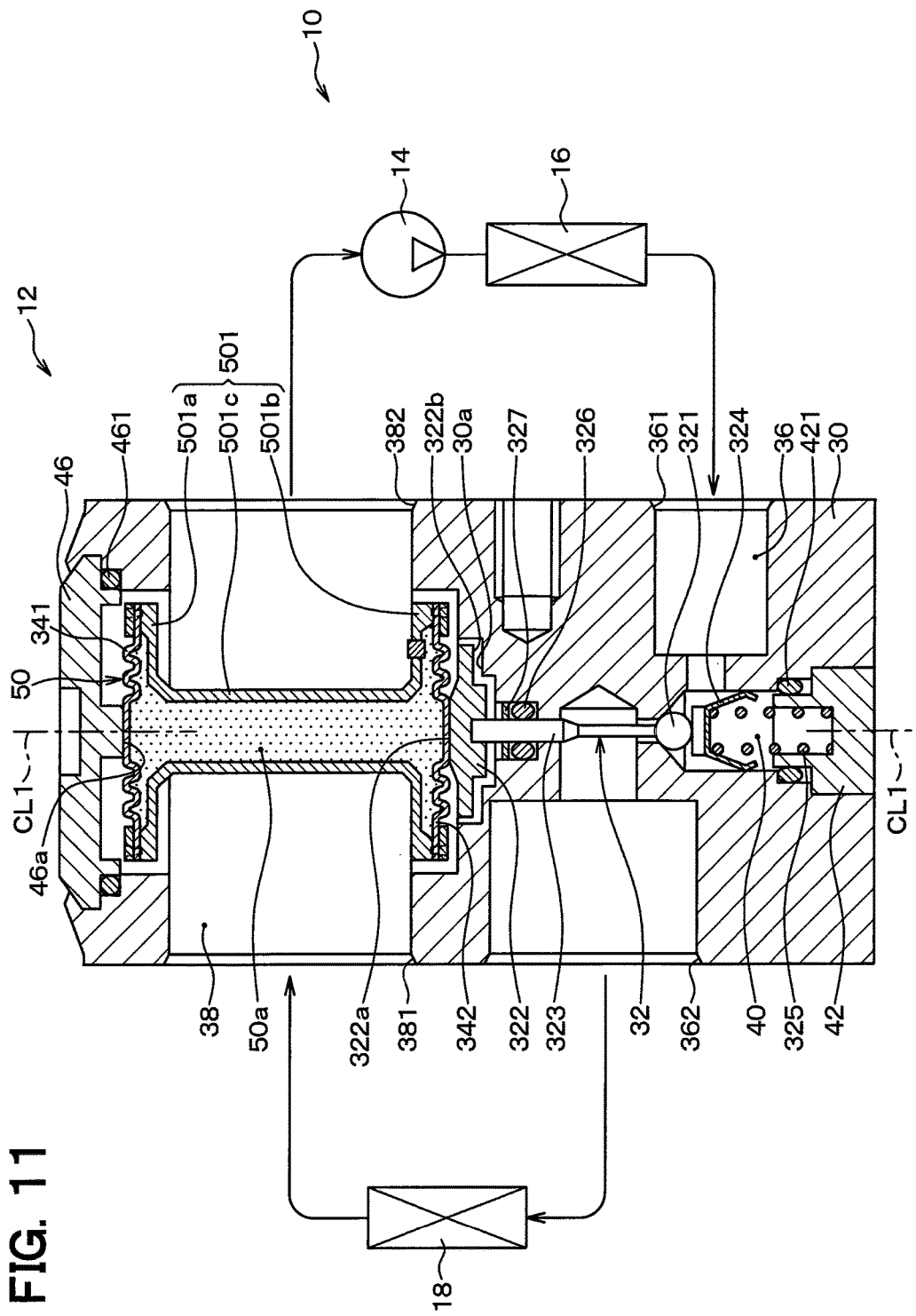
FIG. 11 is a cross-sectional view of the temperature type expansion valve 12 according to a third embodiment.

FIG. 11 is a cross-sectional view of a temperature type expansion valve 12 according to this embodiment. As illustrated in FIG. 11, in the temperature type expansion valve 12 according to this embodiment, a power element 34 according to the first embodiment is replaced with a power element 50. An arrangement of a stopper 322 and the length of an actuating bar 323 are also different from those according to the first embodiment.

Figure 12:
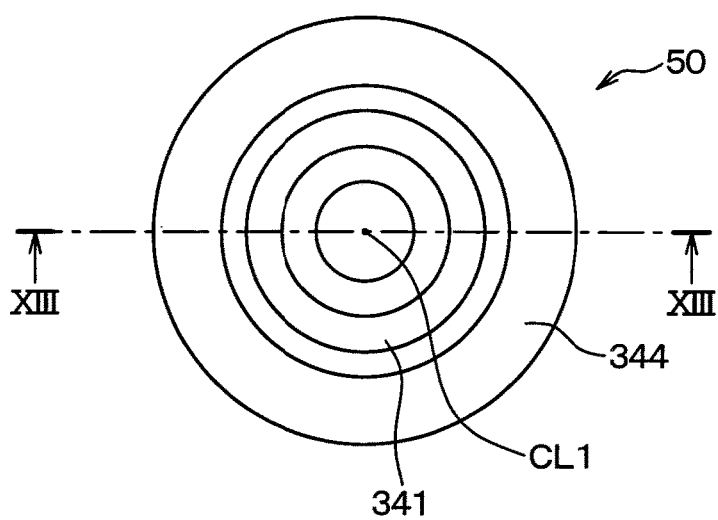
FIG. 12 is a top view of the power element 50 when viewed in the direction of the uniaxial center CL1 in FIG. 11.
Figure 13:
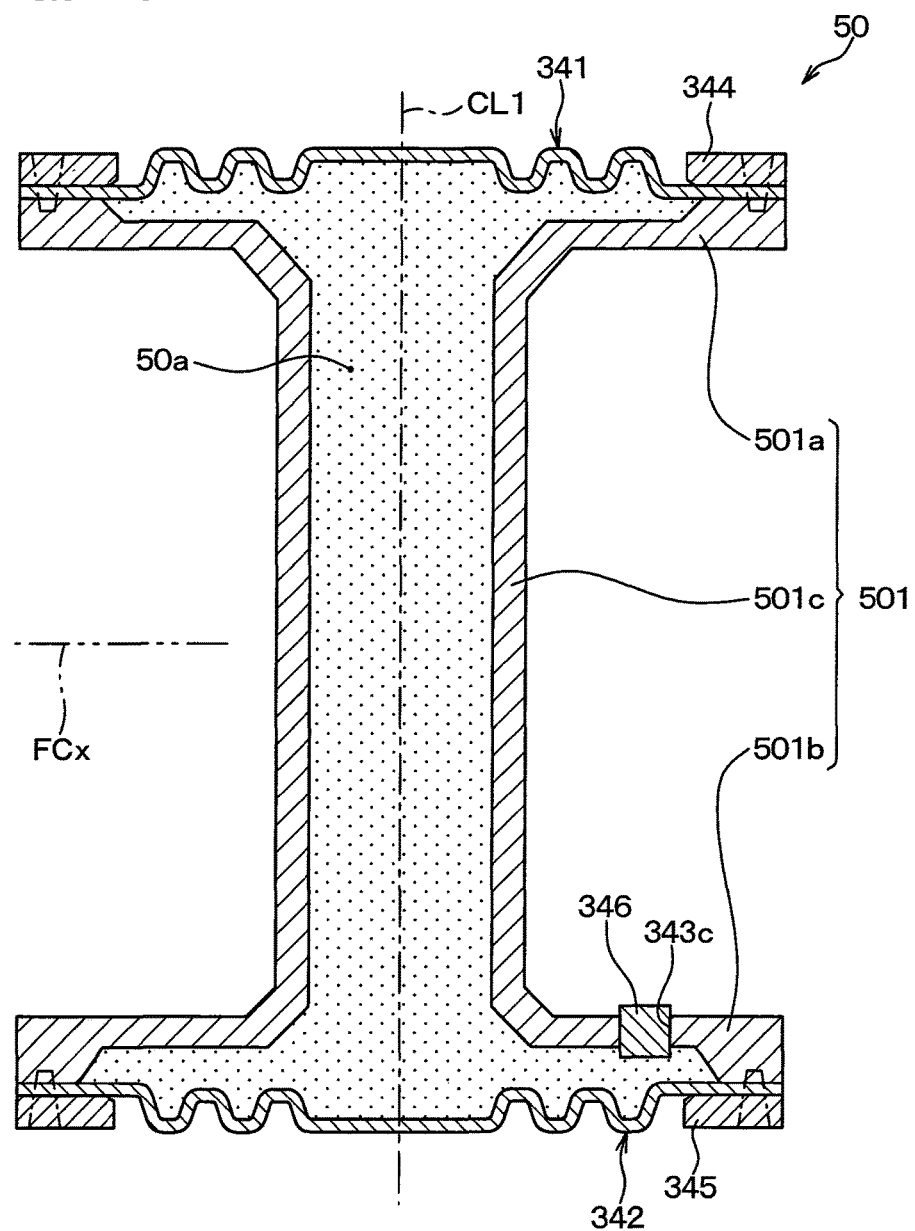
FIG. 13 is a cross-sectional view taken along line XIII-XIII in FIG. 12 according to the third embodiment.

Specifically, the power element 50 according to this embodiment corresponds to the power element 34 according to the first embodiment. Compared to the power element 34, the power element 50 is longer in a direction of a uniaxial center CL1. In detail, the power element 50 according to this embodiment includes an interposing member 501 instead of an interposing member 343 according to the first embodiment, and the interposing member 501 is longer than the interposing member 343. The power element 50 according to this embodiment has a shape illustrated in FIGS. 12 and 13. FIG. 12 is a top view of the power element 50 according to this embodiment when viewed in the direction of the uniaxial center CL1. FIG. 13 is a cross-sectional view taken along line XIII-XIII in FIG. 12.

As illustrated in FIGS. 12 and 13, similarly to the first embodiment, the power element 50 includes a first diaphragm 341, a second diaphragm 342, a first collar 344, and a second collar 345 in addition to the interposing member 501. The power element 50 corresponds to an expansion unit according to this disclosure.

The interposing member 501 is configured to include a first joined portion 501a which is joined to the first diaphragm 341 by means of laser welding, a second joined portion 501b which is joined to the second diaphragm 342 by means of laser welding, and a narrowed portion 501c which is interposed between the first joined portion 501a and the second joined portion 501b and which has a thin and narrowed cylindrical shape. The narrowed portion 501c corresponds to a channel arrangement portion according to this disclosure.

As illustrated in FIG. 13, similarly to a closed space 34a according to the first embodiment, the power element 50 has a closed space 50a provided by being surrounded with the first diaphragm 341, the second diaphragm 342, and the interposing member 501. Similarly to the closed space 34a, the closed space 50a is a fluid enclosing space having the above-described fluid mixture sealed therein. A fluid introduction path 343c for introducing the fluid mixture into the closed space 50a is formed in the second joined portion 501b. Similarly to the first embodiment, after the fluid mixture is introduced into the closed space 50a, the fluid introduction path 343c is closed by a plug 346.

As illustrated in FIG. 11, the power element 50 is arranged so that the narrowed portion 501c of the interposing member 501 is located inside a second refrigerant passage 38 to cross a refrigerant flow in the second refrigerant passage 38. In this manner, the refrigerant flowing in the second refrigerant passage 38 flows downstream while directly coming into contact with the power element 50. Accordingly, compared to the first embodiment, the power element 50 can be more accurately operated in accordance with a refrigerant temperature in the second refrigerant passage 38.

As illustrated in FIG. 13, similarly to the power element 34 according to the first embodiment, in an outer shape of the power element 50, the power element 50 has a symmetrical shape with respect to a virtual plane FCx. The symmetrical shape means a substantially symmetrical shape without meaning a strictly symmetrical shape. For example, the power element 50 has a symmetrical shape regardless of the presence or absence of a minute plug 346.

This embodiment can also be combined with the above-described second embodiment.

(Fourth Embodiment)

Next, a fourth embodiment of this disclosure will be described. In this embodiment, points which are different from those in the above-described third embodiment will be mainly described.

Figure 14:
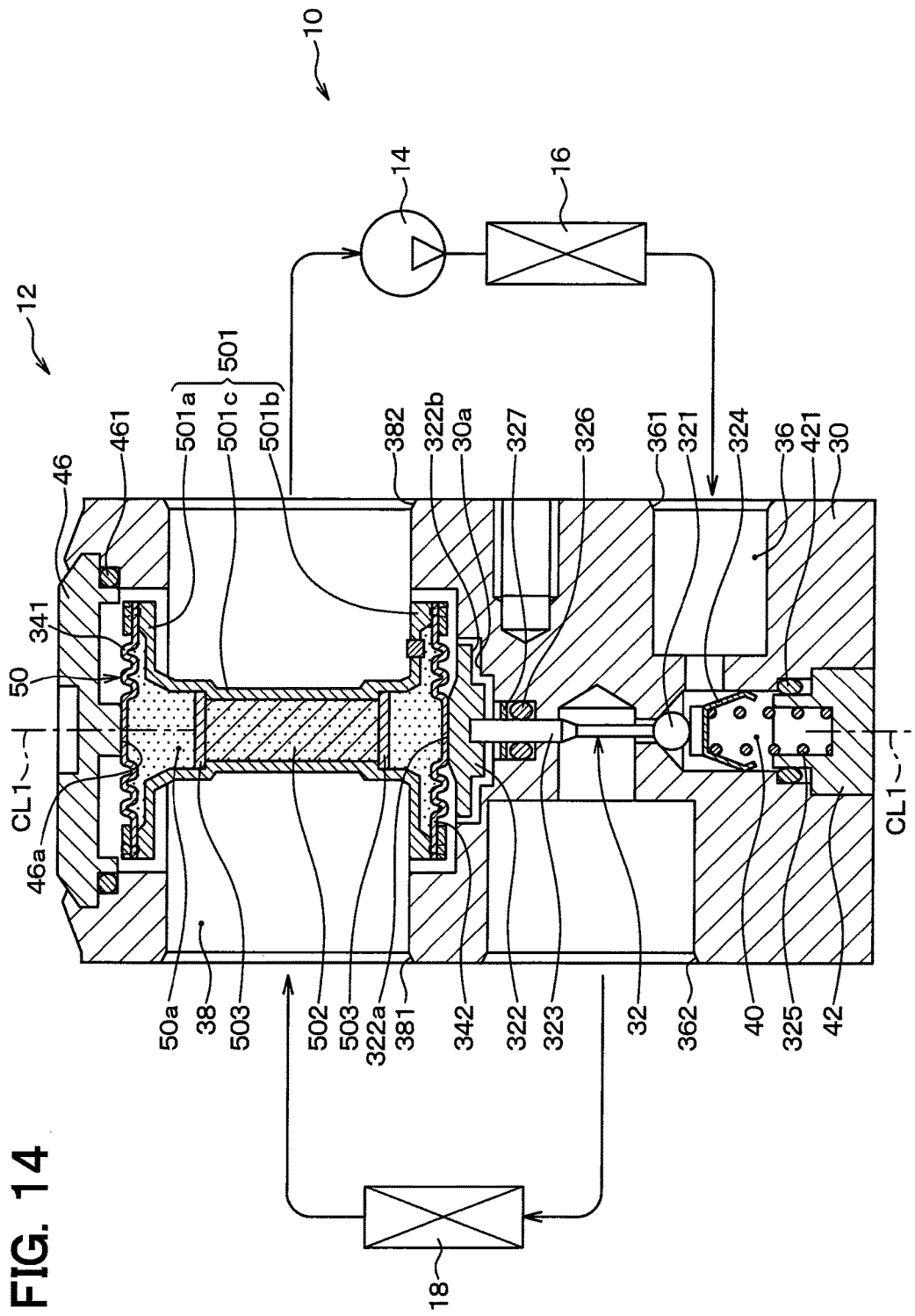
FIG. 14 is a cross-sectional view of the temperature type expansion valve 12 according to a fourth embodiment.

FIG. 14 is a cross-sectional view of a temperature type expansion valve 12 according to this embodiment. As illustrated in FIG. 14, the temperature type expansion valve 12 according to this embodiment has a power element 50 which is different from that of the temperature type expansion valve 12 according to the third embodiment. A top view obtained when the power element 50 according to this embodiment is viewed in a direction of a uniaxial center CL1 is FIG. 12 which is the same as that of the third embodiment. In this embodiment, a cross-sectional view taken along line XIII-XIII in FIG. 12 is FIG. 15 instead of FIG. 13.

Figure 15:
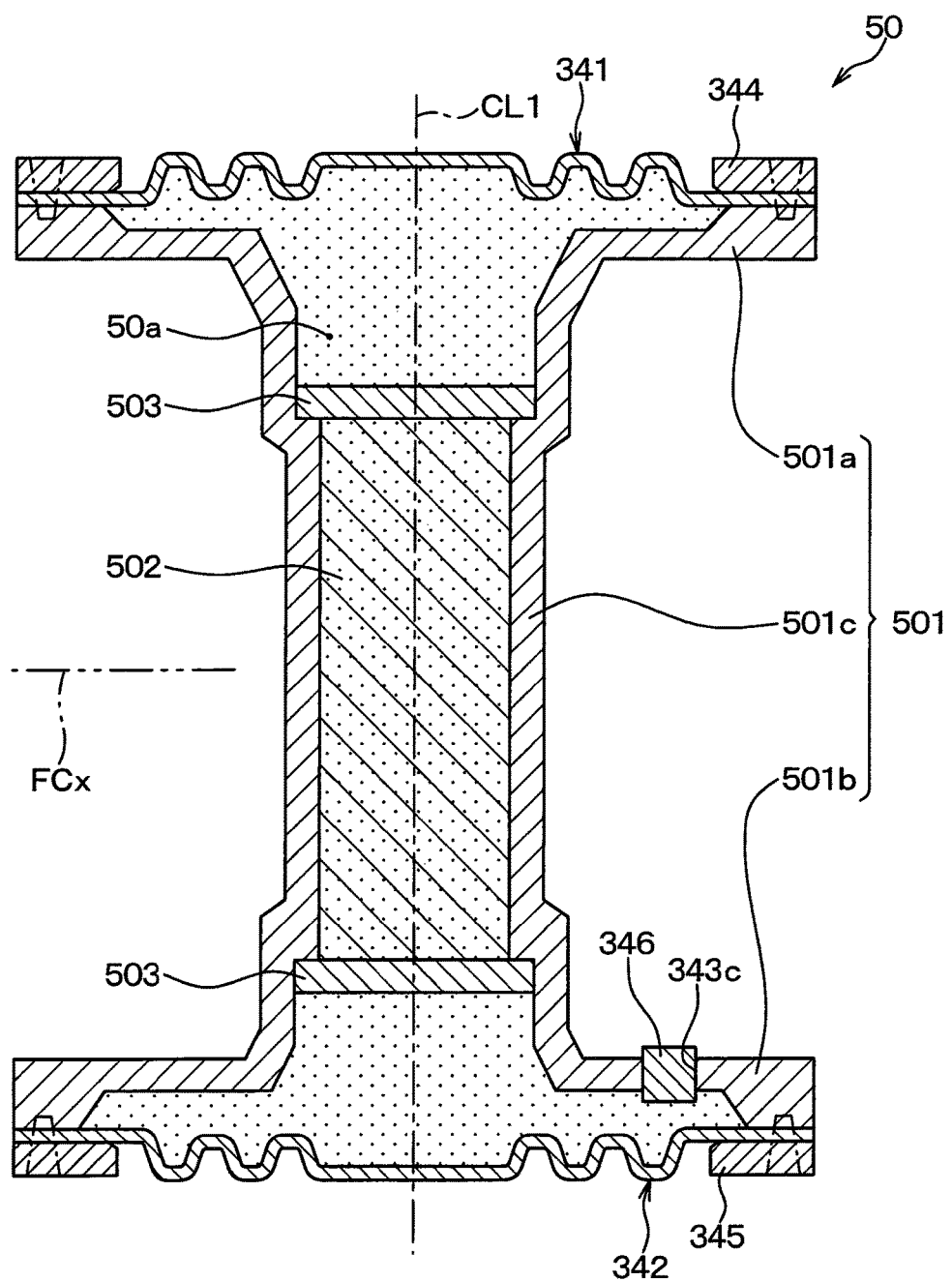
FIG. 15 is a cross-sectional view taken along line XIII-XIII in FIG. 12 according to the fourth embodiment.

As illustrated in FIGS. 14 and 15, compared to the third embodiment, specifically, the power element 50 according to this embodiment further includes an adsorbent 502 and a pair of holding members 503.

The adsorbent 502 adsorbs or radiates heat of a refrigerant enclosed in a closed space 50a in accordance with a temperature of the adsorbent 502. For example, the adsorbent 502 is configured to include activated carbon whose thermal conductivity is lower than an interposing member 501. The adsorbent 502 is disposed inside a portion of the closed space 50a of the power element 50 included in a narrowed portion 501c. An arrangement position of the adsorbent 502 is maintained by pinching the adsorbent 502 with the pair of holding members 503 in the direction of the uniaxial center CL1. The holding member 503 is a member having air permeability, and is formed of a metal mesh or a filter, for example.

According to this embodiment, the adsorbent 502 is disposed inside the power element 50. Accordingly, an operation response of the power element 50 to a temperature change in the refrigerant flowing in a second refrigerant passage 38 is slowed down. Therefore, a sensitive operation of the power element 50 can be restricted.

This embodiment can also be combined with the above-described second embodiment.

(Fifth Embodiment)

Next, a fifth embodiment of this disclosure will be described. In this embodiment, points which are different from those in the above-described third embodiment will be mainly described.

Figure 16:
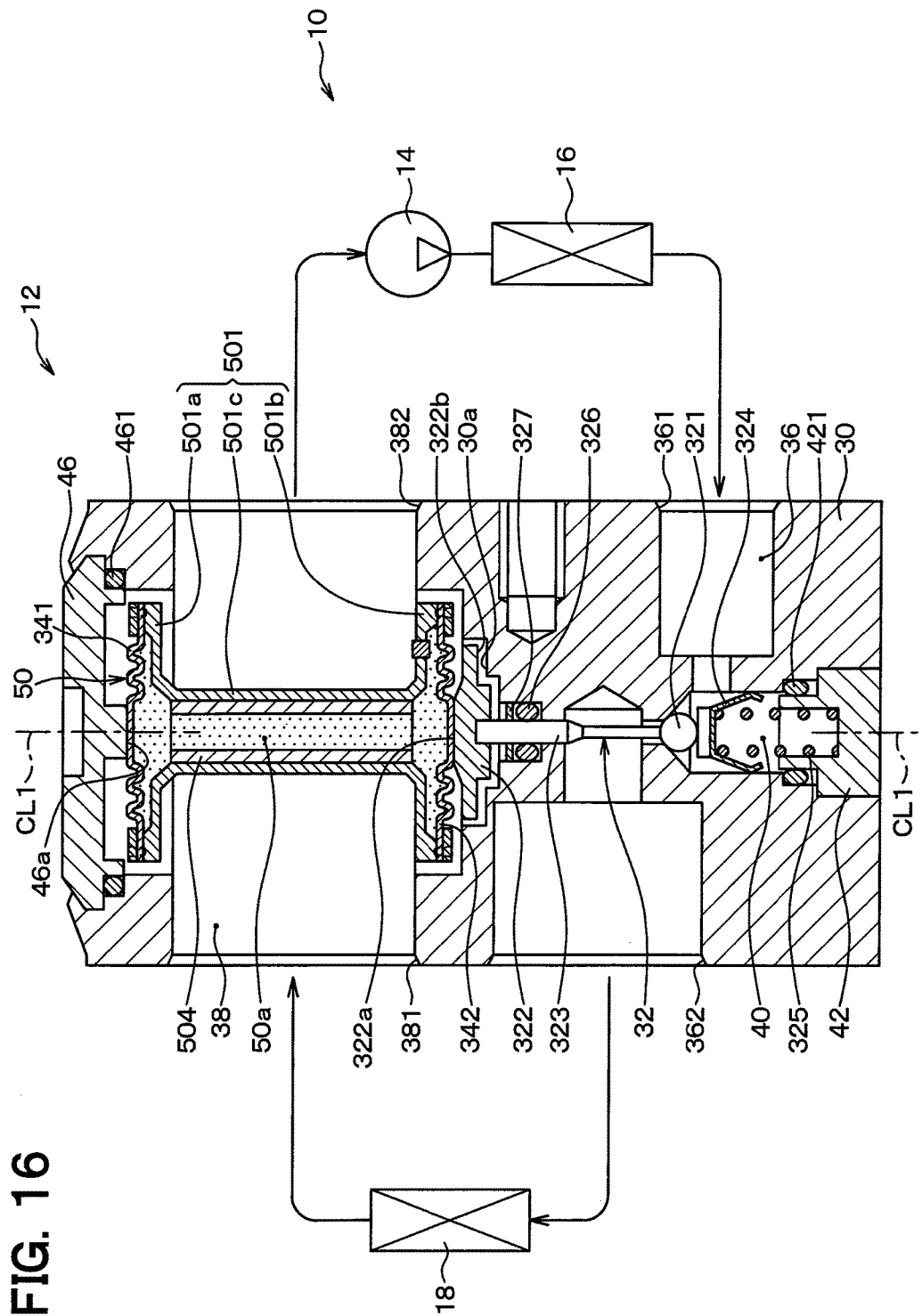
FIG. 16 is a cross-sectional view of the temperature type expansion valve 12 according to a fifth embodiment.

FIG. 16 is a cross-sectional view of a temperature type expansion valve 12 according to this embodiment. As illustrated in FIG. 16, the temperature type expansion valve 12 according to this embodiment has a power element 50 which is different from that of the temperature type expansion valve 12 according to the third embodiment. A top view obtained when the power element 50 according to this embodiment is viewed in a direction of a uniaxial center CL1 is FIG. 12 which is the same as that of the third embodiment. In this embodiment, a cross-sectional view taken along line XIII-XIII in FIG. 12 is FIG. 17 instead of FIG. 13.

Figure 17:
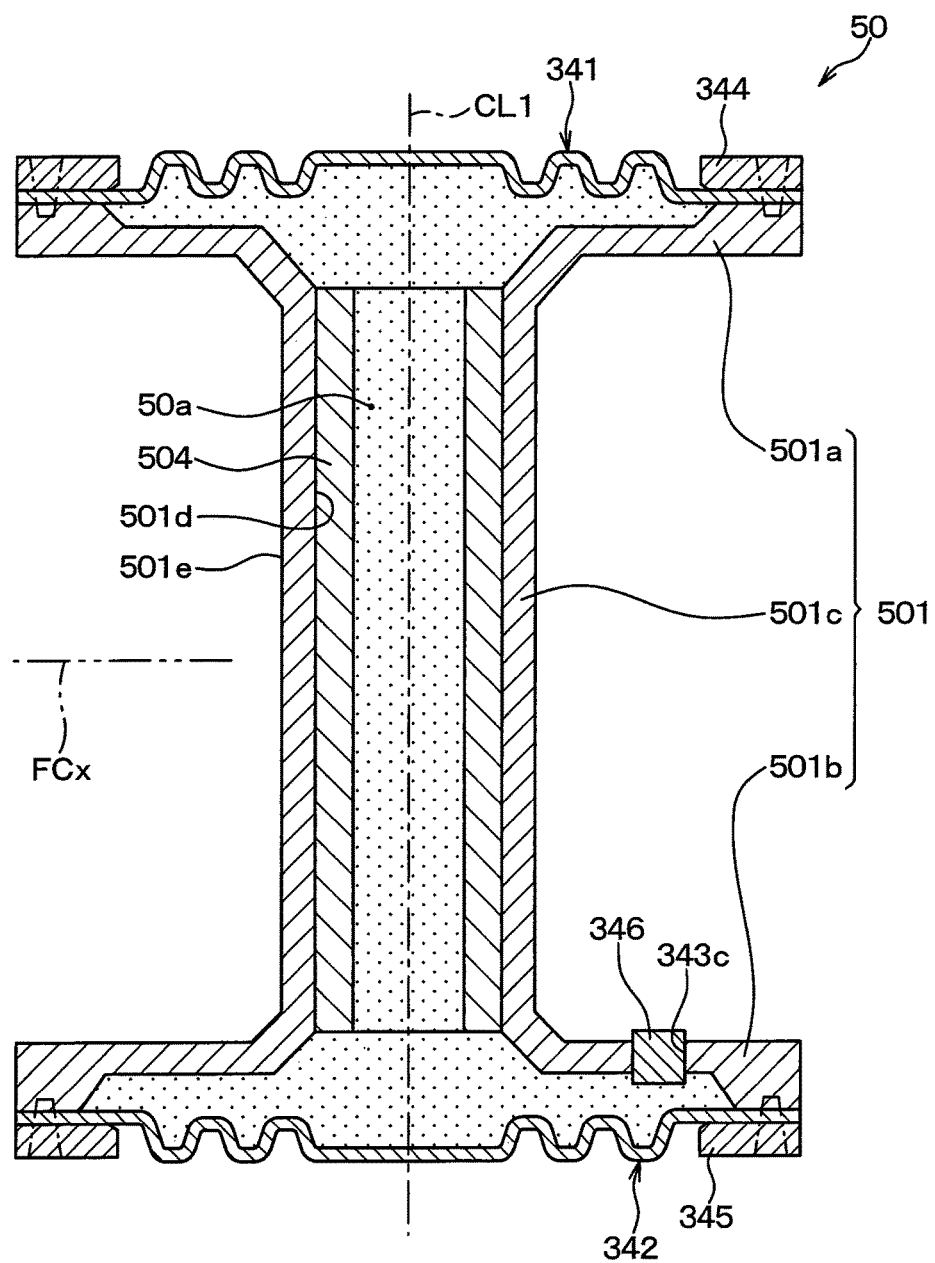
FIG. 17 is a cross-sectional view taken along line XIII-XIII in FIG. 12 according to the fifth embodiment.

As illustrated in FIGS. 16 and 17, specifically, compared to the third embodiment, the power element 50 according to this embodiment further includes a wall member 504.

The wall member 504 is formed of a material whose thermal conductivity is lower than an interposing member 501 made of metal, for example, a resin, and is molded into a cylindrical shape. The wall member 504 is fitted into a narrowed portion 501c having a cylindrical shape. Therefore, an inner peripheral surface 501d of the narrowed portion 501c is covered with the wall member 504.

According to this embodiment, the inner peripheral surface 501d of the narrowed portion 501c is covered with the wall member 504 having a low thermal conductivity. Accordingly, similarly to the above-described fourth embodiment, a sensitive operation of the power element 50 can be suppressed.

This embodiment can also be combined with any one of the above-described second and fourth embodiments.

(Sixth Embodiment)

Next, a sixth embodiment of this disclosure will be described. In this embodiment, points which are different from those in the above-described first embodiment will be mainly described.

Figure 18:
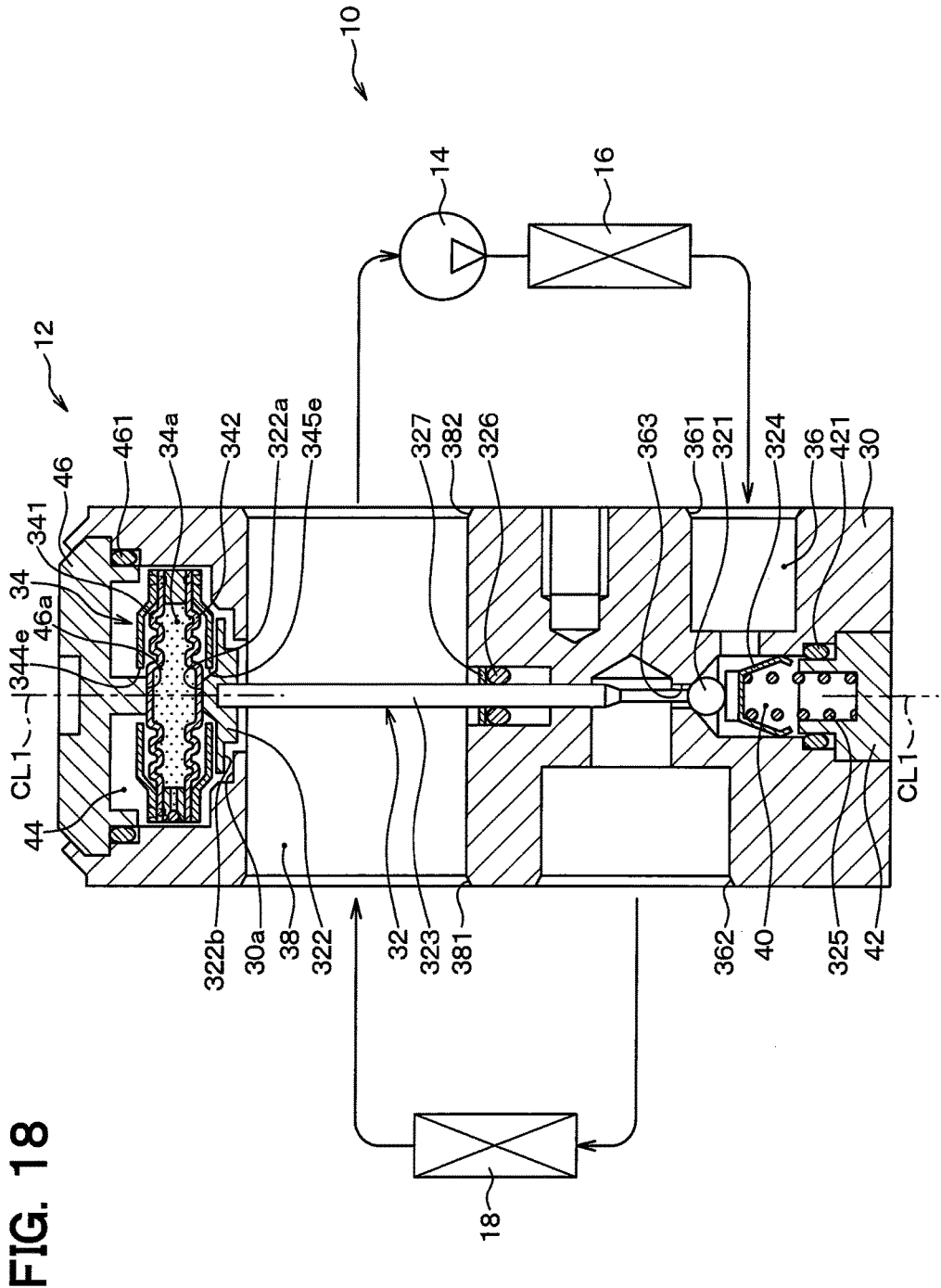
FIG. 18 is a cross-sectional view of the temperature type expansion valve 12 according to a sixth embodiment.
Figure 19:
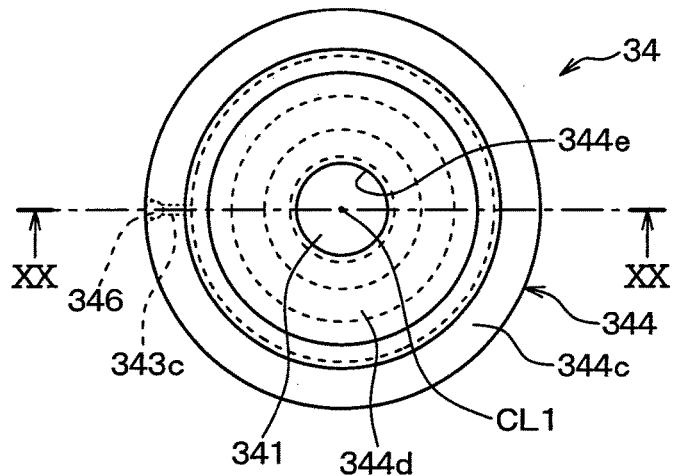
FIG. 19 is a top view of the power element 34 when viewed in the direction of the uniaxial center CL1 in FIG. 18.
Figure 20:
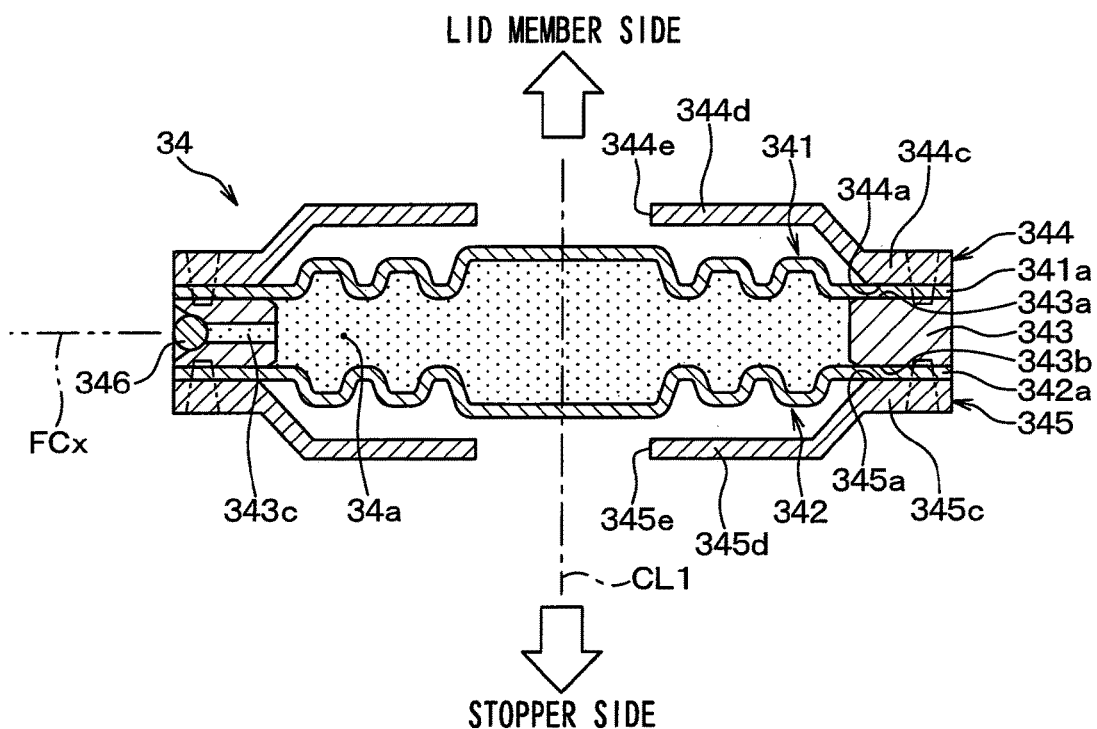
FIG. 20 is a cross-sectional view taken along line XX-XX in FIG. 19.

FIG. 18 is a cross-sectional view of a temperature type expansion valve 12 according to this embodiment. As illustrated in FIG. 18, the temperature type expansion valve 12 according to this embodiment has a power element 34 which is different from that of the temperature type expansion valve 12 according to the first embodiment. In detail, a first collar 344 and a second collar 345 are different from those according to the first embodiment. FIGS. 19 and 20 illustrate a detailed view of the power element 34 illustrated in FIG. 18. FIG. 19 is a top view of the power element 34 according to this embodiment when viewed in a direction of a uniaxial center CL1. FIG. 20 is a cross-sectional view taken along line XX-XX in FIG. 19.

As illustrated in FIGS. 19 and 20, the first collar 344 includes a diaphragm pressing portion 344c which pinches and fixes a peripheral edge portion 341a of a first diaphragm 341 by using an interposing member 343, and an extension portion 344d which extends radially inward from the diaphragm pressing portion 344c. The extension portion 344d corresponds to a prohibiting portion according to this disclosure.

As is understood from FIG. 20, the diaphragm pressing portion 344c corresponds to the overall first collar 344 according to the first embodiment. Accordingly, in the first collar 344 according to this embodiment, the extension portion 344d is added to the first collar 344 according to the first embodiment.

As illustrated in FIGS. 19 and 20, a central portion of the extension portion 344d has a through-hole 344e provided so as not to hinder the first diaphragm 341 from coming into contact with a contact surface 46a (refer to FIG. 18) of a lid member 46.

The extension portion 344d of the first collar 344 is arranged so as to come into contact with the first diaphragm 341 if the first diaphragm 341 expands to some extent. The first diaphragm 341 is prohibited by the extension portion 344d so as not to expand beyond a contact state thereof, if the first diaphragm 341 expands until the first diaphragm 341 comes into contact with the extension portion 344d.

That is, the extension portion 344d has a function of prohibiting expansion and deformation of the first diaphragm 341. Therefore, the extension portion 344d can prohibit the deformation of the first diaphragm 341 so as not to impair the durability. For example, in a case where the power element 34 is present alone in a manufacturing process of the power element 34, the deformation of the first diaphragm 341 is not restricted by the lid member 46 and a stopper 322. Therefore, particularly in this case, the extension portion 344d is effectively used.

As illustrated in FIG. 20, a second collar 345 is also the same as the above-described first collar 344. That is, the second collar 345 includes a diaphragm pressing portion 345c corresponding to the diaphragm pressing portion 344c of the first collar 344, and an extension portion 345d corresponding to the extension portion 344d of the first collar 344. The extension portion 345d of the second collar 345 has a through-hole 345e corresponding to the through-hole 344e of the first collar 344.

This embodiment can also be combined with any one of the above-described third to fifth embodiments.

(Seventh Embodiment)

Next, a seventh embodiment of this disclosure will be described. In this embodiment, points which are different from those in the above-described first embodiment will be mainly described.

Figure 21:
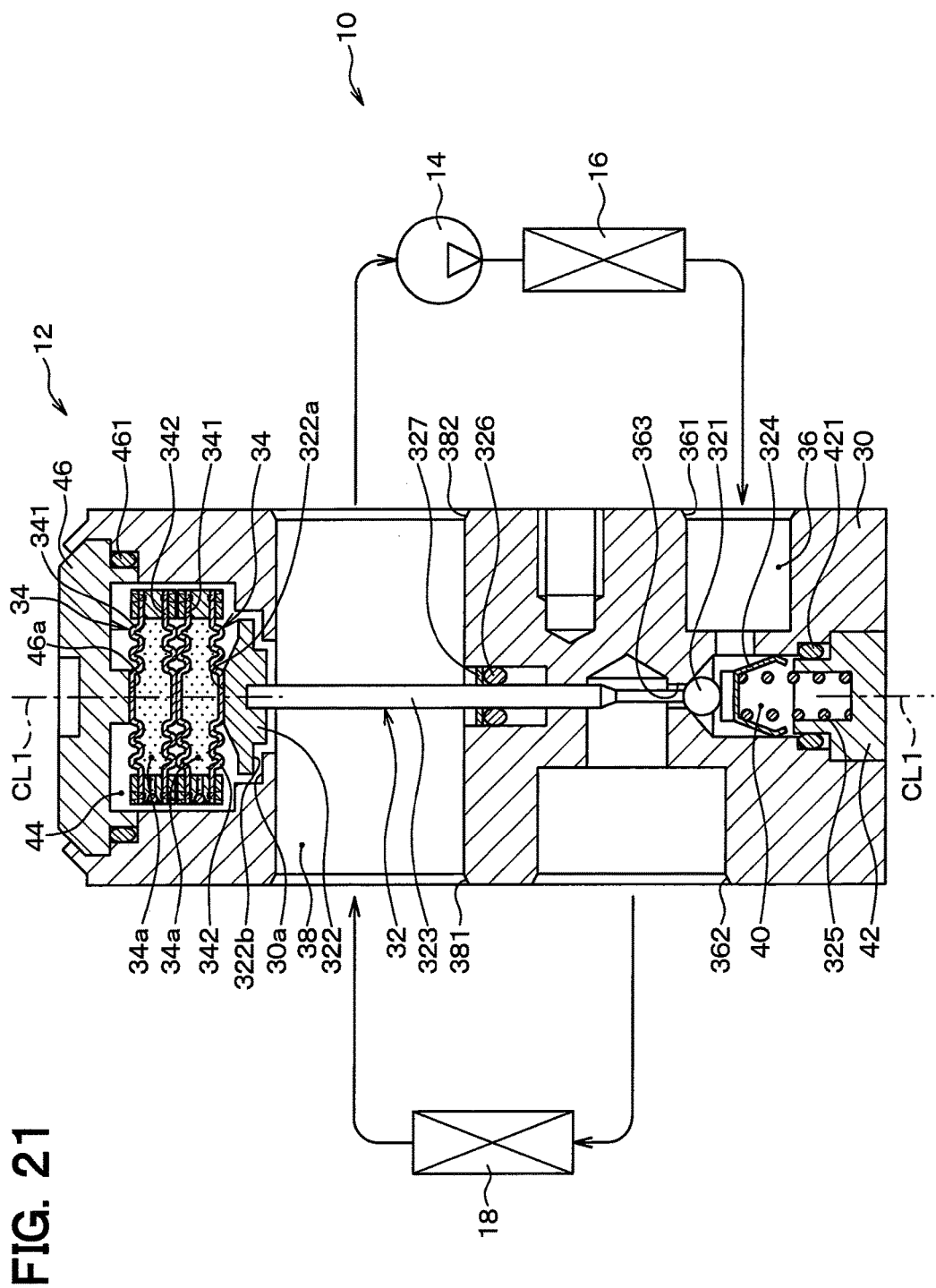
FIG. 21 is a cross-sectional view of the temperature type expansion valve 12 according to a seventh embodiment.

FIG. 21 is a cross-sectional view of a temperature type expansion valve 12 according to this embodiment. As illustrated in FIG. 21, the temperature type expansion valve 12 according to this embodiment is different from that according to the first embodiment in that a power element 34 which is the same as that according to the first embodiment is provided at two locations instead of one location.

As illustrated in FIG. 21, the two power elements 34 are stacked in a direction of a uniaxial center CL1 so as to be in contact with each other, and are disposed in an accommodating space 44. In detail, the two power elements 34 are interposed between a contact surface 46a of a lid member 46 and a pressing surface 322a of a stopper 322 in the direction of the uniaxial center CL1.

According to this embodiment, the multiple power elements 34 are disposed by being stacked in the direction of the uniaxial center CL1. Accordingly, compared to the above-described first embodiment, a stroke amount of an actuating bar 323 increases with respect to a temperature change in a refrigerant flowing in a second refrigerant passage 38. Therefore, the power element 34 is more easily miniaturized.

This embodiment can also be combined with any one of the above-described second to sixth embodiments.

(Other Embodiments)

(1) In FIG. 17 according to the above-described fourth embodiment, a wall member 504 covers an inner peripheral surface 501d of a narrowed portion 501c. However, in addition to the inner peripheral surface 501d or instead of the inner peripheral surface 501d, the wall member 504 may cover an outer peripheral surface 501e of the narrowed portion 501c.

(2) In the above-described respective embodiments, a fluid introduction path 343c is provided in interposing members 343 and 501, but may be provided in another member.

(3) In the above-described respective embodiments, respective entire circumferences of a first diaphragm 341 and a second diaphragm 342 are welded to interposing members 343 and 501 so as to ensure air-tightness of power elements 34 and 50. However, if the air-tightness of the power elements 34 and 50 is ensured, the first diaphragm 341 and the second diaphragm 342 may be respectively joined to the interposing members 343 and 501 by using a method other than the welding.

(4) In the above-described respective embodiments, power elements 34 and 50 have a symmetrical outer shape with respect to a virtual plane FCx, but may not have the symmetrical outer shape.

(5) In the above-described respective embodiments, an expansion valve 12 configures a part of a vapor compression type refrigeration cycle 10, but may be used for another application.

(6) In the above-described respective embodiments, an expansion valve 12 has a configuration in which power elements 34 and 50 expand in accordance with a refrigerant temperature in a second refrigerant passage 38. However, the expansion valve 12 may have a configuration in which the power elements 34 and 50 expand in accordance with temperatures other than the refrigerant temperature in the second refrigerant passage 38.

(7) In the above-described respective embodiments, a refrigerant which is a fluid the same as that in a first refrigerant passage 36 flows in a second refrigerant passage 38. However, a fluid which is different from that in the first refrigerant passage 36 may flow in the second refrigerant passage 38.

(8) In the above-described respective embodiments, closed spaces 34a and 50a provided in power elements 34 and 50 function as a single space, but may be divided into multiple spaces which are independent from each other.

(9) In the above-described respective embodiments, an enclosed fluid which is sealed inside closed spaces 34a and 50a of power elements 34 and 50 is a fluid mixture in which a refrigerant and inert gas are mixed with each other, but may be only the refrigerant. Furthermore, the enclosed fluid is not particularly limited as long as the enclosed fluid is a fluid whose volume expands in accordance with temperature rising.

(10) In FIG. 1 according to the above-described first embodiment, within two diaphragms included in an expansion valve 12, the diaphragm located on a lid member 46 side is referred to as a first diaphragm 341, and the diaphragm located on a stopper 322 side is referred to as a second diaphragm 342. However, conversely, the diaphragm located on the lid member 46 side may be referred to as the second diaphragm 342, and the diaphragm located on the stopper 322 side may be referred to as the first diaphragm 341.

(11) In the above-described seventh embodiment, two power elements 34 according to the first embodiment are stacked in a direction of a uniaxial center CL1. However, for example, two power elements 50 according to the third embodiment may be stacked in the direction of the uniaxial center CL1. The number of stacked power elements 34 and 50 may be three or more. The multiple stacked power elements may have shapes which are different from each other.

(Eighth Embodiment)

Figure 22:
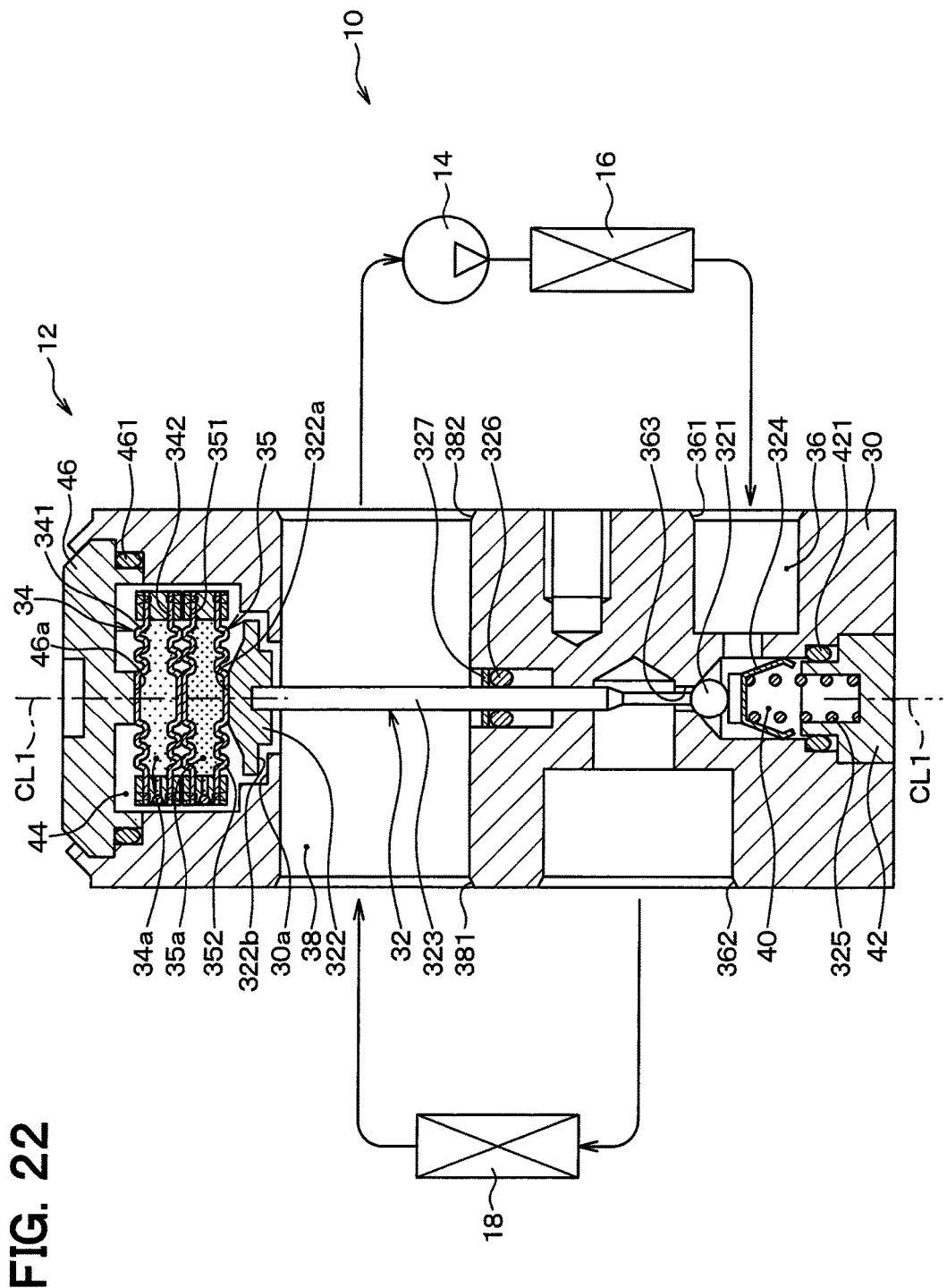
FIG. 22 is a cross-sectional view of the temperature type expansion valve 12 according to an eighth embodiment.

FIG. 22 is a cross-sectional view of a temperature type expansion valve 12 which is an expansion valve according to this disclosure. The temperature type expansion valve 12 configures a part of an in-vehicle vapor compression type refrigeration cycle 10. FIG. 22 schematically illustrates a connection relationship between the temperature type expansion valve 12 and each configuration device of the vapor compression type refrigeration cycle 10.

The vapor compression type refrigeration cycle 10 employs a fluorocarbon refrigerant (for example, R134a) as a refrigerant. The vapor compression type refrigeration cycle 10 configures a subcritical cycle in which a high pressure-side refrigerant pressure does not exceed a critical pressure of the refrigerant. First, in the vapor compression type refrigeration cycle 10 illustrated in FIG. 22, a compressor 14 sucks and compresses the refrigerant by obtaining a driving force from a vehicle traveling engine (not illustrated) via an electromagnetic clutch.

A condenser 16 is a radiation heat exchanger in which a high-pressure refrigerant is subjected to heat radiation and condensed by performing heat exchange between the high-pressure refrigerant discharged from the compressor 14 and air outside a vehicle which is outside air blown by a cooling fan (not illustrated). For example, an outlet side of the condenser 16 is connected to the temperature type expansion valve 12 via a receiver (not illustrated) which separates gas and liquid.

The temperature type expansion valve 12 decompresses and expands the high-pressure refrigerant which has flowed out from the condenser 16. Based on a temperature and a pressure of an evaporator outflow refrigerant which has flowed out from an evaporator 18, the temperature type expansion valve 12 changes a throttle passage area so that a degree of superheat of the evaporator outflow refrigerant is close to a predetermined value, and controls a refrigerant flow rate which is caused to flow to an inlet side of the evaporator 18. A detailed configuration of the temperature type expansion valve 12 will be described later.

The evaporator 18 is a heat-absorbing heat exchanger in which a heat absorbing effect is achieved by evaporating a low-pressure refrigerant through heat exchange between the low-pressure refrigerant decompressed and expanded in the temperature type expansion valve 12 and air blown by a blower fan (not illustrated). Furthermore, an outlet side of the evaporator 18 is connected to an intake side of the compressor 14 via a second refrigerant passage 38 provided inside the temperature type expansion valve 12.

Next, a detailed configuration of the temperature type expansion valve 12 will be described. As illustrated in FIG. 22, the temperature type expansion valve 12 is configured to have a body unit 30, a valve mechanism 32, a first power element 34, and a second power element 35. The first power element 34 corresponds to a first expansion unit according to this disclosure, and the second power element 35 corresponds to a second expansion unit according to this disclosure.

The body unit 30 configures an outer shell of the temperature type expansion valve 12 and a refrigerant passage inside the temperature type expansion valve 12. For example, the body unit 30 is provided by performing drilling work on a cylindrical or prismatic metal block made of an aluminum alloy. The body unit 30 is a housing which forms an outer shape of the temperature type expansion valve 12. A first refrigerant passage 36, the second refrigerant passage 38, and a valve chamber 40 are provided in the body unit 30.

The first refrigerant passage 36 is a first channel through which a refrigerant serving as a flowing fluid flows, and is a channel disposed in order to decompress the refrigerant. The first refrigerant passage 36 has a first inlet port 361 in one end thereof, and has a first outlet port 362 in the other end. The first inlet port 361 is connected to the outlet side of the condenser 16, and the first outlet port 362 is connected to the inlet side of the evaporator 18.

The second refrigerant passage 38 is a channel through which the refrigerant flows, and is a second channel which is separate from the first refrigerant passage 36. The second refrigerant passage 38 has a second outlet port 382 in one end thereof, and has a second inlet port 381 in the other end. The second inlet port 381 is connected to the outlet side of the evaporator 18, and the second outlet port 382 is connected to the intake side of the compressor 14.

The valve chamber 40 is a space which is disposed in an intermediate portion of the first refrigerant passage 36 and internally accommodates a spherical valve 321 of the valve mechanism 32 (to be described later). Specifically, the valve chamber 40 directly communicates with the first inlet port 361, and communicates with the first outlet port 362 via a throttle passage 363. The throttle passage 363 configures a portion of the first refrigerant passage 36, and is a decompressing channel which decompresses the refrigerant by throttling a refrigerant flow. That is, the throttle passage 363 is a passage in which the refrigerant flowing from the first inlet port 361 to the valve chamber 40 is guided from the valve chamber 40 side to the first outlet port 362 side while the refrigerant is decompressed and expanded.

The valve mechanism 32 includes the spherical valve 321, a stopper 322, an actuating bar 323, a vibration-isolating spring 324, and a coil spring 325, and is accommodated inside the body unit 30. The spherical valve 321, the stopper 322, the actuating bar 323, the vibration-isolating spring 324, and the coil spring 325 are arranged on a uniaxial center CL1, and the spherical valve 321 is operated in a direction of the uniaxial center CL1. The valve mechanism 32 corresponds to a flow rate control unit according to this disclosure.

The spherical valve 321 is a valve body which controls a refrigerant passage area of the throttle passage 363 by being displaced in the direction of the uniaxial center CL1, that is, a valve body which controls a valve opening degree. The valve chamber 40 accommodates the vibration-isolating spring 324 and the coil spring 325 together with the spherical valve 321. The vibration-isolating spring 324 restricts unnecessary vibrations of the spherical valve 321 by sliding on the valve chamber 40. The coil spring 325 applies a load for actuating the throttle passage 363 to be close, to the spherical valve 321 via the vibration-isolating spring 324. FIG. 22 illustrates a state where the valve mechanism 32 completely closes the throttle passage 363, that is, a fully closed state of the first refrigerant passage 36.

The expansion valve 12 includes an adjusting screw 42 which is screwed into the body unit 30 so as to press the spherical valve 321 against an end portion of the throttle passage 363 via the coil spring 325. A load of the coil spring 325 for actuating the spherical valve 321 can be adjusted by rotating the adjusting screw 42. An O-ring 421 is disposed between the adjusting screw 42 and the body unit 30. The O-ring 421 prevents the refrigerant from leaking out from the valve chamber 40 to the outside of the expansion valve 12.

The stopper 322 has a disc shape, for example, and is in contact with a fourth diaphragm 352 of the second power element 35 on a pressing surface 322a provided on one side in the direction of the uniaxial center CL1. The stopper 322 presses the fourth diaphragm 352 in the direction of the uniaxial center CL1, on the pressing surface 322a.

The actuating bar 323 has a cylindrical shape, for example, and is interposed between the stopper 322 and the spherical valve 321. One end of the actuating bar 323 is in contact with the stopper 322. The other end of the actuating bar 323 is inserted into the throttle passage 363, and abuts against the spherical valve 321. The spherical valve 321, the stopper 322, and the actuating bar 323 correspond to an operation member which operates in the valve mechanism 32, and increase or decrease a refrigerant flow rate of the first refrigerant passage 36 by being displaced in the direction of the uniaxial center CL1.

An O-ring 326 into which the actuating bar 323 is inserted is held in the body unit 30 by a retaining ring 327. The O-ring 326 prevents the refrigerant from flowing between the first refrigerant passage 36 and the second refrigerant passage 38 by passing through a gap between the actuating bar 323 and the body unit 30.

The first power element 34 is stacked with the second power element 35 and the stopper 322 in the direction of the uniaxial center CL1, and is accommodated together with the second power element 35 and the stopper 322 inside an accommodating space 44 provided in the body unit 30. In detail, the accommodating space 44 is provided by the body unit 30 and a lid member 46 which is fitted and joined to the body unit 30 by means of caulking. An O-ring 461 is disposed between the lid member 46 and the body unit 30. The O-ring 461 prevents the refrigerant from flowing from the accommodating space 44 to the outside of the expansion valve 12.

The lid member 46 configures a part of the accommodating space 44, and isolates the first power element 34 and the second power element 35 from an outer space of the expansion valve 12. A contact surface 46a which is in contact with a first diaphragm 341 of the first power element 34 in the direction of the uniaxial center CL1 is provided in the lid member 46. The lid member 46 presses the first diaphragm 341 in the direction of the uniaxial center CL1, on the contact surface 46a.

Preferably, the lid member 46 is configured to have a material excellent in heat insulating performance, for example, a resin. The contact surface 46a is a fixed surface which is not movable in the direction of the uniaxial center CL1, since the lid member 46 is joined to the body unit 30 by means of caulking.

The first power element 34 is adjacent to the lid member 46 side of the second power element 35 in the direction of the uniaxial center CL1, and is interposed together with the second power element 35 between the contact surface 46a of the lid member 46 and the pressing surface 322a of the stopper 322. In this manner, the first power element 34 and the second power element 35 are integrally held in the direction of the uniaxial center CL1. The first power element 34 and the second power element 35 are not restrained by the body unit 30 in the direction of the uniaxial center CL1, that is, in the axial direction of the uniaxial center CL1. However, since a clearance is present between the body unit 30 and the first and second power elements 34 and 35 in a radial direction of the uniaxial center CL1, the movement of the first power element 34 and the second power element 35 is restricted. In other words, the first power element 34 and the second power element 35 are movable in the radial direction inside the accommodating space 44 within a range of the clearance.

Figure 23:
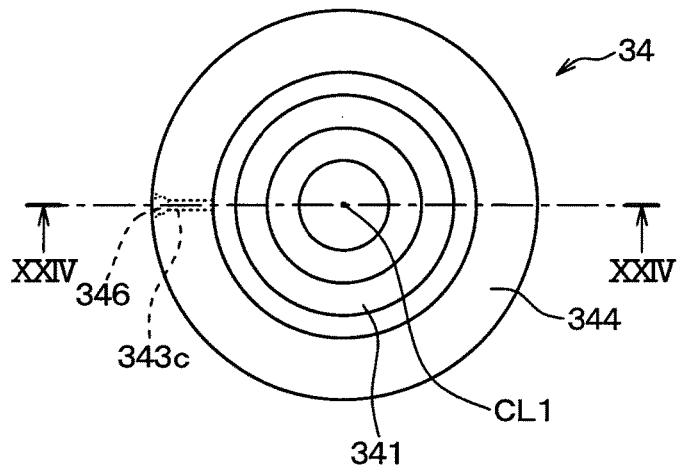
FIG. 23 is a top view of a first power element 34 when viewed in the direction of the uniaxial center CL1 in FIG. 22.
Figure 24:
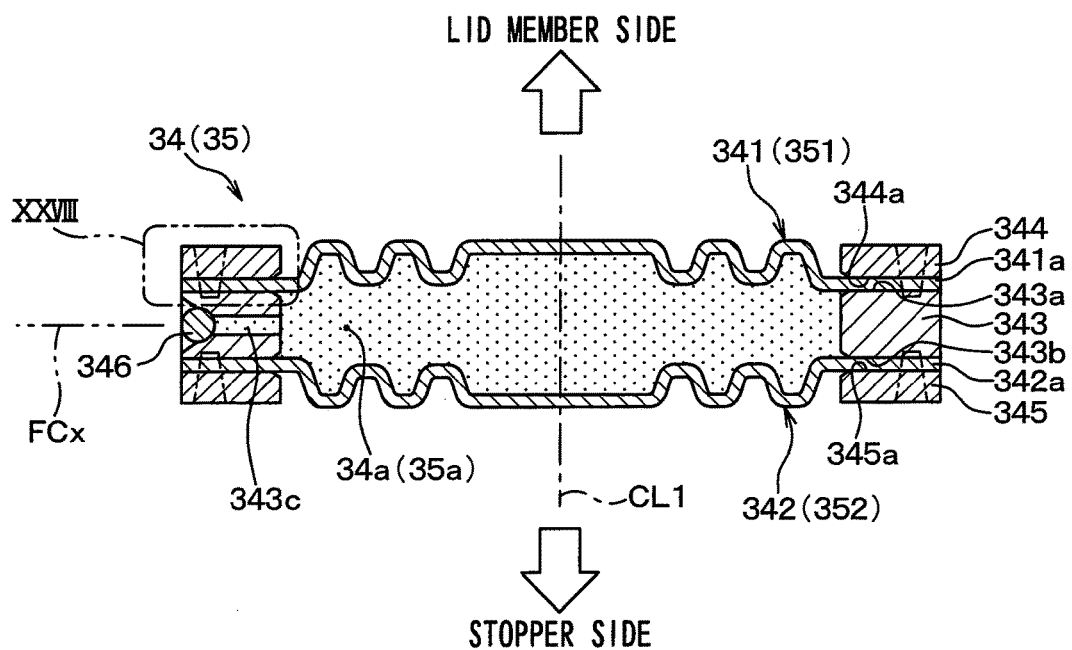
FIG. 24 is a cross-sectional view taken along line XXIV-XXIV in FIG. 23.

As illustrated in FIGS. 23 and 24, the first power element 34 includes the first diaphragm 341 and the second diaphragm 342 which have a disc shape, an annular interposing member 343, and a first collar 344 and a second collar 345 which are flat plates and have an annular shape. FIG. 23 is a top view of the first power element 34 when viewed in the direction of the uniaxial center CL1. FIG. 24 is a cross-sectional view taken along line XXIV-XXIV in FIG. 23.

The first diaphragm 341 and the second diaphragm 342 are configured to include a thin spring member, and are stacked in the direction of the uniaxial center CL1. The first diaphragm 341 and the second diaphragm 342 respectively expand outward in the direction of the uniaxial center CL1, in accordance with a pressure difference between an internal pressure of the first power element 34 and a pressure inside the accommodating space 44 (refer to FIG. 22). The first power element 34 withstands a pressing force applied from the coil spring 325. In short, each central portion of the first diaphragm 341 and the second diaphragm 342 is displaced in accordance with the pressure difference. The accommodating space 44 illustrated in FIG. 22 communicates the second refrigerant passage 38 so that the temperature and the pressure inside the accommodating space 44 are equal to those inside the second refrigerant passage 38 even if the valve mechanism 32 is located at any stroke position.

As illustrated in FIG. 24, the interposing member 343 is interposed between the first diaphragm 341 and the second diaphragm 342 in the direction of the uniaxial center CL1. Therefore, in the first power element 34, a first closed space 34a provided by being surrounded with the first diaphragm 341, the second diaphragm 342, and the interposing member 343 is disposed between the first diaphragm 341 and the second diaphragm 342. That is, the interposing member 343 provides the first closed space 34a by being joined to the first diaphragm 341 and the second diaphragm 342, respectively. The first closed space 34a is a temperature-sensing chamber of the first power element 34 for sensing a refrigerant temperature in the second refrigerant passage 38, and corresponds to a fluid enclosing space according to this disclosure.

The interposing member 343 has a first contact surface 343a having an annular shape, and is in contact with a peripheral edge portion 341a included in the first diaphragm 341, on the first contact surface 343a. On the other hand, the interposing member 343 has a second contact surface 343b having an annular shape on a side of the second contact surface 343b opposite to the first contact surface 343a in the direction of the uniaxial center CL1, and is in contact with a peripheral edge portion 342a included in the second diaphragm 342, on the second contact surface 343b.

The interposing member 343 has a fluid introduction path 343c provided for introducing a first fluid into the first closed space 34a. For example, the first fluid is a fluid in which a refrigerant of the same type as the refrigerant flowing in the second refrigerant passage 38 and inert gas are mixed with each other. That is, the first power element 34 is a normal charge element.

Specifically, a thin through-hole penetrating in the radial direction of the interposing member 343 is provided as the fluid introduction path 343c in the interposing member 343. The fluid introduction path 343c is closed by a plug 346 after the above-described first fluid is introduced into the closed space 34a. That is, the first fluid is enclosed inside the closed space 34a.

Therefore, as the temperature of the first fluid rises, the internal pressure of the first closed space 34a increases, and the first diaphragms 341 and the second diaphragms 342 respectively expand outward in the direction of the uniaxial center CL1, thereby causing the first power element 34 to expand in the direction of the uniaxial center CL1. The temperature inside the accommodating space 44 is transferred to the first fluid inside the first closed space 34a, and the temperature of the first fluid becomes coincident with the temperature inside the accommodating space 44. The pressure inside the accommodating space 44 becomes a reaction force acting against the pressure of the first fluid, that is, a reaction force acting against the internal pressure of the first power element 34.

The first collar 344 is arranged on a side of the first diaphragm 341 opposite to the interposing member 343 in the direction of the uniaxial center CL1. The first collar 344 has a first collar contact surface 344a, and is in contact with the peripheral edge portion 341a of the first diaphragm 341, on the first collar contact surface 344a. That is, the peripheral edge portion 341a of the first diaphragm 341 is pinched by the first collar contact surface 344a and the first contact surface 343a of the interposing member 343. The first collar 344 corresponds to a collar according to this disclosure, and the first collar contact surface 344a corresponds to a collar contact surface according to this disclosure.

The second collar 345 is arranged on a side of the second diaphragm 342 opposite to the interposing member 343 in the direction of the uniaxial center CL1. The second collar 345 has a second collar contact surface 345a, and is in contact with the peripheral edge portion 342a of the second diaphragm 342, on the second collar contact surface 345a. That is, the peripheral edge portion 342a of the second diaphragm 342 is pinched by the second collar contact surface 345a and the second contact surface 343b of the interposing member 343.

As illustrated in FIG. 24, an outer shape of the first power element 34 configured as described above is a symmetrical shape with respect to a virtual plane FCx which passes through the center of the first power element 34 and which is orthogonal to the uniaxial center CL1.

Figure 25:
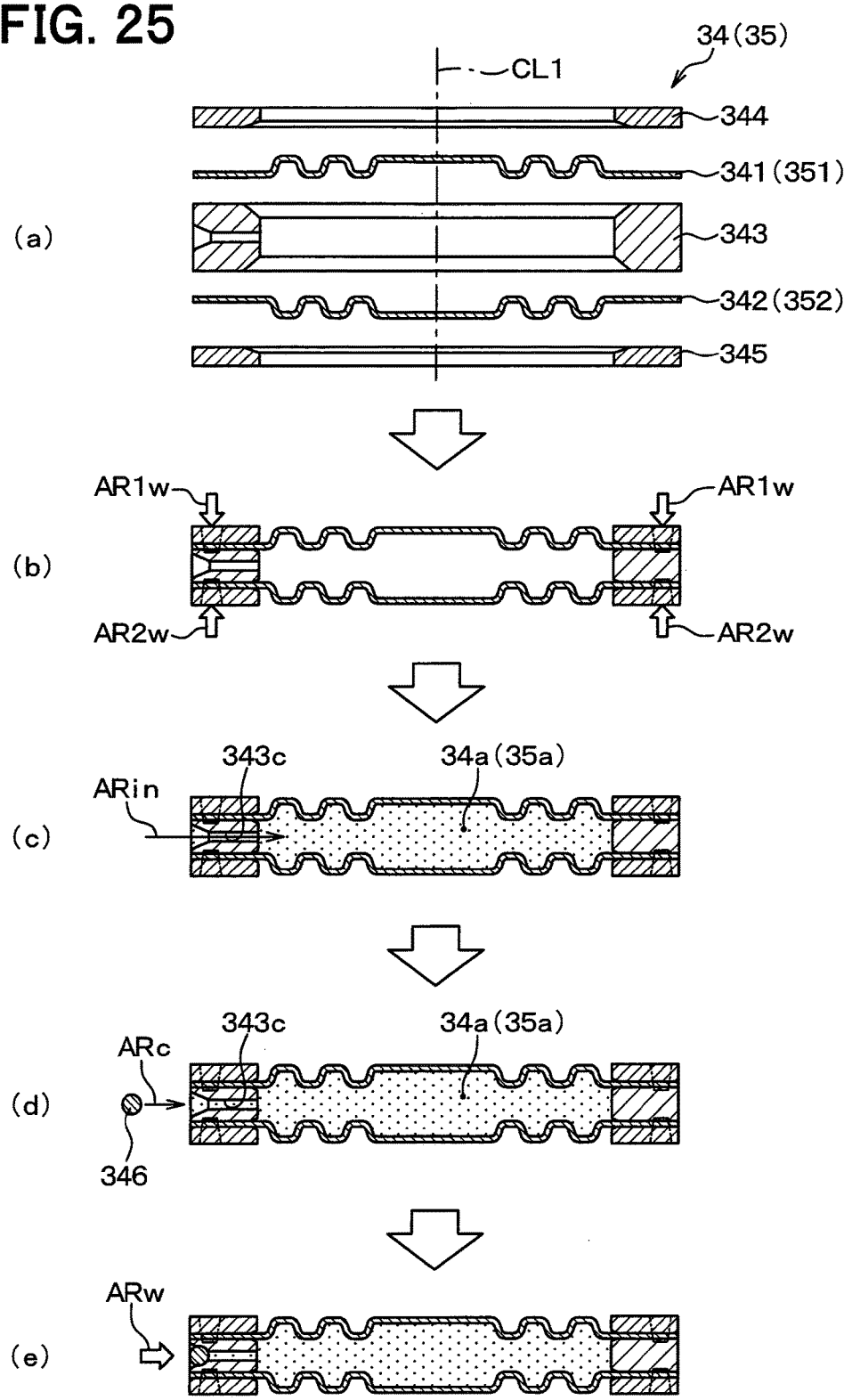
FIG. 25 is a view for describing a manufacturing process of the first power element 34 illustrated in FIGS. 23 and 24.

Next, a manufacturing process of the first power element 34 will be described with reference to FIG. 25. In FIG. 25, the manufacturing process sequentially proceeds from a state illustrated in (a) to a state illustrated in (e).

First, as illustrated in FIG. 25(a), the first collar 344, the first diaphragm 341, the interposing member 343, the second diaphragm 342, and the second collar 345 are sequentially stacked in the direction of the uniaxial center CL1.

Next, as illustrated by two arrows AR1w in FIG. 25(b), the first collar 344 and the interposing member 343 which pinch the first diaphragm 341 are welded using a laser, for example, over the entire circumference in the circumferential direction of the uniaxial center CL1. At the same time, as illustrated by two arrows AR2w, the second collar 345 and the interposing member 343 which pinch the second diaphragm 342 are welded using a laser, for example, over the entire circumference in the circumferential direction of the uniaxial center CL1. The laser welding is performed in an air-tight manner.

The laser-welded portions are illustrated by a two-dot chain line in FIG. 25 and in FIG. 24 described above. As is understood from FIG. 24, the first contact surface 343a of the interposing member 343 is joined to an outer side of the first diaphragm 341 by means of laser welding, and the outer side of the first diaphragm 341 is outward of an inner peripheral end 343d (refer to FIG. 28) of the first contact surface 343a in the radial direction of the uniaxial center CL1. The first collar 344 is joined to an outer side of the first diaphragm 341 by means of laser welding outward of an inner peripheral end 344b (refer to FIG. 28) of the first collar contact surface 344a in the radial direction of the uniaxial center CL1. Similarly to the first diaphragm 341, the interposing member 343 and the second collar 345 are also joined to the second diaphragm 342 by means of laser welding.

Next, as illustrated by an arrow ARin in FIG. 25(c), the first fluid including the refrigerant and the inert gas is introduced into the first closed space 34a from the fluid introduction path 343c.

Next, as illustrated by an arrow ARc in FIG. 25(d), after the above-described first fluid is introduced into the first closed space 34a, the fluid introduction path 343c is closed by the plug 346. As illustrated by an arrow ARw in FIG. 25(e), in a state where the fluid introduction path 343c is closed, the plug 346 is joined to an opening portion of the fluid introduction path 343c by means of projection welding, for example. The fluid introduction path 343c is closed in this way, thereby causing the first closed space 34a to serve as a fluid enclosing space having the above-described first fluid enclosed therein.

The second power element 35 illustrated in FIG. 22 is the same as the above-described first power element 34, except for a fluid enclosed therein. However, in order to clarify the following description of the second power element 35, a diaphragm corresponding to the first diaphragm 341 is referred to as a third diaphragm 351, and a diaphragm corresponding to the second diaphragm 342 is referred to as a fourth diaphragm 352. A closed space corresponding to the first closed space 34a is referred to as a second closed space 35a. In FIGS. 24 and 25, the reference numerals 35, 351, 352, and 35a are illustrated in parentheses.

The second closed space 35a provided in the second power element 35, that is, a temperature-sensing chamber of the second power element 35 has the second fluid enclosed therein, which is obtained by mixing a refrigerant different from the refrigerant included in the first fluid with inert gas. In detail, the refrigerant included in the first fluid and the refrigerant included in the second fluid are different from each other in saturation temperature characteristics which indicate a relationship between a saturation vapor pressure and a saturation temperature. Both of the respective refrigerants included in the first fluid and the second fluid are gas-liquid two-phase refrigerants.

For example, according to the saturation temperature characteristics of the refrigerant included in the second fluid, a variation amount of the saturation vapor pressure with respect to a change in the saturation temperature is smaller than that of the refrigerant flowing in the second refrigerant passage 38. That is, the second power element 35 is a cross charge element.

The second power element 35 has a second fluid enclosed therein. Accordingly, as the temperature of the second fluid rises, the internal pressure of the second closed space 35a increases, and the second power element 35 expands in the direction of the uniaxial center CL1. As illustrated in FIG. 22, the third diaphragm 351 of the second power element 35 faces and is in contact with the second diaphragm 342 of the first power element 34 in the direction of the uniaxial center CL1.

Figure 26:
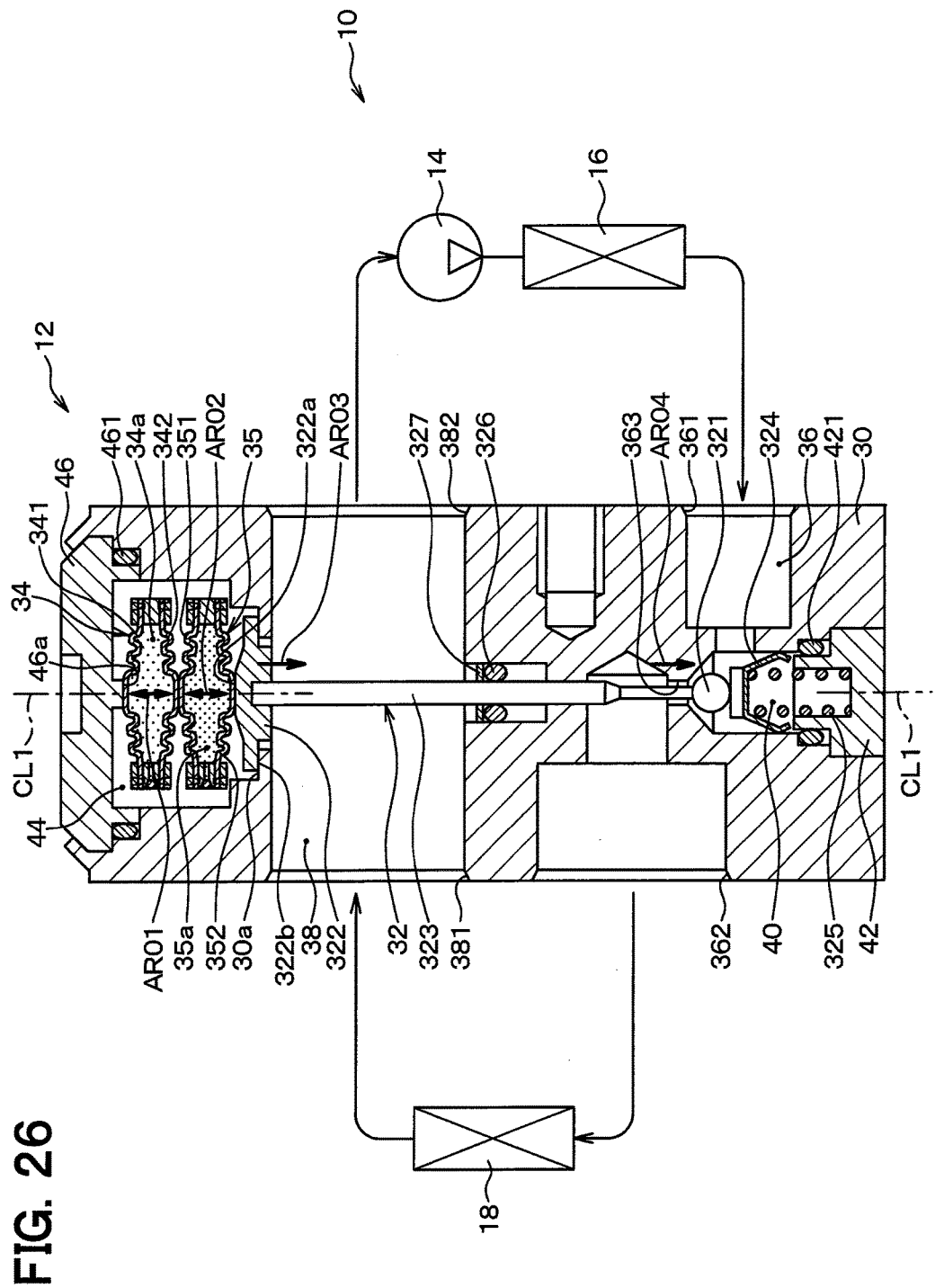
FIG. 26 is a cross-sectional view of the temperature type expansion valve 12 in FIG. 23, and is a view illustrating a state where the valve mechanism 32 maximizes a refrigerant passage area of the throttle passage 363, that is, a fully open state of the first refrigerant passage 36.

Next, an operation of the valve mechanism 32 and the first power element 34 will be described with reference to FIG. 26. FIG. 26 illustrates a state where the valve mechanism 32 maximizes a refrigerant passage area of the throttle passage 363, that is, a fully open state of the first refrigerant passage 36.

In the expansion valve 12, if the temperature of the refrigerant flowing in the second refrigerant passage 38 rises, the temperature inside the accommodating space 44, the temperature of the first fluid enclosed inside the first closed space 34a, and the temperature of the second fluid enclosed inside the second closed space 35a also accordingly rise, thereby increasing the internal pressure of the first closed space 34a and the second closed space 35a, respectively. If expansion forces of the first power element 34 and the second power element 35 which are generated due to the internal pressure prevail against a reaction force generated by the coil spring 325, the first power element 34 and the second power element 35 expand in the direction of the uniaxial center CL1 as illustrated by arrows AR01 and AR02 in FIG. 26. In detail, the first diaphragm 341 and the second diaphragm 342 in the first power element 34 respectively expand outward in the direction of the uniaxial center CL1, and the third diaphragm 351 and the fourth diaphragm 352 in the second power element 35 respectively expand outward in the direction of the uniaxial center CL1.

If the first power element 34 and the second power element 35 expand as illustrated by arrows AR01 and AR02, the stopper 322 and the actuating bar 323 are pressed by the fourth diaphragm 352, and are moved as illustrated by an arrow AR03. At the same time, the spherical valve 321 is pressed by the actuating bar 323, and is moved as illustrated by an arrow AR04. That is, the spherical valve 321 opens the throttle passage 363. A valve opening degree of the temperature type expansion valve 12 is controlled by a balance between a load applied when the first power element 34 presses the spherical valve 321 and a load applied when the coil spring 325 presses the spherical valve 321.

In this case, the first diaphragm 341 of the first power element 34 is pressed against the contact surface 46a of the lid member 46. Accordingly, the second diaphragm 342 is displaced in the direction of the uniaxial center CL1 with respect to the contact surface 46a, and the second diaphragm 342 displaces the second power element 35 in the direction of the uniaxial center CL1. Furthermore, the third diaphragm 351 of the second power element 35 displaces the fourth diaphragm 352 in the direction of the uniaxial center CL1 with respect to the second diaphragm 342, and the fourth diaphragm 352 displaces the actuating bar 323 in the direction of the uniaxial center CL1.

Therefore, a total of an expansion amount of the first power element 34 which is obtained by the first diaphragm 341 and the second diaphragm 342 respectively expanding outward in the direction of the uniaxial center CL1 and an expansion amount of the second power element 35 which is obtained by the third diaphragm 351 and the fourth diaphragm 352 respectively expanding outward in the direction of the uniaxial center CL1 becomes a stroke amount of the actuating bar 323. That is, the valve mechanism 32 controls a flow rate of the refrigerant in the first refrigerant passage 36 in accordance with the total of the expansion amount of the first power element 34 and the expansion amount of the second power element 35.

If the stopper 322 is moved in the direction of the arrow AR03, a stopper surface 322b provided on a side of the stopper 322 opposite to the first power element 34 in the direction of the uniaxial center CL1 collides with a collision surface 30a of the body unit 30 which faces the stopper surface 322b. FIG. 26 illustrates a state where the stopper surface 322b collides with the collision surface 30a. That is, the first refrigerant passage 36 is in a fully open state, when the stopper surface 322b collides with the collision surface 30a.

As described above, according to this embodiment, the first power element 34 has the first fluid sealed therein, and the second power element 35 has the second fluid sealed therein which is different from the first fluid. The valve mechanism 32 controls the refrigerant flow rate in the first refrigerant passage 36 in accordance with the expansion of both the first power element 34 and the second power element 35 in the axial direction of the uniaxial center CL1. Therefore, the flow rate control characteristic of the valve mechanism 32 has, as a whole, an intermediate value between a first flow rate control characteristic of only the first power element 34 having the first fluid sealed therein and a second flow rate control characteristic of only the second power element 35 having the second fluid sealed therein. Accordingly, the flow rate control characteristics of the valve mechanism 32 can be more easily obtained as intended. These characteristics will be described in detail with reference to FIG. 27.

Figure 27:
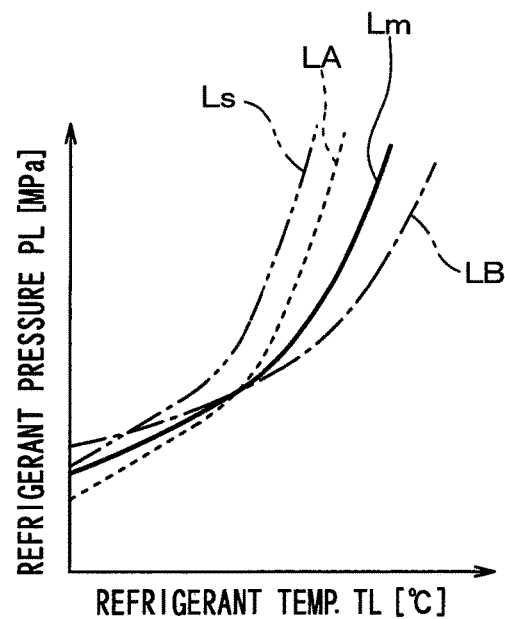
FIG. 27 is a view illustrating a flow rate control characteristic in the temperature type expansion valve 12 of FIG. 22 in which a horizontal axis represents a refrigerant temperature TL of a second refrigerant passage 38 and a vertical axis represents a refrigerant pressure PL of the second refrigerant passage 38.

FIG. 27 is a view illustrating the flow rate control characteristics in which a horizontal axis represents a refrigerant temperature TL of the second refrigerant passage 38 and a vertical axis represents a refrigerant pressure PL of the second refrigerant passage 38. The flow rate control characteristics indicate a relationship between the refrigerant pressure PL and the refrigerant temperature TL of the second refrigerant passage 38, which serves as a boundary to determine whether or not the valve mechanism 32 opens the first refrigerant passage 36. That is, if the actual refrigerant pressure PL of the second refrigerant passage 38 is lower than a pressure obtained from the flow rate control characteristics, the first refrigerant passage 36 is closed. In contrast, if the actual refrigerant pressure PL is beyond the pressure obtained from the flow rate control characteristics, the first refrigerant passage 36 enables the refrigerant to flow therein.

A two-dot chain line Ls illustrated in FIG. 27 represents a saturation temperature characteristic of the refrigerant in the second refrigerant passage 38. A solid line Lm represents a flow rate control characteristic of the valve mechanism 32 according to this embodiment. A broken line LA represents a flow rate control characteristic of the valve mechanism 32 when it is assumed that the first fluid instead of the second fluid is enclosed in the second power element 35, that is, represents a first flow rate control characteristic. That is, the first flow rate control characteristic illustrated by the broken line LA is a characteristic when it is assumed that the first fluid is enclosed in both the first power element 34 and the second power element 35.

A one-dot chain line LB represents a flow rate control characteristic of the valve mechanism 32 when it is assumed that the second fluid instead of the first fluid is enclosed in the first power element 34, that is, represents a second flow rate control characteristic. That is, the second flow rate control characteristic illustrated by the one-dot chain line LB is a characteristic when it is assumed that the second fluid is enclosed in both the first power element 34 and the second power element 35.

In this embodiment, the first power element 34 having the first fluid sealed therein and the second power element 35 having the second fluid sealed therein are arranged in series in the direction of the uniaxial center CL1, and have no different point between the elements except for refrigerants respectively sealed therein. Therefore, the flow rate control characteristic illustrated by the solid line Lm according to this embodiment is a characteristic showing an intermediate slope between the first flow rate control characteristic illustrated by the broken line LA and the second flow rate control characteristic illustrated by the one-dot chain line LB. Therefore, the flow rate control characteristic illustrated by the solid line Lm can be set to have a desired gradient by optionally selecting any one or both of the first fluid and the second fluid.

Multiple types of refrigerants are not mixed in one space unlike PTL 1 described above. Accordingly, as illustrated by the solid line Lm in FIG. 27, a flow rate control characteristic in which the first flow rate control characteristic and the second flow rate control characteristic are averaged can be obtained. Therefore, a smooth flow rate control characteristic can be obtained which has no inflection point where a curve representing the characteristic is bent except for a maximum operating pressure (MOP). Therefore, the valve mechanism 32 can be stably controlled.

If multiple types of refrigerants are intended to be enclosed in one power element in order to obtain a desired flow rate control characteristic, it would be necessary to cause the refrigerants to be sequentially enclosed therein using a predetermined weight and pressure in the order from the refrigerant which is less likely to evaporate. Consequently, the manufacturing process would become complicated. If a rate of the enclosed refrigerants varies, a flow rate control characteristic which can be obtained would also vary. In contrast, according to this embodiment, a flow rate control characteristic can be optionally obtained by combining the power elements 34 and 35 having a single refrigerant and inert gas sealed therein. Therefore, the manufacturing process can be simplified.

According to this embodiment, the first contact surface 343a of the interposing member 343 is joined to the outer side of the first diaphragm 341 outward of the inner peripheral end 343d (refer to FIG. 28) of the first contact surface 343a in the radial direction of the uniaxial center CL1. At the same time, the first collar 344 is joined to the outer side of the first diaphragm 341 by means of laser welding outward of the inner peripheral end 344b (refer to FIG. 28) of the first collar contact surface 344a in the radial direction of the uniaxial center CL1.

Figure 28:
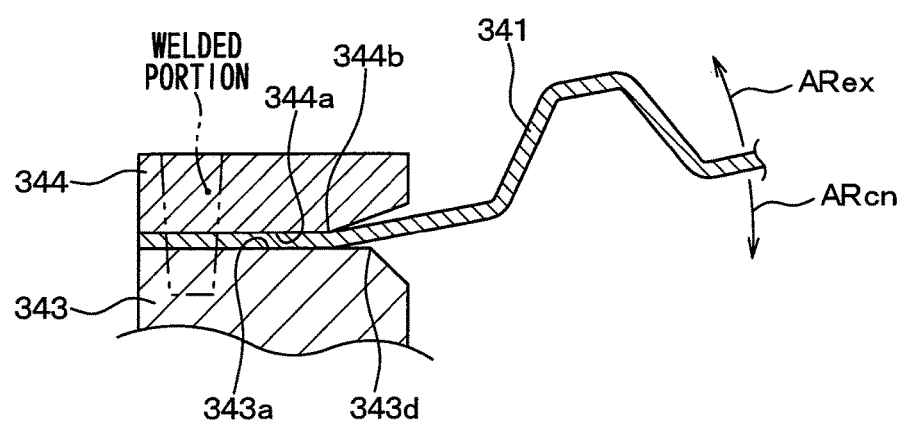
FIG. 28 is an enlarged cross-sectional view illustrating an enlarged portion XXVIII in FIG. 24.

For example, when the first diaphragm 341 expands outward in the direction of the uniaxial center CL1 in FIG. 28 in which a portion VII in FIG. 24 is enlarged, the first diaphragm 341 is bent in a direction of an arrow ARex using the inner peripheral end 344b of the first collar contact surface 344a as a fulcrum. On the other hand, when the first diaphragm 341 contracts inward in the direction of the uniaxial center CL1, the first diaphragm 341 is bent in a direction of an arrow ARcn using the inner peripheral end 343d of the first contact surface 343a as a fulcrum.

That is, when the first diaphragm 341 is deformed, the first diaphragm 341 is bent using a position deviated from the welded and joined portion of the first diaphragm 341 as a fulcrum. Accordingly, a stress concentration point during the deformation of the first diaphragm 341 is separated from the above-described joined portion. Therefore, the durability of the first diaphragm 341 can be improved.

Similarly to the joining configuration of the first diaphragm 341, the second diaphragm 342 is also pinched by and joined to the interposing member 343 and the second collar 345. Accordingly, similarly to the first diaphragm 341, the durability of the second diaphragm 342 can also be improved. This advantageous effect is similarly achieved by the respective diaphragms 351 and 352 of the second power element 35.

According to this embodiment, the interposing member 343 has the fluid introduction path 343c to introduce the first fluid into the first closed space 34a. Accordingly, it is not necessary to provide both the first diaphragm 341 and the second diaphragm 342 with a communication hole corresponding to the fluid introduction path 343c. Therefore, the fluid introduction path 343c is easily closed so as to prevent the first fluid from leaking out.

According to this embodiment, the first power element 34 has the symmetrical outer shape with respect to the virtual plane FCx illustrated in FIG. 24. Accordingly, limitations in an assembling direction of the first power element 34 along the direction of the uniaxial center CL1 can be eliminated. Commonization between the respective diaphragms 341 and 342 and commonization between the respective collars 344 and 345 can be achieved. This advantageous effect is similarly achieved by the second power element 35.

Furthermore, the first power element 34 and the second power element 35 are the same as each other except for the fluids sealed therein. Accordingly, an arrangement order in the direction of the uniaxial center CL1 can be conversely changed. Limitations on the assembling order of the first power element 34 and the second power element 35 can be eliminated.

According to this embodiment, the first power element 34 and the second power element 35 are arranged in series in an expanding direction in which both of these expand. Accordingly, both expansion amounts of the first power element 34 and the second power element 35 can be used in operating the spherical valve 321. Therefore, both the power elements 34 and 35 can be miniaturized while an operation amount of the spherical valve 321 is sufficiently ensured.

According to this embodiment, the first power element 34 and the second power element 35 are accommodated inside the body unit 30 by being isolated from the outer space of the expansion valve 12. Accordingly, waterproofing can be easily conducted between the expansion valve 12 and a member to be arranged adjacent to the expansion valve 12.

An advantageous effect is obtained in that the operation of the first power element 34 and the operation of the second power element 35 are less likely to be affected by the outside air temperature around the expansion valve 12. The lid member 46 which isolates the first power element 34 and the second power element 35 from the outer space of the expansion valve 12 is made of a resin. Therefore, compared to a case where the lid member 46 is made of metal, the respective operations of the power elements 34 and 35 are further less likely to be affected by the outside air temperature.

According to this embodiment, in the first power element 34, the interposing member 343 is interposed between the first diaphragm 341 and the second diaphragm 342, thereby providing the closed space 34a between the first diaphragm 341 and the second diaphragm 342. Accordingly, a size of the closed space 34a can be optionally determined in accordance with a shape such as the thickness of the interposing member 342. Therefore, limitations on the size of the closed space 34a due to the shape of the first diaphragm 341 and the second diaphragm 342 can be reduced. This advantageous effect is similarly achieved by the second power element 35.

(Ninth Embodiment)

Next, a ninth embodiment of this disclosure will be described. In this embodiment, points which are different from those in the above-described eighth embodiment will be mainly described. Elements which are the same as or equivalent to those in the above-described embodiment will be omitted or simplified in the description. The omission or the simplification is similarly applied to embodiments subsequent to a tenth embodiment to be described later.

Figure 29:
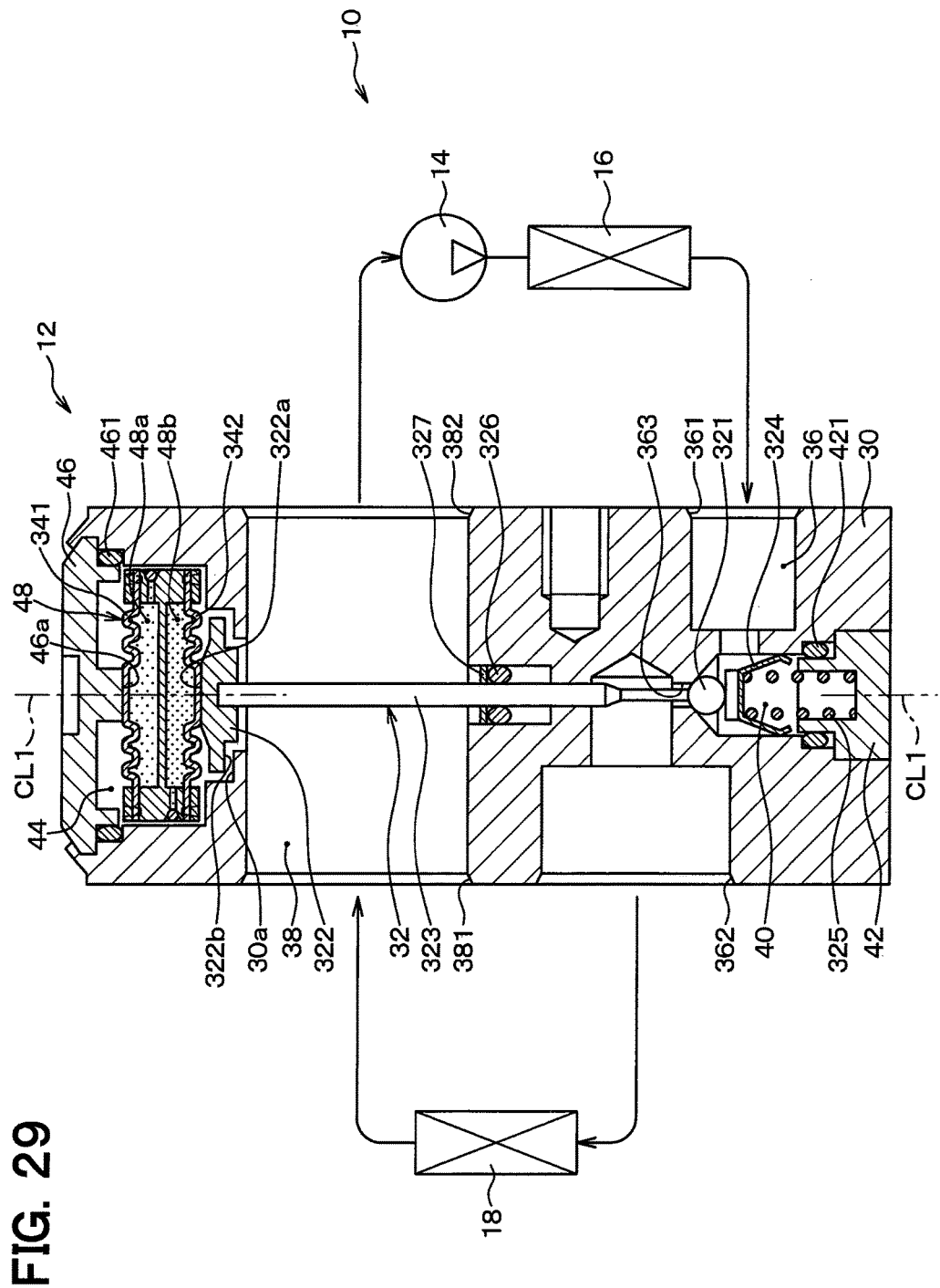
FIG. 29 is a cross-sectional view of the temperature type expansion valve 12 according to a ninth embodiment.

FIG. 29 is a cross-sectional view of a temperature type expansion valve 12 according to this embodiment. As illustrated in FIG. 29, the temperature type expansion valve 12 according to this embodiment is different from the temperature type expansion valve 12 according to the eighth embodiment in that only one power element 48 is provided. However, a power element 48 in FIG. 29 is different from the first power element 34 according to the eighth embodiment in that two independent closed spaces 48a and 48b, that is, temperature-sensing chambers 48a and 48b are provided. With regard to the power element 48 according to this embodiment, points different from those of the first power element 34 according to the eighth embodiment will be mainly described with reference to FIGS. 30 and 31.

Figure 30:
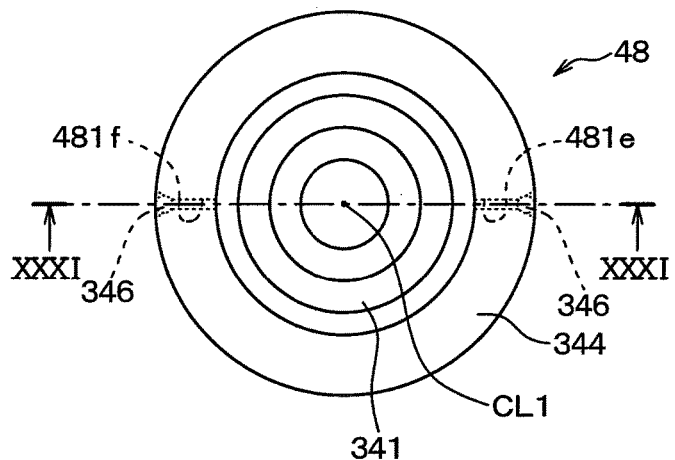
FIG. 30 is a top view of a power element 48 illustrated in FIG. 28, when viewed in the direction of the uniaxial center CL1.
Figure 31:
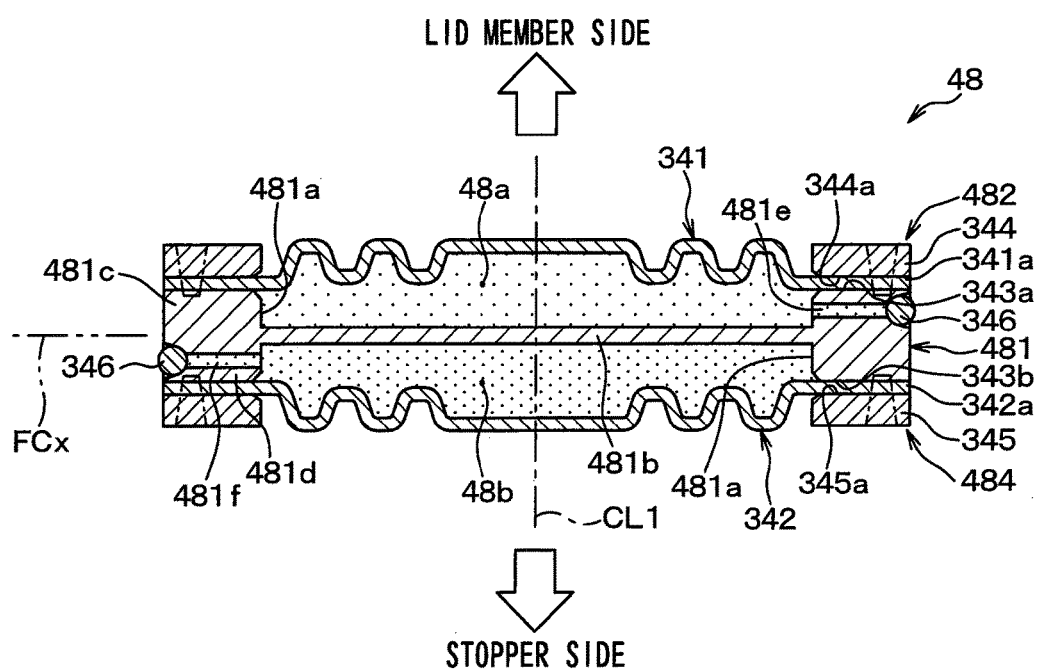
FIG. 31 is a cross-sectional view taken along line XXXI-XXXI in FIG. 30.

FIG. 30 is a top view of the power element 48 according to this embodiment when viewed in a direction of a uniaxial center CL1. FIG. 31 is a cross-sectional view taken along line XXXI-XXXI in FIG. 30. As illustrated in FIGS. 30 and 31, the power element 48 includes an interposing member 481 instead of the interposing member 343 according to the eighth embodiment.

A partition wall 481b which partitions a hole 481a penetrating the inside of the interposing member 481 in the direction of the uniaxial center CL1 in the direction of the uniaxial center CL1 is disposed in the interposing member 481. Therefore, a first closed space 48a and a second closed space 48b which are arrayed in the direction of the uniaxial center CL1 via the partition wall 481b are provided in the power element 48. The first closed space 48a is a first enclosed space having a first fluid enclosed therein, and the second closed space 48b is a second enclosed space having a second fluid enclosed therein.

In a functional viewpoint, the power element 48 is configured to include a first expansion unit 482 which expands in the direction of the uniaxial center CL1 by the first diaphragm 341 expanding outward, and a second expansion unit 484 which expands in the direction of the uniaxial center CL1 by the second diaphragm 342 expanding outward. The first expansion unit 482 and the second expansion unit 484 share the partition wall 481b, and are adjacent to each other in the direction of the uniaxial center CL1.

As illustrated in FIG. 31, the first expansion unit 482 is configured to include the first diaphragm 341, a first space providing portion 481c, and a first collar 344. The first space providing portion 481c is configured to have a portion on the first diaphragm 341 side of the interposing member 481 with respect to the partition wall 481b. The first space providing portion 481c is joined to the first diaphragm 341, thereby providing the first closed space 48a having the first fluid enclosed therein on the second diaphragm 342 side in the direction of the uniaxial center CL1 with respect to the first diaphragm 341.

The second expansion unit 484 is configured to include the second diaphragm 342, a second space providing portion 481d, and a second collar 345. The second space providing portion 481d is configured to have a portion on the second diaphragm 342 side of the interposing member 481 with respect to the partition wall 481b. That is, the second space providing portion 481d is configured to be integrated with the first space providing portion 481c, and is arranged between the first space providing portion 481c and the second diaphragm 342. The second space providing portion 481d is joined to the second diaphragm 342, thereby providing the second closed space 48b having the second fluid enclosed therein on the first diaphragm 341 side in the direction of the uniaxial center CL1 with respect to the second diaphragm 342.

Similarly to the first power element 34 according to the eighth embodiment, the first expansion unit 482 has a first fluid introduction path 481e provided for introducing the first fluid into the first closed space 48a. The first fluid introduction path 481e is closed by a plug 346.

With regard to the second expansion unit 484, similarly, the second expansion unit 484 has a second fluid introduction path 481f provided for introducing the second fluid into the second closed space 48b. The second fluid introduction path 481f is closed by a plug 346.

Similarly to the first power element 34 according to the eighth embodiment, the power element 48 configured as described above has a symmetrical outer shape with respect to a virtual plane FCx which passes through the center of the power element 48 and which is orthogonal to the uniaxial center CL1.

Figure 32:
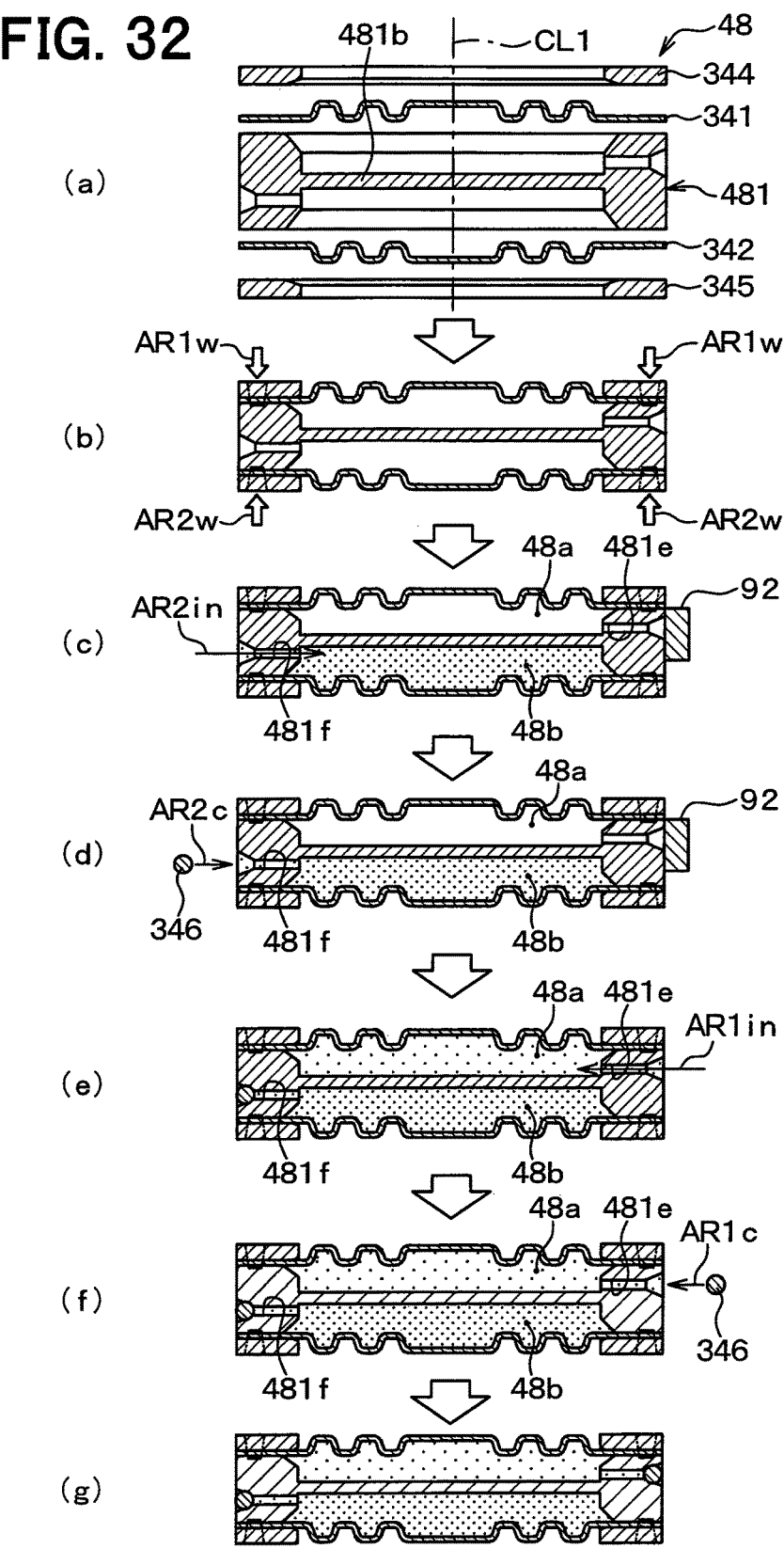
FIG. 32 is a view for describing a manufacturing process of the power element 48 illustrated in FIGS. 30 and 31.

Next, a manufacturing process of the power element 48 will be described with reference to FIG. 32. In FIG. 32, the manufacturing process sequentially proceeds from a state illustrated in (a) to a state illustrated in (g). FIG. 32 is a view corresponding to FIG. 25 according to the eighth embodiment. Processes illustrated in FIGS. 32(a), 32(b), and 32(e) to 32(g) are respectively the same as those in FIGS. 25(a) to 25(e). FIGS. 32(c) and 32(d) illustrate processes added to the processes in FIG. 25. Therefore, FIGS. 32(c) and 32(d) will be described. It is meant that an arrow AR1in in FIG. 32(e) is the same as an arrow ARin in FIG. 25(c), and that an arrow AR1c in FIG. 32(f) is the same as an arrow ARc in FIG. 25(d).

In FIG. 32(c) next to FIG. 32(b), as illustrated by an arrow AR2in, the above-described second fluid is introduced into the second closed space 48b from the second fluid introduction path 481f.

Next, in FIG. 32(d), after the above-described second fluid is introduced into the second closed space 48b as illustrated by an arrow AR2c, the second fluid introduction path 481f is closed by the plug 346. In a state where the second fluid introduction path 481f is closed, the plug 346 is joined to an opening portion of the second fluid introduction path 481f by means of projection welding, for example. The second fluid introduction path 481f is closed in this way, thereby causing the second fluid to be enclosed inside the second closed space 48b. During the process illustrated in FIGS. 32(c) to 32(d), the first fluid introduction path 481e is tentatively closed by using a closing jig 92 as illustrated in FIGS. 32(c) and 32(d).

In the above-described eighth embodiment, a flow rate control characteristic illustrated by a solid line Lm in FIG. 27 is obtained using two power elements 34 and 35. In contrast, according to this embodiment, the first expansion unit 482 corresponding to the first power element 34 and the second expansion unit 484 corresponding to the second power element 35 are integrated with each other, thereby forming one power element 48. In this manner, the flow rate control characteristic illustrated by the solid line Lm in FIG. 27 can be obtained. Therefore, the number of components can be reduced, and the entire length of the expansion valve 12 can be shortened in the direction of the uniaxial center CL1.

(Tenth Embodiment)

Next, a tenth embodiment of this disclosure will be described. In this embodiment, points which are different from those in the above-described ninth embodiment will be mainly described.

Figure 33:
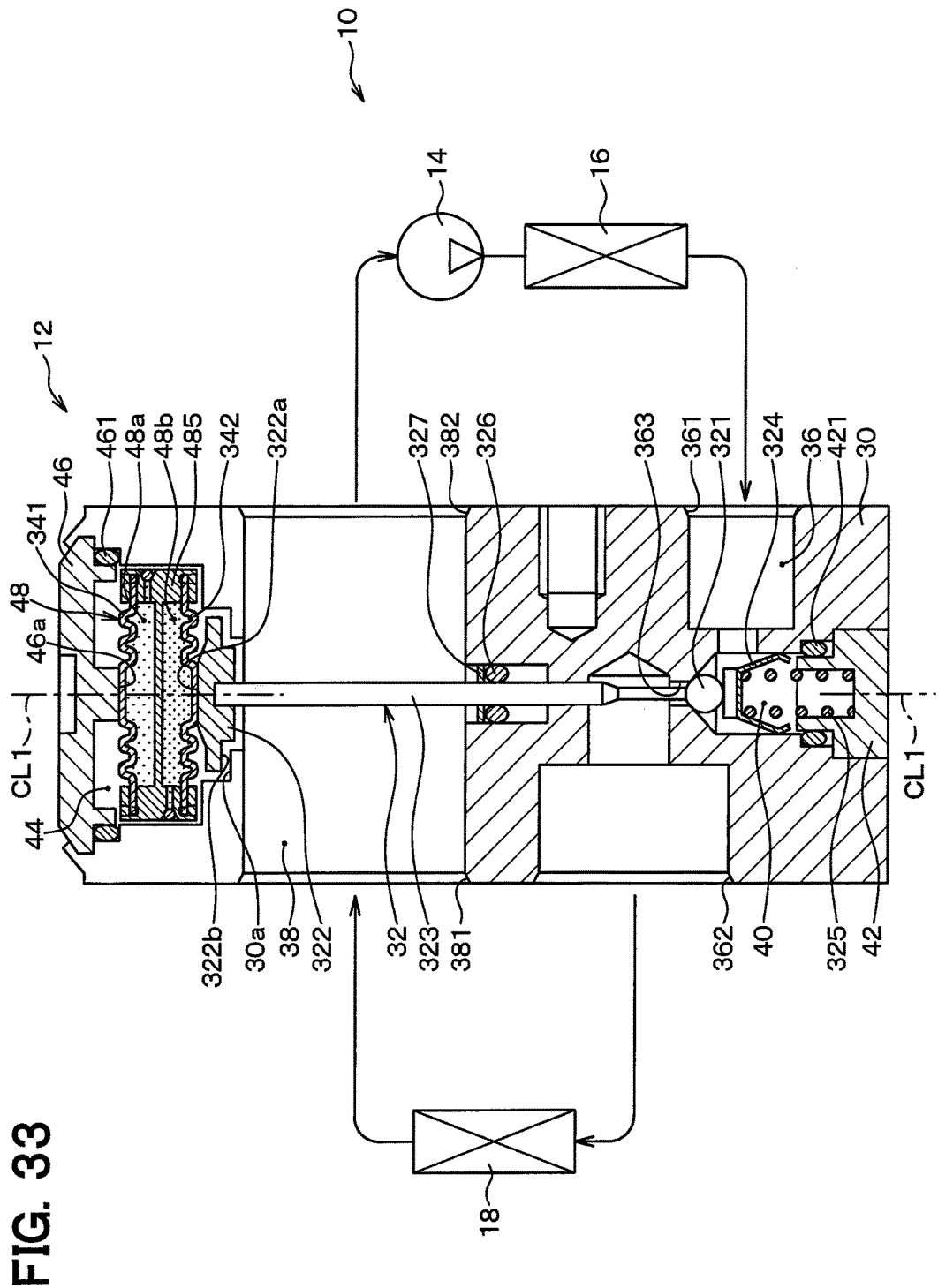
FIG. 33 is a cross-sectional view of the temperature type expansion valve 12 according to a tenth embodiment.

FIG. 33 is a cross-sectional view of a temperature type expansion valve 12 according to this embodiment. As illustrated in FIG. 33, the temperature type expansion valve 12 according to this embodiment has a power element 48 which is different from that of the temperature type expansion valve 12 according to the ninth embodiment. In detail, the power element 48 according to this embodiment has an outer shape which is the same as that of the power element 48 according to the ninth embodiment. However, both of these are different from each other in that a first collar 344 (refer to FIG. 31) and a second collar 345 according to the ninth embodiment are integrated with an interposing member 481 so as to configure one interposing member 485.

Figure 34:
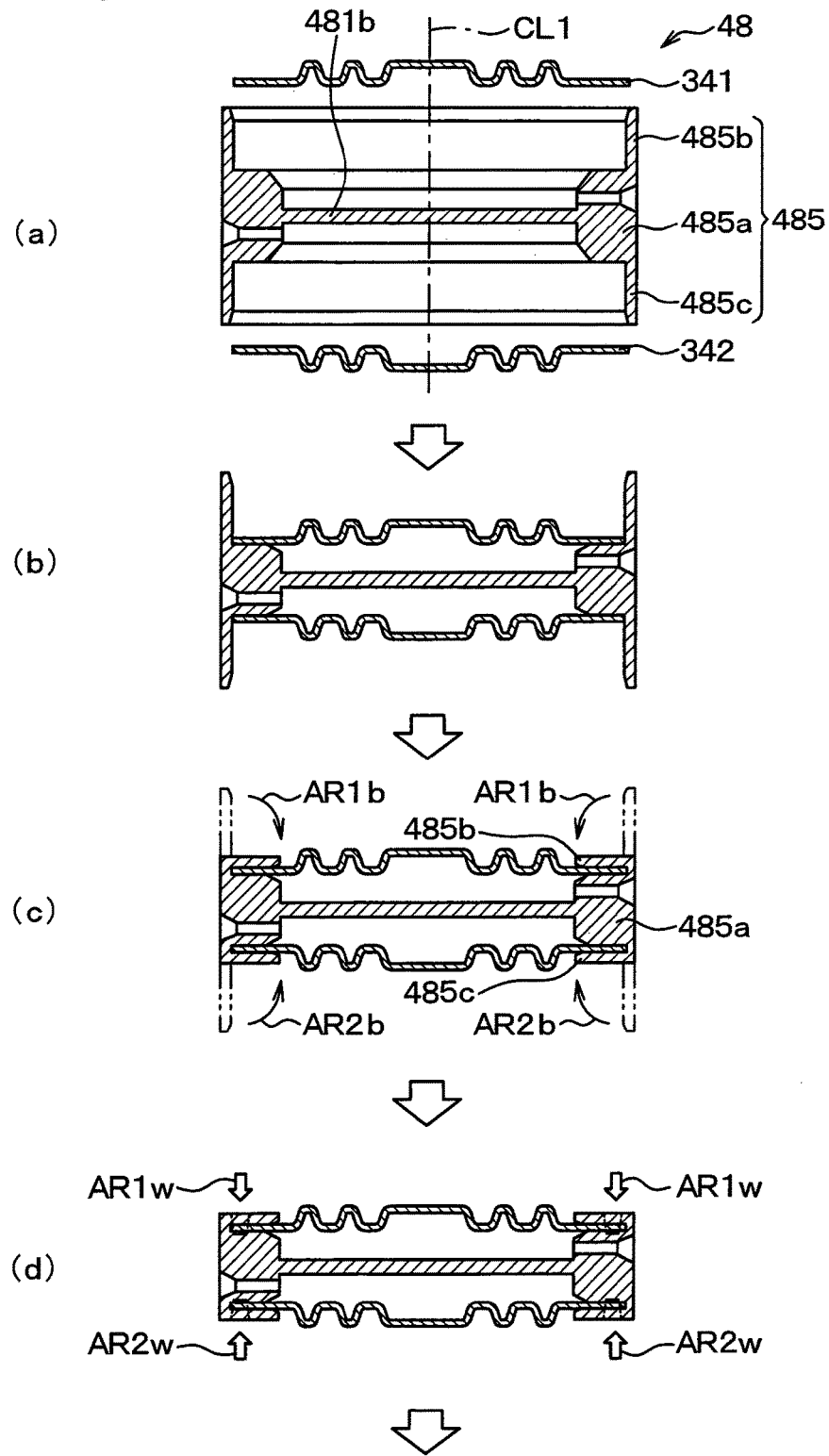
FIG. 34 is a first view for describing a manufacturing process of the power element 48 belonging to the temperature type expansion valve 12 illustrated in FIG. 33.
Figure 35:
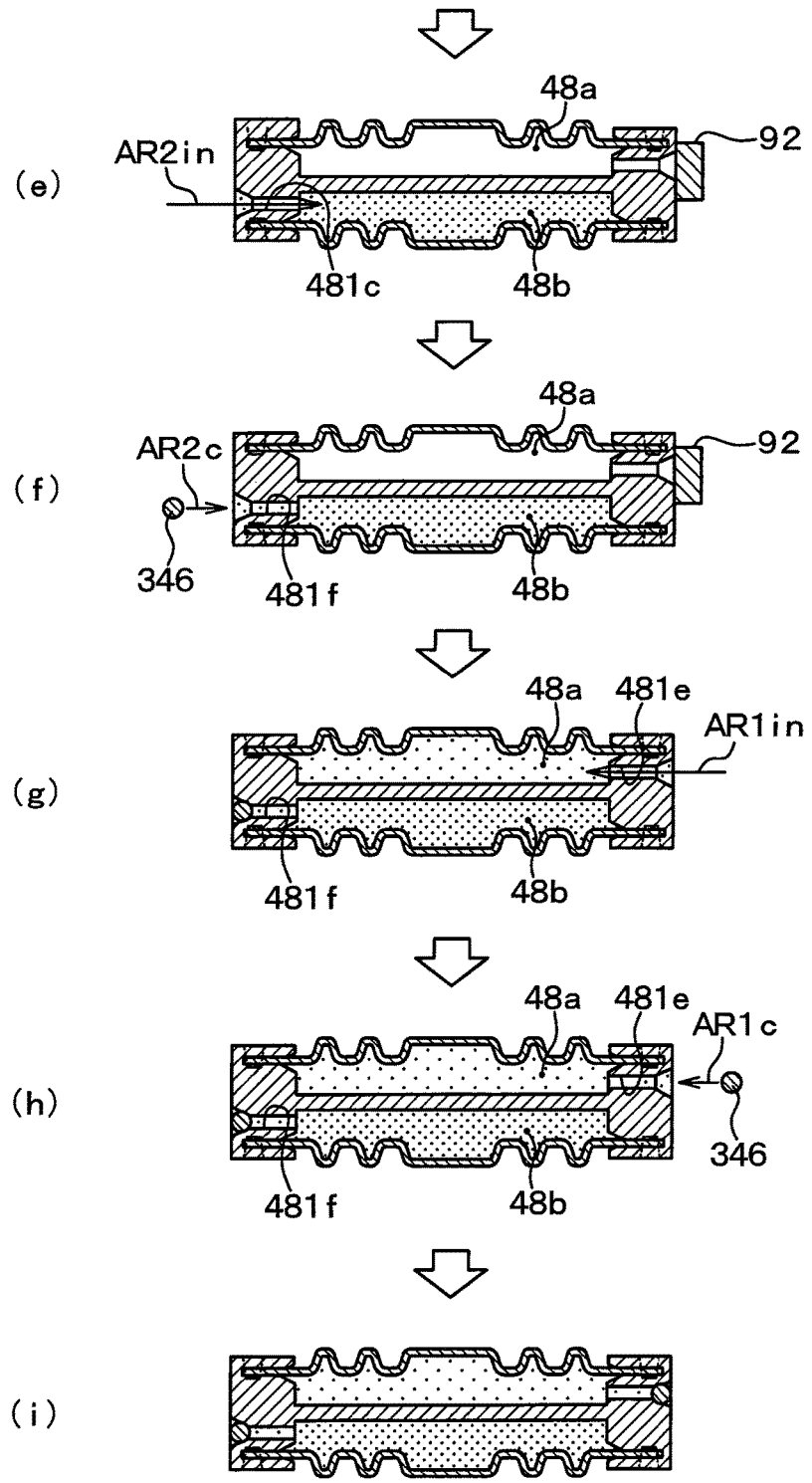
FIG. 35 is a second view for describing a manufacturing process of the power element 48 belonging to the temperature type expansion valve 12 in FIG. 33, and is a view illustrating a manufacturing process subsequent to FIG. 1.

A manufacturing process of the power element 48 according to this embodiment will be described with reference to FIGS. 34 and 35. FIG. 35 is a view illustrating a process subsequent to the process illustrated in FIG. 34. In FIGS. 34 and 35, the manufacturing process sequentially proceeds from a state illustrated in (a) to a state illustrated in (i).

First, as illustrated in FIG. 34(a), a first diaphragm 341, the interposing member 485, and a second diaphragm 342 are stacked in a direction of a uniaxial center CL1. As illustrated in FIG. 34(a), the interposing member 485 is configured to include an interposing portion 485a, a first pinching portion 485b extending from the interposing portion 485a, and a second pinching portion 485c extending from the interposing portion 485a. In FIG. 34(a), the first pinching portion 485b has a cylindrical shape which protrudes from the interposing portion 485a to one side in the direction of the uniaxial center CL1, and has an inner diameter into which the first diaphragm 341 can be fitted. The second pinching portion 485c has a cylindrical shape which protrudes from the interposing portion 485a to the other side in the direction of the uniaxial center CL1, and has an inner diameter into which the second diaphragm 342 can be fitted.

Next, as illustrated in FIG. 34(b), the first diaphragm 341 is fitted into the inner side of the first pinching portion 485b until the first diaphragm 341 comes into contact with the interposing portion 485a. At the same time, the second diaphragm 342 is fitted into the inner side of the second pinching portion 485c until the second diaphragm 342 comes into contact with the interposing portion 485a. In this manner, the interposing portion 485a is interposed between the first diaphragm 341 and the second diaphragm 342.

Next, as illustrated by two arrows AR1b in FIG. 34(c), the first pinching portion 485b is bent radially inward. In this manner, the first pinching portion 485b faces the interposing portion 485a via the first diaphragm 341, and pinches the first diaphragm 341 by using the interposing portion 485a.

Similarly, as illustrated by two arrows AR2b, the second pinching portion 485c is also bent radially inward. In this manner, the second pinching portion 485c faces the interposing portion 485a via the second diaphragm 342, and pinches the second diaphragm 342 by using the interposing portion 485a. According to this configuration, the first pinching portion 485b corresponds to the first collar 344 according to the ninth embodiment, and the second pinching portion 485c corresponds to the second collar 345 according to the ninth embodiment.

Next, processes illustrated in FIGS. 34(d) to 35(i) are sequentially performed. The processes illustrated in FIGS. 34(d) to 35(i) are the same as the processes illustrated in FIGS. 32(b) to 32(g) according to the ninth embodiment.

Figure 36:
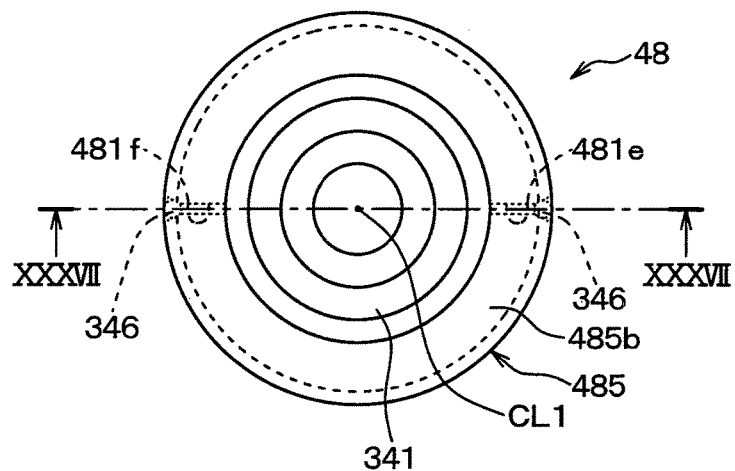
FIG. 36 is a top view of the power element 48 illustrated in FIG. 33, when viewed in the direction of the uniaxial center CL1.
Figure 37:
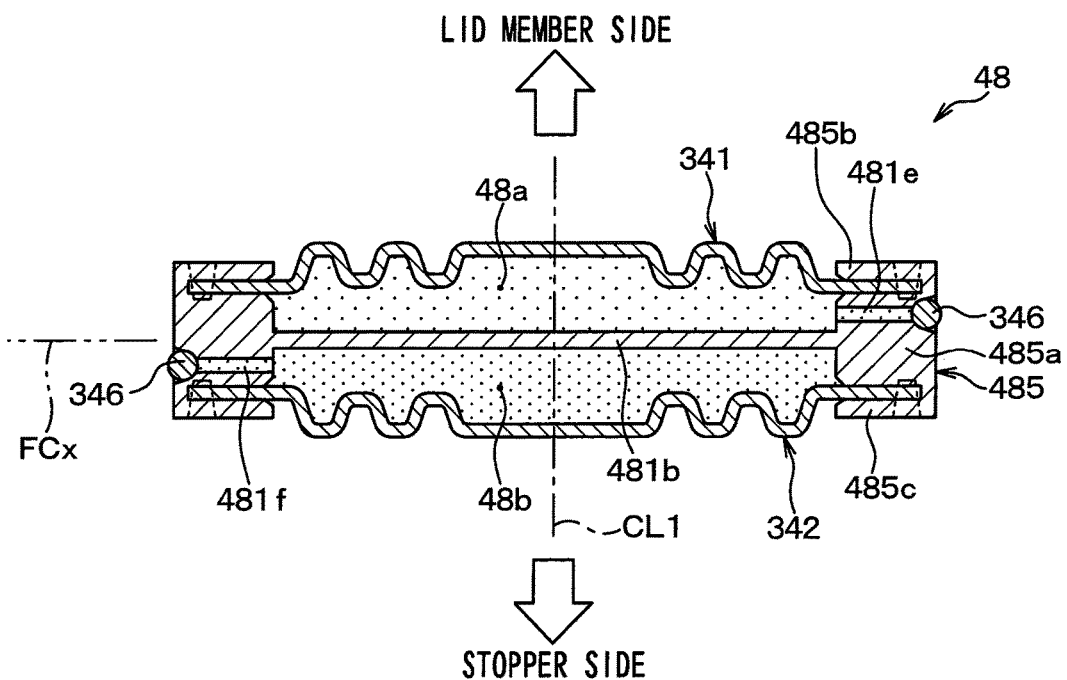
FIG. 37 is a cross-sectional view taken along line XXXVII-XXXVII in FIG. 36.

FIGS. 36 and 37 illustrate the power element 48 which is manufactured through the processes illustrated in FIGS. 34(a) to 35(i). FIG. 36 is a top view of the power element 48 according to this embodiment when viewed in the direction of the uniaxial center CL1. FIG. 37 is a cross-sectional view taken along line XXXVII-XXXVII in FIG. 36.

As illustrated in FIGS. 36 and 37, the power element 48 according to this embodiment has the outer shape which is the same as that according to the ninth embodiment. This embodiment is the same as the ninth embodiment except for the power element 48. Accordingly, advantageous effects which are the same as those according to the ninth embodiment can be achieved.

According to this embodiment, the interposing member 485 is configured to include the interposing portion 485a, the first pinching portion 485b, and the second pinching portion 485c. Accordingly, the first collar 344 and the second collar 345 according to the above-described ninth embodiment can be eliminated.

According to this embodiment, as illustrated in FIG. 34(b), the first diaphragm 341 is fitted into the inner side of the first pinching portion 485b. Accordingly, an advantageous effect is obtained in that when the first diaphragm 341 and the interposing member 485 are joined to each other, both of these are easily prevented from being misaligned with each other. This advantageous effect is similarly obtained between the second diaphragm 342 and the interposing member 485.

This embodiment can also be combined with the above-described eighth embodiment.

(Eleventh Embodiment)

Next, an eleventh embodiment of this disclosure will be described. In this embodiment, points which are different from those in the above-described ninth embodiment will be mainly described.

Figure 38:
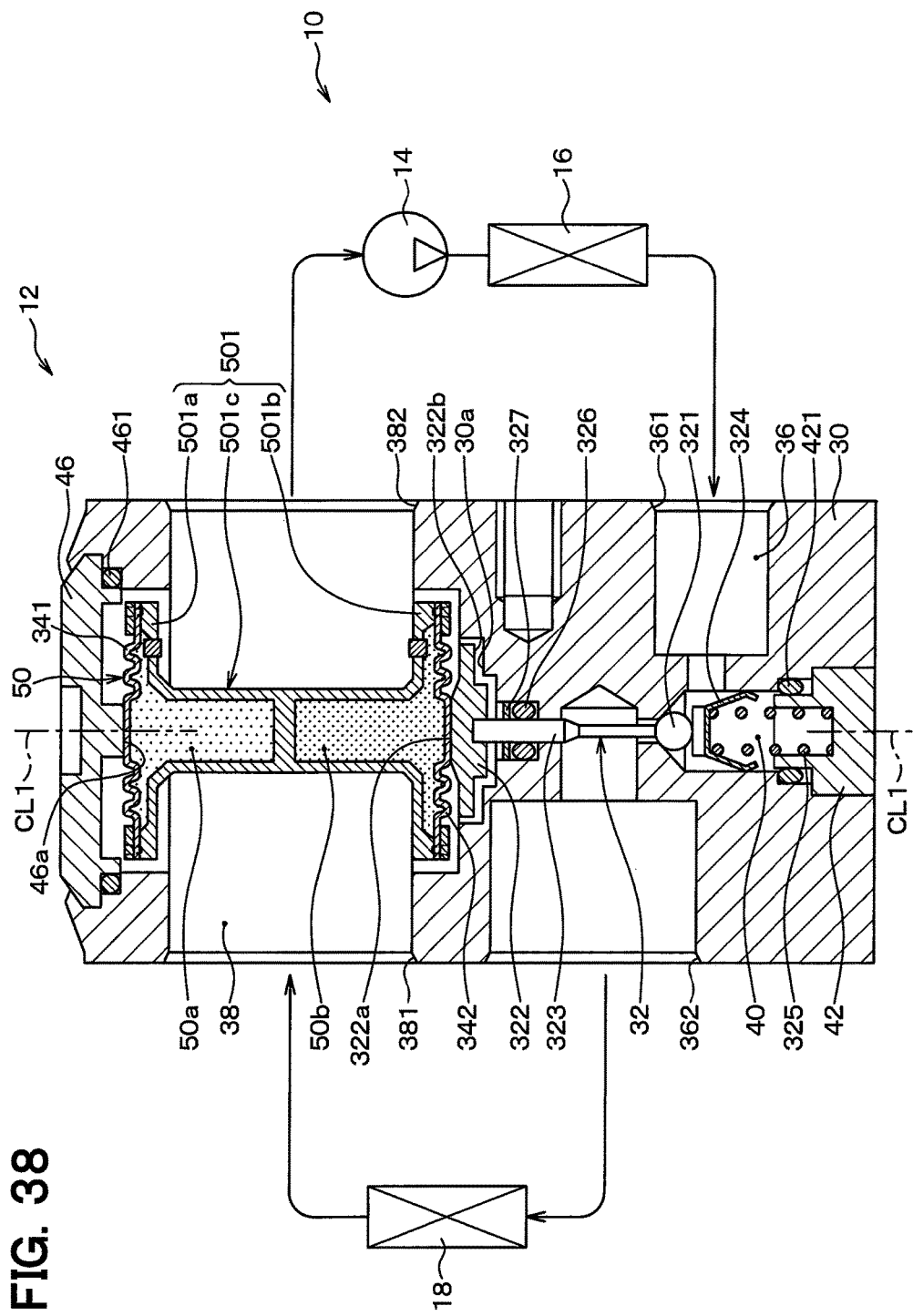
FIG. 38 is a cross-sectional view of the temperature type expansion valve 12 according to an eleventh embodiment.

FIG. 38 is a cross-sectional view of a temperature type expansion valve 12 according to this embodiment. As illustrated in FIG. 38, in the temperature type expansion valve 12 according to this embodiment, a power element 48 according to the ninth embodiment is replaced with a power element 50. An arrangement of a stopper 322 and the length of an actuating bar 323 are also different from those according to the ninth embodiment.

Figure 39:
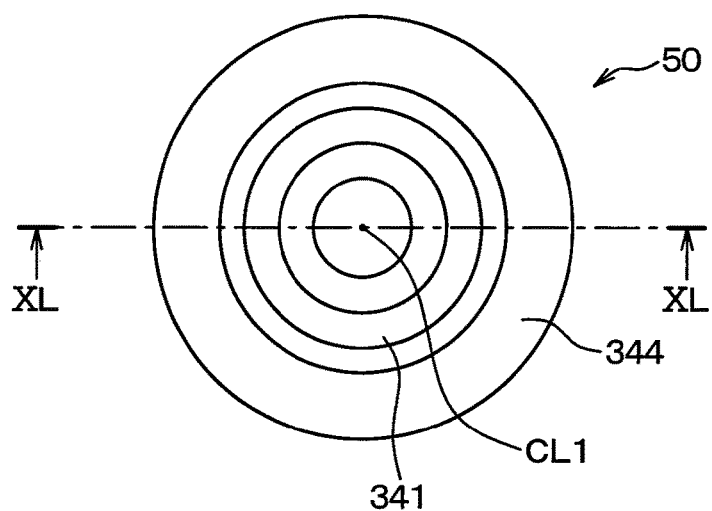
FIG. 39 is a top view of a power element 50 illustrated in FIG. 38, when viewed in the direction of the uniaxial center CL1.
Figure 40:
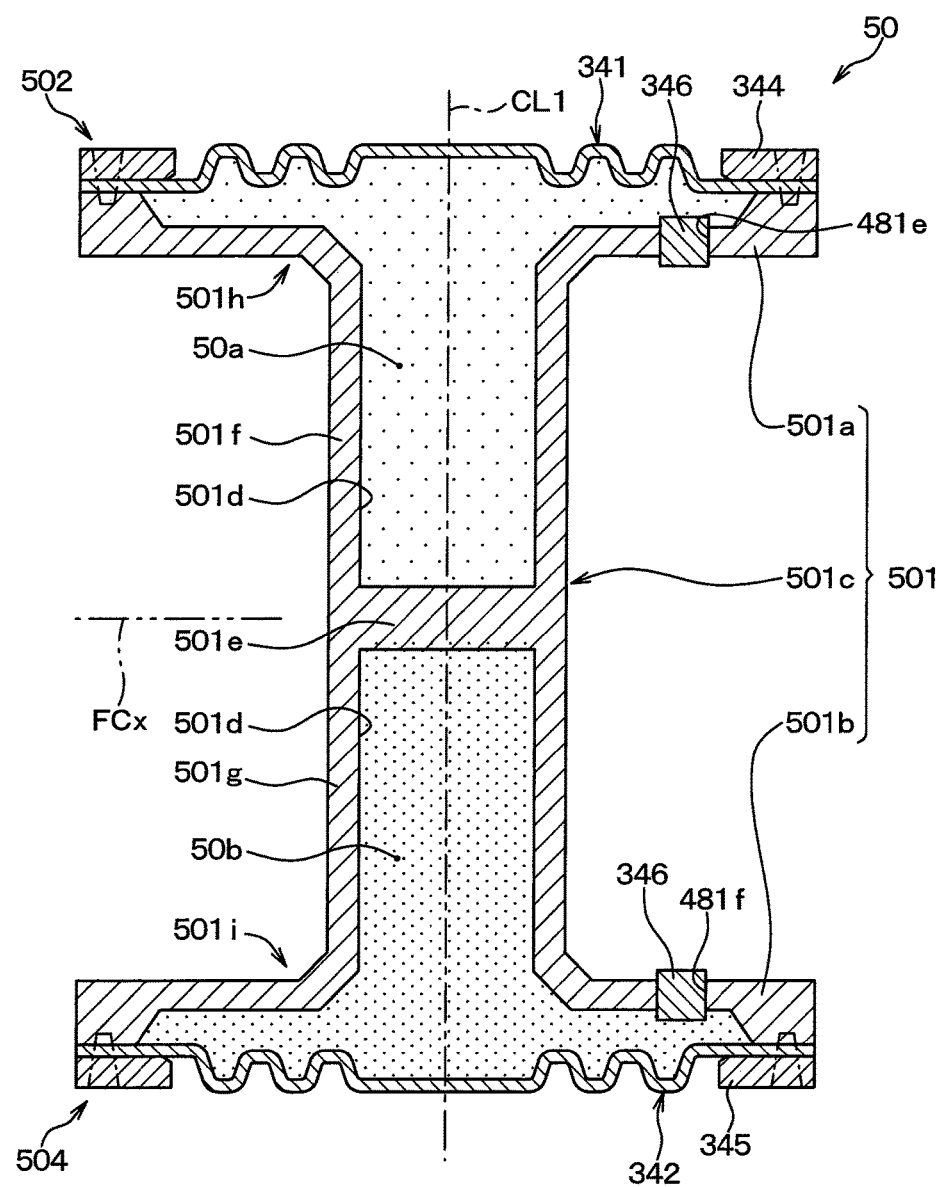
FIG. 40 is a cross-sectional view taken along line XL-XL in FIG. 39 according to the eleventh embodiment.

Specifically, the power element 50 according to this embodiment corresponds to the power element 48 according to the ninth embodiment. Compared to the power element 48, the power element 50 is longer in a direction of a uniaxial center CL1. In detail, the power element 50 according to this embodiment includes an interposing member 501 instead of an interposing member 481 according to the ninth embodiment, and the interposing member 501 is longer than the interposing member 481. The power element 50 according to this embodiment has a shape illustrated in FIGS. 39 and 40. FIG. 39 is a top view of the power element 50 according to this embodiment when viewed in the direction of the uniaxial center CL1. FIG. 40 is a cross-sectional view taken along line XL-XL in FIG. 39.

As illustrated in FIGS. 39 and 40, similarly to the ninth embodiment, the power element 50 includes a first diaphragm 341, a second diaphragm 342, a first collar 344, and a second collar 345 in addition to the interposing member 501.

The interposing member 501 is configured to include a first joined portion 501a which is joined to the first diaphragm 341 by means of laser welding, a second joined portion 501b which is joined to the second diaphragm 342 by means of laser welding, and a narrowed portion 501c which is interposed between the first joined portion 501a and the second joined portion 501b and which has a thin and narrowed cylindrical shape.

A partition wall 501e which partitions a hole 501d penetrating the inside of the narrowed portion 501c in the direction of the uniaxial center CL1 in the direction of the uniaxial center CL1 is disposed in the narrowed portion 501c. That is, the narrowed portion 501c is configured to include a first narrowed portion 501f which is arranged on the first diaphragm 341 side from a boundary of the partition wall 501e, and a second narrowed portion 501g which is arranged on the second diaphragm 342 side from the boundary of the partition wall 501e. The first narrowed portion 501f corresponds to a channel arrangement portion according to this disclosure.

Therefore, a first closed space 50a and a second closed space 50b which are arrayed in the direction of the uniaxial center CL1 via the partition wall 501e are provided in the power element 50. That is, the first joined portion 501a and the first narrowed portion 501f configure a first space providing portion 501h corresponding to the first space providing portion 481c according to the ninth embodiment. The second joined portion 501b and the second narrowed portion 501g configure a second space providing portion 501i corresponding to the second space providing portion 481d according to the ninth embodiment. The first closed space 50a corresponds to the first closed space 48a according to the ninth embodiment, and is a first enclosed space having a first fluid enclosed therein. The second closed space 50b corresponds to the second closed space 48b according to the ninth embodiment, and is a second enclosed space having a second fluid enclosed therein.

Similarly to the power element 48 according to the ninth embodiment, in a functional viewpoint, the power element 50 is configured to include a first expansion unit 502 which expands in the direction of the uniaxial center CL1 by the first diaphragm 341 expanding outward, and a second expansion unit 504 which expands in the direction of the uniaxial center CL1 by the second diaphragm 342 expanding outward. The first expansion unit 502 is configured to include the first diaphragm 341, the first space providing portion 501h, and the first collar 344. The second expansion unit 504 is configured to include the second diaphragm 342, the second space providing portion 501i, and the second collar 345.

As illustrated in FIG. 40, the first joined portion 501a has a first fluid introduction path 481e provided for introducing the first fluid into the first closed space 50a. Similarly to the ninth embodiment, the first fluid introduction path 481e is closed by a plug 346 after the first fluid is introduced into the first closed space 50a.

The second joined portion 501a has a second fluid introduction path 481f provided for introducing the second fluid into the second closed space 50b. Similarly to the ninth embodiment, the second fluid introduction path 481f is closed by the plug 346 after the second fluid is introduced into the second closed space 50b.

As illustrated in FIG. 38, the power element 50 is arranged so that the narrowed portion 501c of the interposing member 501 is located inside a second refrigerant passage 38 crossing a refrigerant flow in the second refrigerant passage 38. That is, the first narrowed portion 501f in which a portion of the first closed space 50a is provided and the second narrowed portion 501g in which a portion of the second closed portion 50b is provided are arranged inside the second refrigerant passage 38. In this manner, the refrigerant flowing in the second refrigerant passage 38 flows downstream while directly coming into contact with the power element 50. Accordingly, compared to the ninth embodiment, the power element 50 can be more accurately operated in accordance with a refrigerant temperature in the second refrigerant passage 38.

As illustrated in FIG. 40, similarly to the power element 48 according to the ninth embodiment, in an outer shape of the power element 50, the power element 50 has a symmetrical shape with respect to a virtual plane FCx. The symmetrical shape means a substantially symmetrical shape without meaning a strictly symmetrical shape.

This embodiment can also be combined with any one of the above-described eighth and tenth embodiments.

(Twelfth Embodiment)

Next, a twelfth embodiment of this disclosure will be described. In this embodiment, points which are different from those in the above-described eleventh embodiment will be mainly described.

Figure 41:
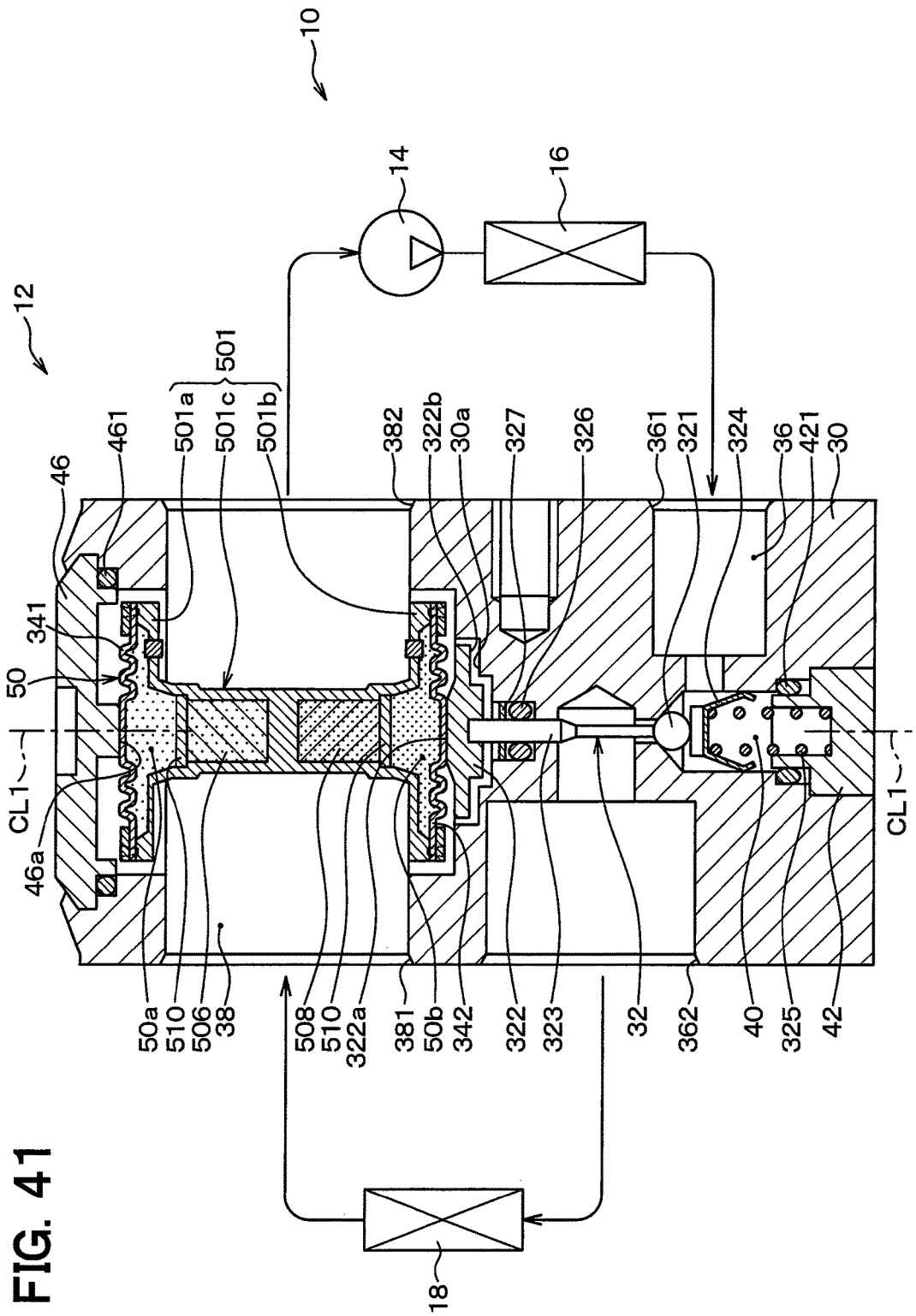
FIG. 41 is a cross-sectional view of the temperature type expansion valve 12 according to a twelfth embodiment.

FIG. 41 is a cross-sectional view of a temperature type expansion valve 12 according to this embodiment. As illustrated in FIG. 41, the temperature type expansion valve 12 according to this embodiment has a power element 50 which is different from that of the temperature type expansion valve 12 according to the eleventh embodiment. A top view obtained when the power element 50 according to this embodiment is viewed in a direction of a uniaxial center CL1 is FIG. 39 which is the same as that of the eleventh embodiment. In this embodiment, a cross-sectional view taken along line XL-XL in FIG. 39 is FIG. 42 instead of FIG. 40.

Figure 42:
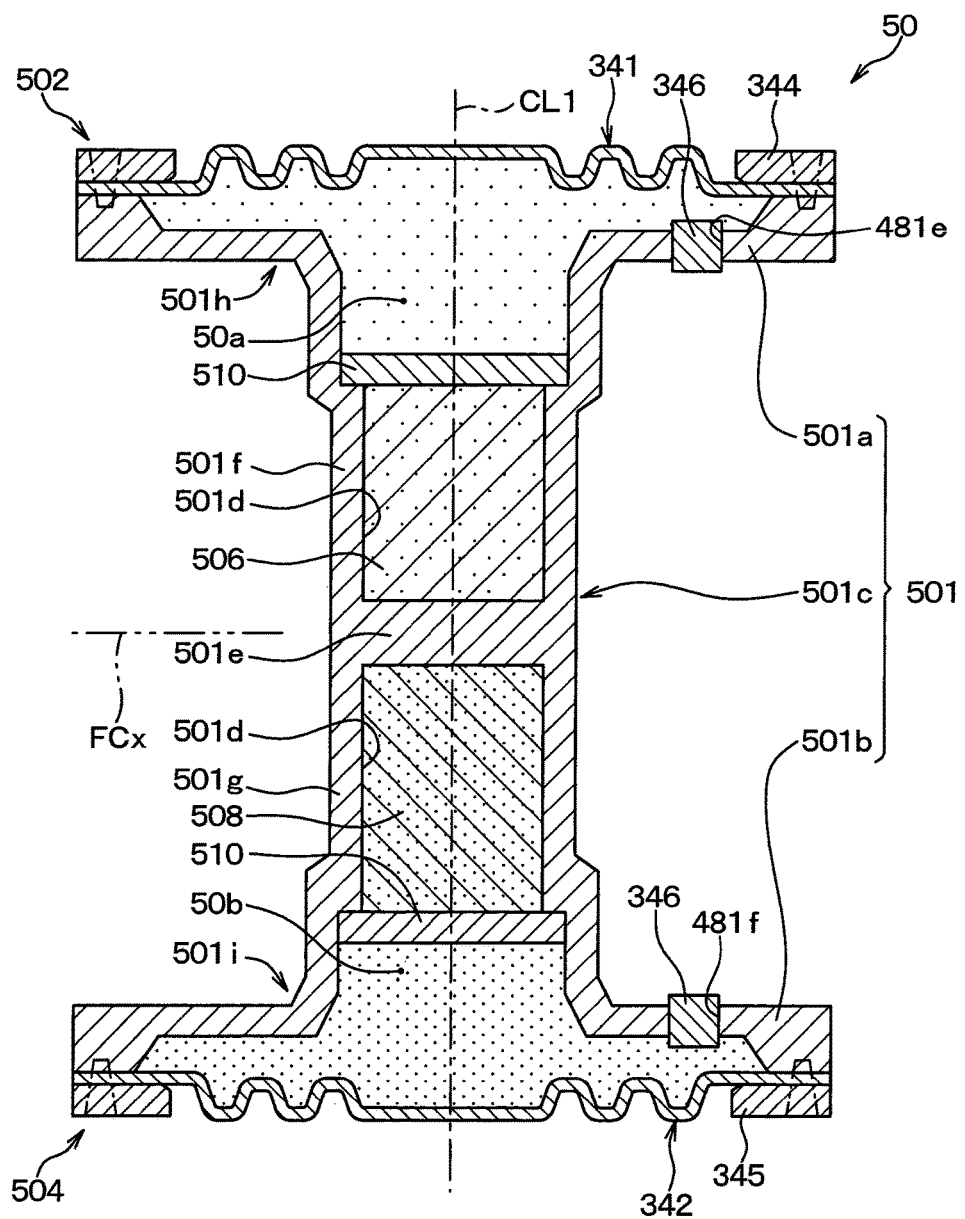
FIG. 42 is a cross-sectional view taken along line XL-XL in FIG. 39 according to the twelfth embodiment.

As illustrated in FIGS. 41 and 42, specifically, compared to the eleventh embodiment, the power element 50 according to this embodiment further includes a first adsorbent 506, a second adsorbent 508, and a pair of holding members 510.

The first adsorbent 506 and the second adsorbent 508 adsorb or radiate heat of a refrigerant in accordance with each temperature of the adsorbents 506 and 508. For example, the first adsorbent 506 and the second adsorbent 508 are configured to include activated carbon whose thermal conductivity is worse than an interposing member 501.

The first adsorbent 506 and the second adsorbent 508 are different from each other in adsorption characteristics which indicate a relationship between an adsorption amount and a temperature of the refrigerant.

The first adsorbent 506 is disposed in a portion included in a first narrowed portion 501*f* inside a first closed space 50*a* of the power element 50. An arrangement position of the first adsorbent 506 is held in such a way that the first adsorbent 506 is pinched by a partition wall 501*e* and any one of the pair of holding members 510 in the direction of the uniaxial center CL1. The holding member 510 is a member having air permeability, and is configured to include a metal mesh or a filter, for example.

The second adsorbent 508 is also the same as the first adsorbent 506. That is, the second adsorbent 508 is disposed in a portion included in a second narrowed portion 501*g* inside a second closed space 50*b*. An arrangement position of the second adsorbent 508 is held in such a way that the second adsorbent 508 is pinched by the partition wall 501*e* and the other one of the pair of holding members 510 in the direction of the uniaxial center CL1.

According to this embodiment, the first adsorbent 506 and the second adsorbent 508 are disposed inside the power element 50. Accordingly, an operation response of the power element 50 to a temperature change in the refrigerant flowing in a second refrigerant passage 38 is slowed down. Therefore, a sensitive operation of the power element 50 can be suppressed.

This embodiment can also be combined with any one of the above-described eighth and tenth embodiments.

(Thirteenth Embodiment)

Next, a thirteenth embodiment of this disclosure will be described. In this embodiment, points which are different from those in the above-described eleventh embodiment will be mainly described.

Figure 43:
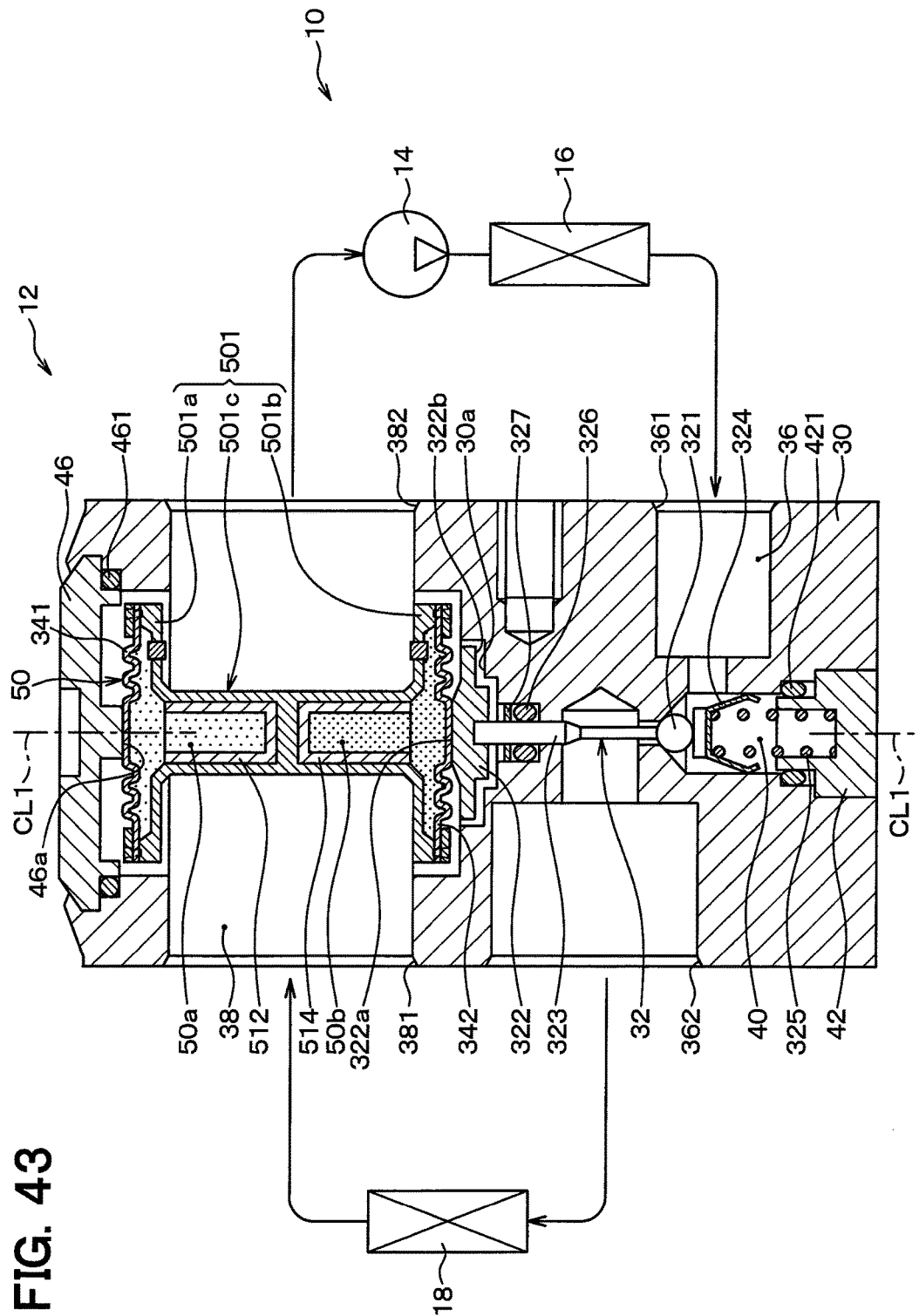
FIG. 43 is a cross-sectional view of the temperature type expansion valve 12 according to a thirteenth embodiment.

FIG. 43 is a cross-sectional view of a temperature type expansion valve 12 according to this embodiment. As illustrated in FIG. 43, the temperature type expansion valve 12 according to this embodiment has a power element 50 which is different from that of the temperature type expansion valve 12 according to the eleventh embodiment. A top view obtained when the power element 50 according to this embodiment is viewed in a direction of a uniaxial center CL1 is FIG. 39 which is the same as that of the eleventh embodiment. In this embodiment, a cross-sectional view taken along line XL-XL in FIG. 39 is FIG. 44 instead of FIG. 40.

Figure 44:
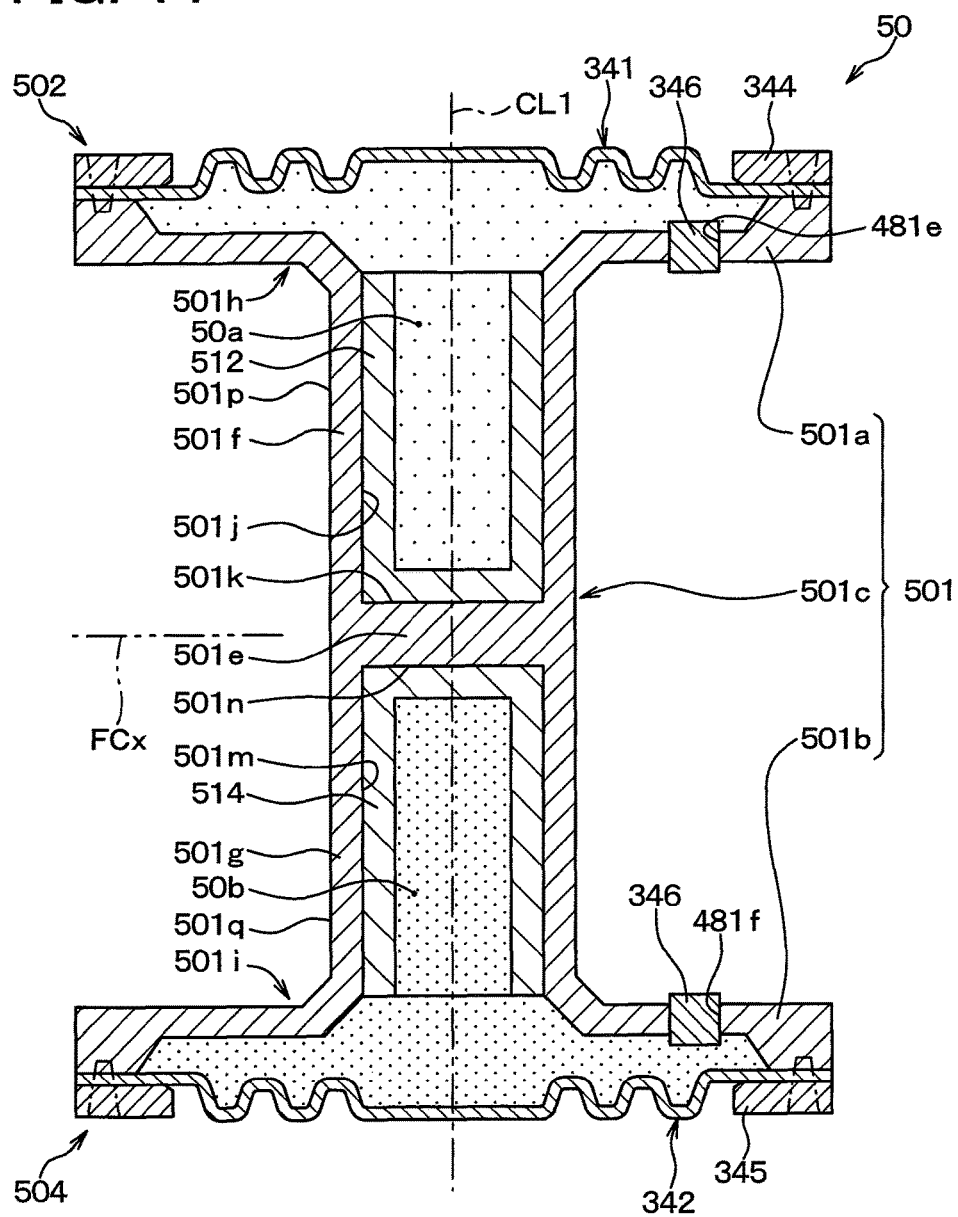
FIG. 44 is a cross-sectional view taken along line XL-XL in FIG. 39 according to the thirteenth embodiment.

As illustrated in FIGS. 43 and 44, specifically, compared to the eleventh embodiment, the power element 50 according to this embodiment further includes a first wall member 512 and a second wall member 514.

The first wall member 512 and the second wall member 514 are configured to include a material whose thermal conductivity is lower than an interposing member 501 made of metal, for example, a resin, and is molded into a bottomed cylindrical shape. The first wall member 512 is fitted into a first narrowed portion 501*f* which is open on a first diaphragm 341 side and which has a bottomed cylindrical shape. Therefore, a first inner peripheral surface 501*j* and a first bottom surface 501*k* which provide an inner side of the first narrowed portion 501*f* are covered with the first wall member 512.

The second wall member 514 is fitted into a second narrowed portion 501*g* which is open on a second diaphragm 342 side and which has a bottomed cylindrical shape. Therefore, a second inner peripheral surface 501*m* and a second bottom surface 501*n* which provide an inner side of the second narrowed portion 501*g* are covered with the second wall member 514.

According to this embodiment, the inner surface of the first narrowed portion 501*f* is covered with the first wall member 512 whose thermal conductivity is low, and the inner surface of the second narrowed portion 501*g* is covered with the second wall member 514 whose thermal conductivity is low. Therefore, similarly to the above-described twelfth embodiment, a sensitive operation of the power element 50 can be restricted.

This embodiment can also be combined with any one of the above-described eighth and tenth embodiments.

(Fourteenth Embodiment)

Next, a fourteenth embodiment of this disclosure will be described. In this embodiment, points which are different from those in the above-described eighth embodiment will be mainly described.

Figure 45:
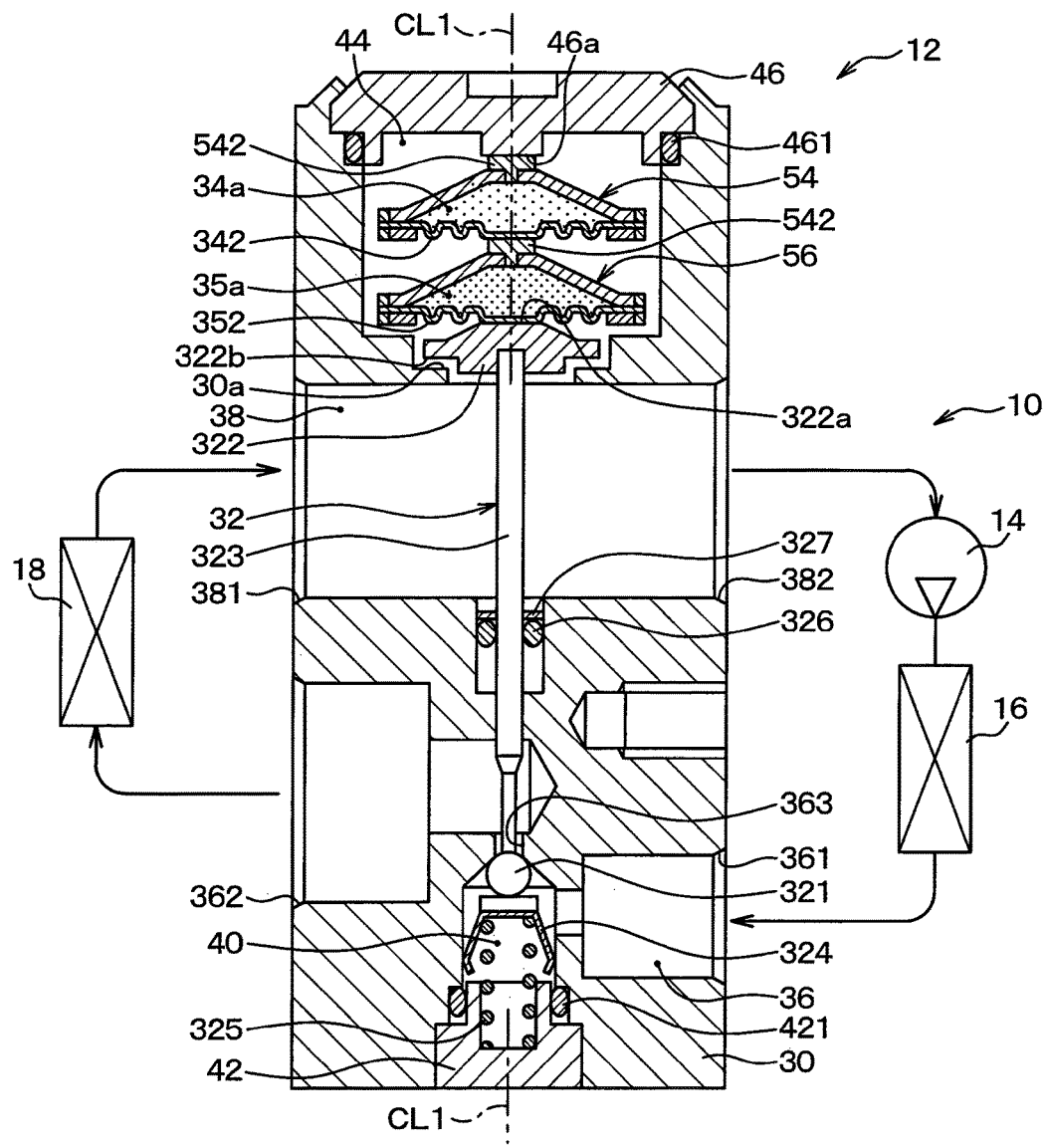
FIG. 45 is a cross-sectional view of the temperature type expansion valve 12 according to a fourteenth embodiment.

FIG. 45 is a cross-sectional view of a temperature type expansion valve 12 according to this embodiment. As illustrated in FIG. 45, the temperature type expansion valve 12 according to this embodiment has a first power element 54 and a second power element 56 which are different from those of the temperature type expansion valve 12 according to the eighth embodiment. Therefore, description will be mainly made with regard to points in which the first power element 54 is different from the first power element 34 according to the eighth embodiment and points in which the second power element 56 is different from the second power element 35 according to the eighth embodiment.

Figure 46:
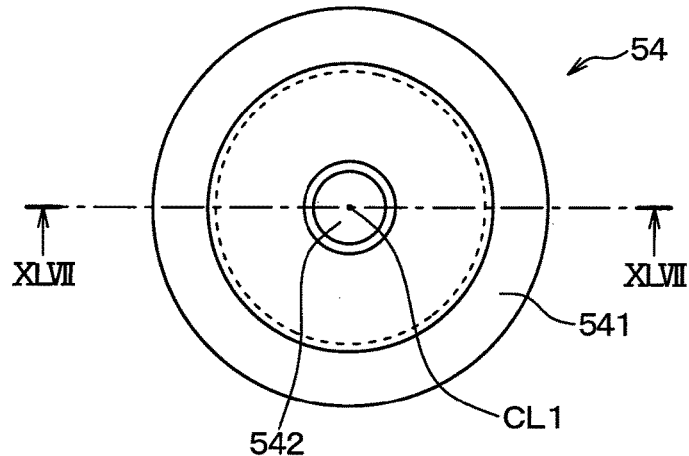
FIG. 46 is a top view of a first power element 54 illustrated in FIG. 45, when viewed in the direction of the uniaxial center CL1.
Figure 47:
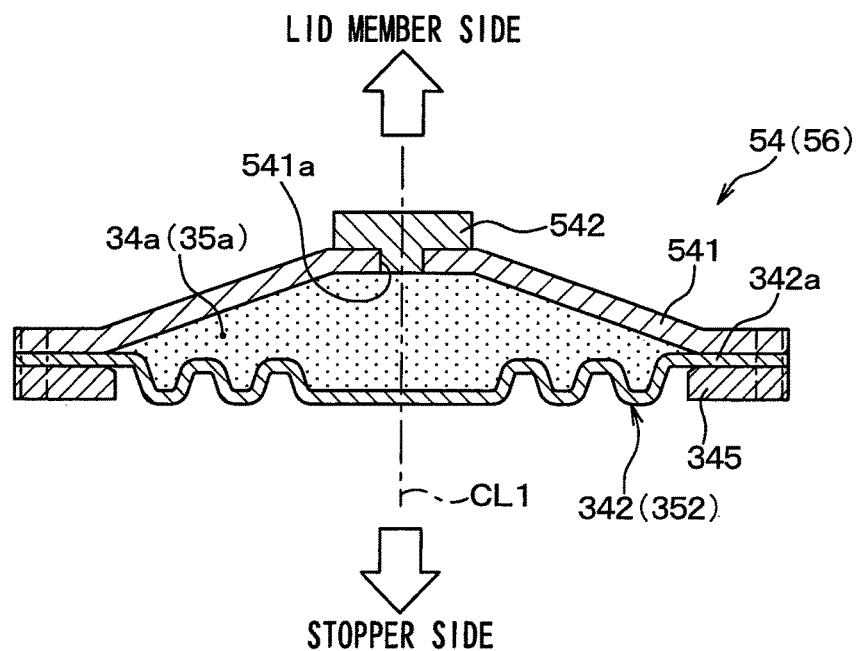
FIG. 47 is a cross-sectional view taken along line XLVII-XLVII in FIG. 46.

FIG. 46 is a top view of the first power element 54 illustrated in FIG. 45, when viewed in a direction of a uniaxial center CL1. FIG. 47 is a cross-sectional view taken along line XLVII-XLVII in FIG. 46. As illustrated in FIGS. 46 and 47, the first power element 54 includes a cover member 541 instead of an interposing member 343 according to the eighth embodiment. The first power element 54 does not include a first collar 344 and a first diaphragm 341 according to the eighth embodiment, but includes only a second diaphragm 342 as a diaphragm.

The cover member 541 is molded so that the second diaphragm 342 side is recessed in the direction of the uniaxial center CL1. In a state where a peripheral edge portion 342*a* of the second diaphragm 342 is pinched by using a second collar 345, the cover member 541 is welded over the entire circumference around the uniaxial center CL1, and is joined to the second diaphragm 342 and the second collar 345. A two-dot chain line in FIG. 47 illustrates a joined portion thereof. The cover member 541 is joined in this way, thereby providing a first closed space 34*a* having a first fluid enclosed therein between the cover member 541 and the second diaphragm 342 in the direction of the uniaxial center CL1. That is, the cover member 541 is a first space providing portion which provides a first enclosed space 34*a* by being joined to the second diaphragm 342.

A peak portion of the cover member 541 has a fluid introduction path 541*a* provided for introducing the first fluid into the first closed space 34*a*. The fluid introduction path 541*a* is closed by a plug 542 after the first fluid is introduced into the first closed space 34*a*.

The second power element 56 is the same as the above-described first power element 54, except for a fluid enclosed therein. That is, the second power element 56 includes only a fourth diaphragm 352 as a diaphragm, and a second closed space 35*a* having a second fluid enclosed therein is provided in the second power element 56. In FIG. 47, the reference numerals 56, 352, and 35*a* are illustrated in parentheses.

As illustrated in FIG. 45, the plug 542 fixed to the cover member 541 of the first power element 54 is pressed by a contact surface 46a of a lid member 46 in the direction of the axial center CL1. The plug 542 fixed to the cover member 541 of the second power element 56 is pressed by the second diaphragm 342 of the first power element 54.

According to this embodiment, similarly to the above-described eighth embodiment, the temperature type expansion valve 12 includes the first power element 54 having the first fluid sealed therein and the second power element 56 having the second fluid sealed therein. Accordingly, similarly to the eighth embodiment, flow rate control characteristics of a valve mechanism 32 can be easily and optionally obtained.

According to this embodiment, the plug 542 is attached to the cover member 541 in the direction of the axial center CL1. Accordingly, compared to the above-described eighth embodiment, the positioning is facilitated when the plug 542 is welded to the cover member 541, and the manufacturing process of the first power element 54 and the second power element 56 can be facilitated.

(Fifteenth Embodiment)

Next, a fifteenth embodiment of this disclosure will be described. In this embodiment, points which are different from those in the above-described ninth embodiment will be mainly described.

Figure 48:
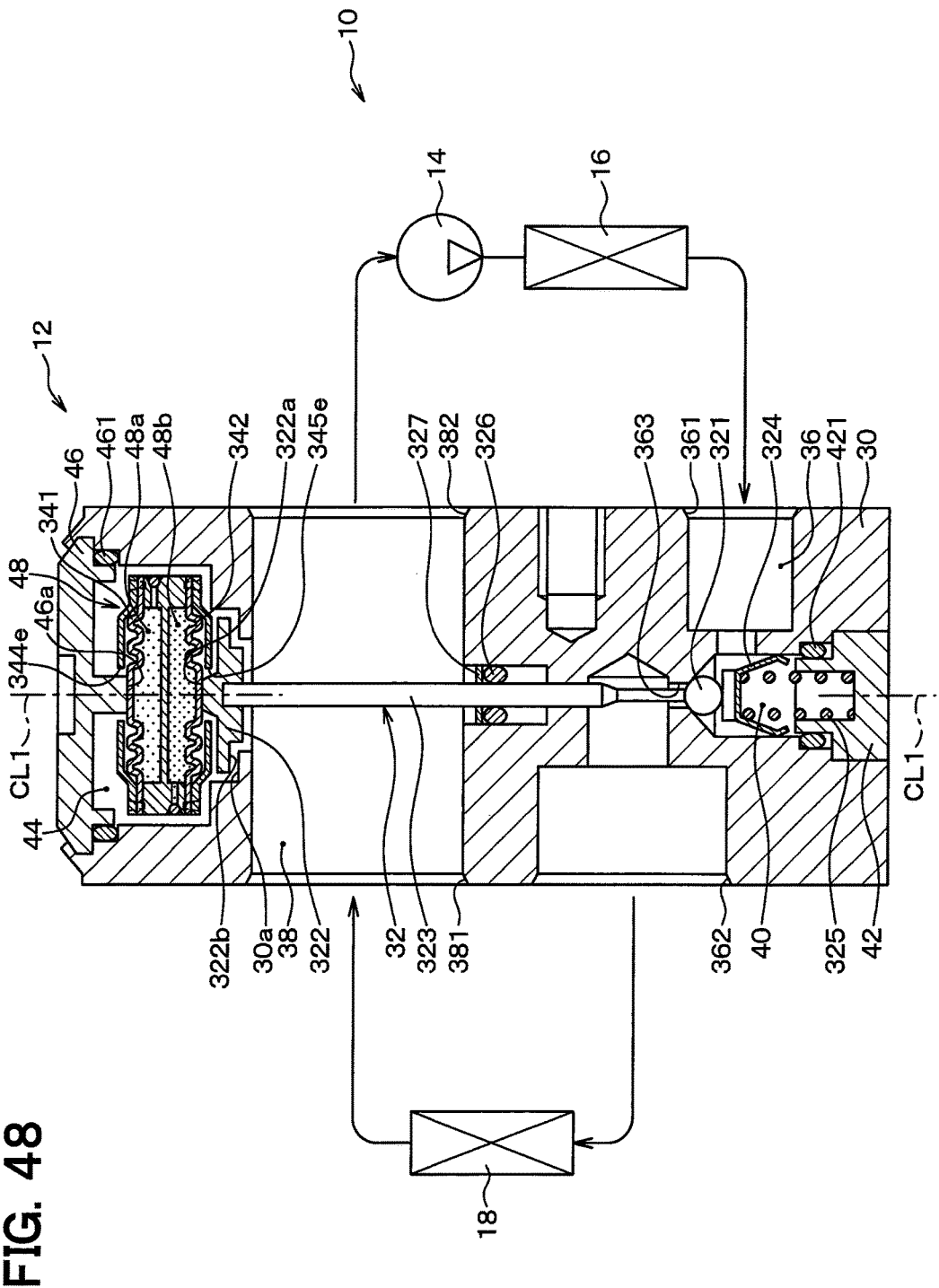
FIG. 48 is a cross-sectional view of the temperature type expansion valve 12 according to a fifteenth embodiment.
Figure 49:
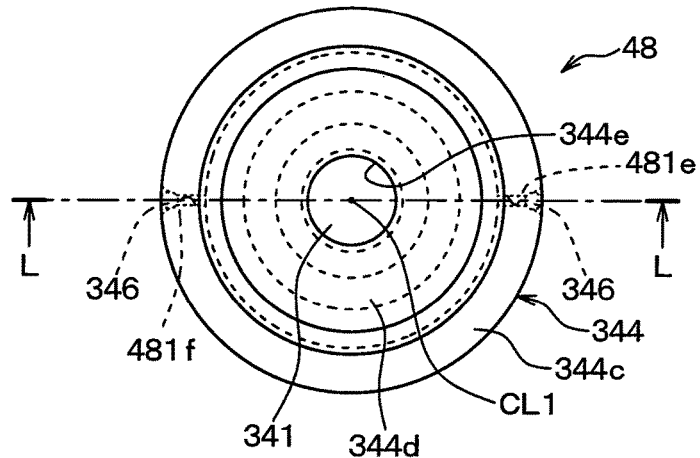
FIG. 49 is a top view of the power element 48 illustrated in FIG. 48, when viewed in the direction of the uniaxial center CL1.
Figure 50:
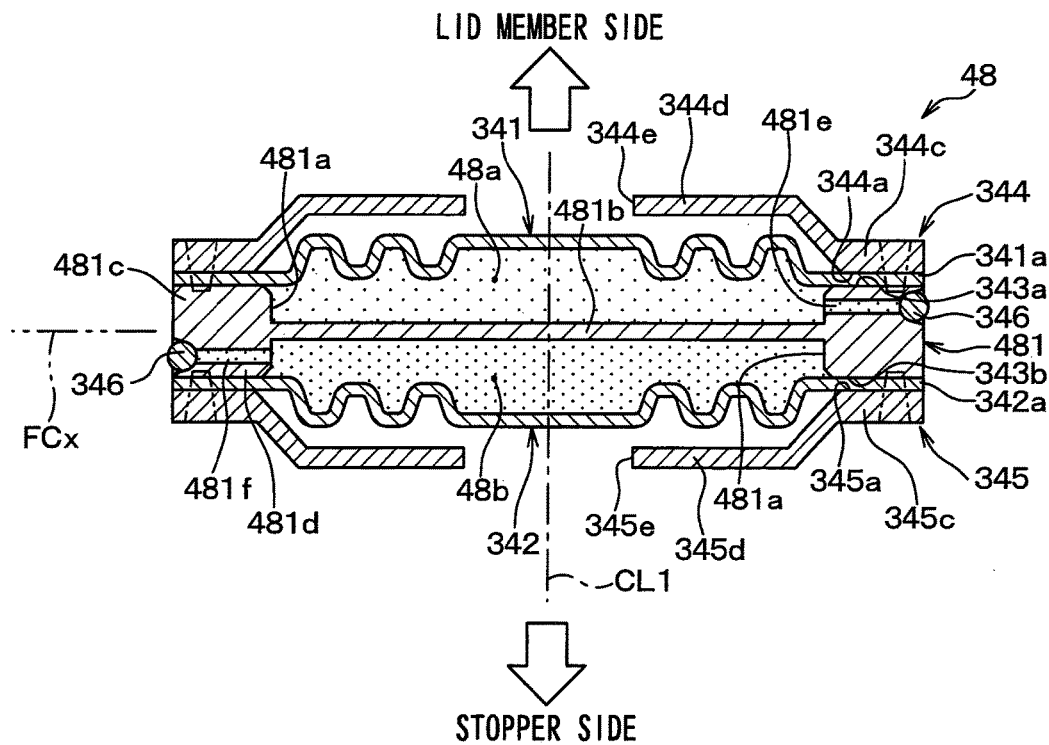
FIG. 50 is a cross-sectional view taken along line L-L in FIG. 49.

FIG. 48 is a cross-sectional view of a temperature type expansion valve 12 according to this embodiment. As illustrated in FIG. 48, the temperature type expansion valve 12 according to this embodiment has a power element 48 which is different from that of the temperature type expansion valve 12 according to the ninth embodiment. In detail, a first collar 344 and a second collar 345 are different from those according to the ninth embodiment. FIGS. 49 and 50 illustrate a detailed view of the power element 48 illustrated in FIG. 48. FIG. 49 is a top view of the power element 48 according to this embodiment when viewed in a direction of a uniaxial center CL1. FIG. 50 is a cross-sectional view taken along line L-L in FIG. 49.

As illustrated in FIGS. 49 and 50, the first collar 344 includes a diaphragm pressing portion 344c which pinches and fixes a peripheral edge portion 341a of a first diaphragm 341 by using an interposing member 481, and an extension portion 344d which extends radially inward from the diaphragm pressing portion 344c. The extension portion 344d corresponds to a prohibiting portion according to this disclosure.

As is understood from FIG. 50, the diaphragm pressing portion 344c corresponds to the overall first collar 344 according to the eighth embodiment. Accordingly, in the first collar 344 according to this embodiment, the extension portion 344d is added to the first collar 344 according to the eighth embodiment.

As illustrated in FIGS. 48 and 49, a central portion of the extension portion 344d has a through-hole 344e provided so as not to hinder the first diaphragm 341 from coming into contact with a contact surface 46a of a lid member 46.

The extension portion 344d is arranged so as to come into contact with the first diaphragm 341 if the first diaphragm 341 expands to some extent. The first diaphragm 341 is prohibited by the extension portion 344d so as not to expand beyond a contact state thereof, if the first diaphragm 341 expands until the first diaphragm 341 comes into contact with the extension portion 344d.

That is, the extension portion 344d has a function of prohibiting expansion and deformation of the first diaphragm 341. Therefore, the extension portion 344d can prohibits the deformation of the first diaphragm 341 so as not to impair the durability. For example, in a case where the power element 34 is present alone in a manufacturing process of the power element 34, the deformation of the first diaphragm 341 is not restricted by the lid member 46 and a stopper 322. Therefore, particularly in this case, the extension portion 344d is effectively used.

As illustrated in FIG. 50, the second collar 345 is also the same as the above-described first collar 344. That is, the second collar 345 includes a diaphragm pressing portion 345c corresponding to the diaphragm pressing portion 344c of the first collar 344, and an extension portion 345d corresponding to the extension portion 344d of the first collar 344. The extension portion 345d of the second collar 345 has a through-hole 345e corresponding to the through-hole 344e of the first collar 344.

This embodiment can also be combined with any one of the above-described eighth, and eleventh to fifteenth embodiments.

(Sixteenth Embodiment)

Next, a sixteenth embodiment of this disclosure will be described. In this embodiment, points which are different from those in the above-described eighth embodiment will be mainly described.

Figure 51:
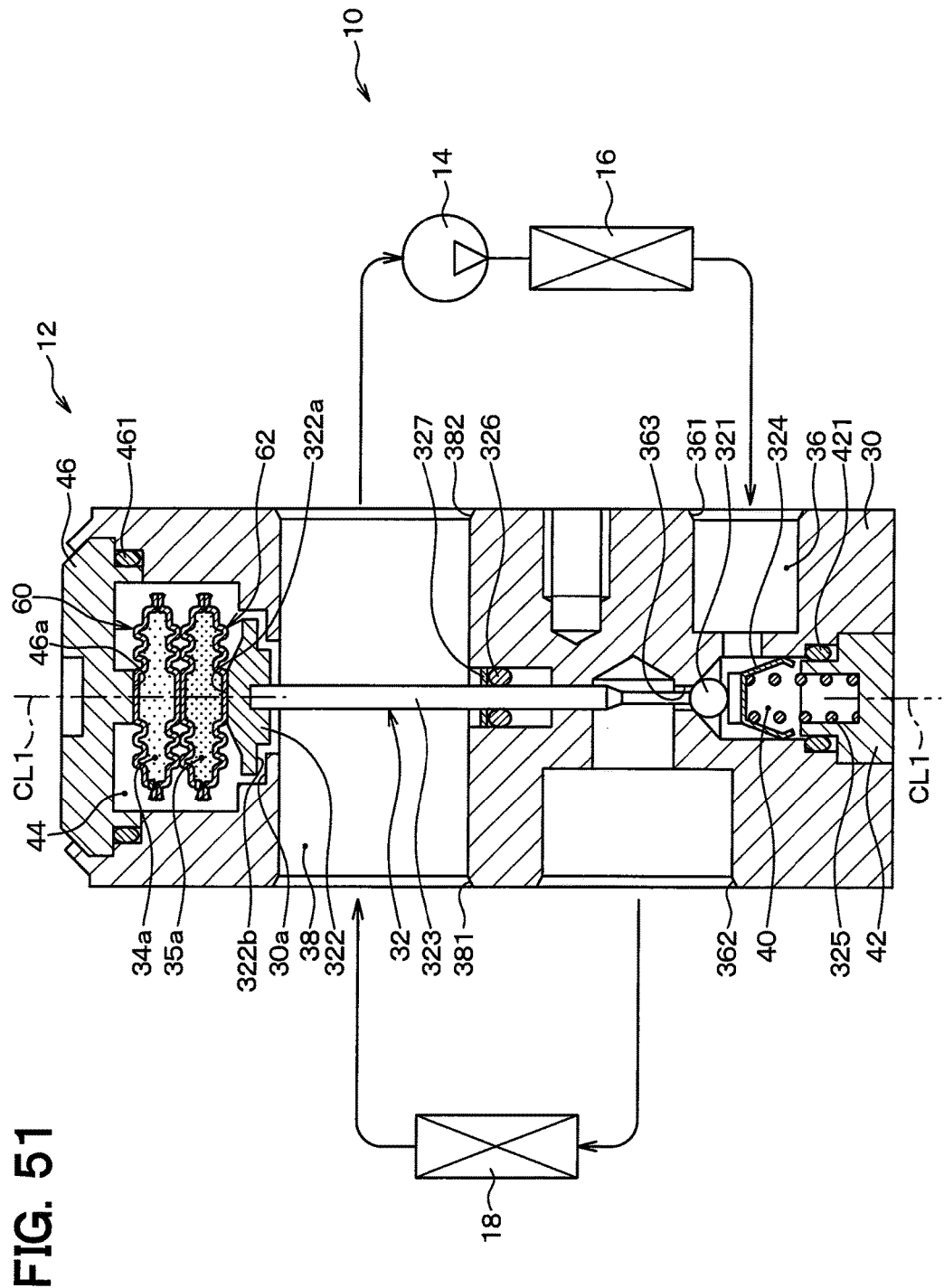
FIG. 51 is a cross-sectional view of the temperature type expansion valve 12 according to a sixteenth embodiment.

FIG. 51 is a cross-sectional view of a temperature type expansion valve 12 according to this embodiment. As illustrated in FIG. 51, in the temperature type expansion valve 12 according to this embodiment, compared to the eighth embodiment, the first power element 34 according to the eighth embodiment is replaced with a first power element 60, and the second power element 35 according to the eighth embodiment is replaced with a second power element 62. Therefore, description will be mainly made with regard to points in which the first power element 60 is different from the first power element 34 according to the eighth embodiment and points in which the second power element 62 is different from the second power element 35 according to the eighth embodiment.

Figure 52:
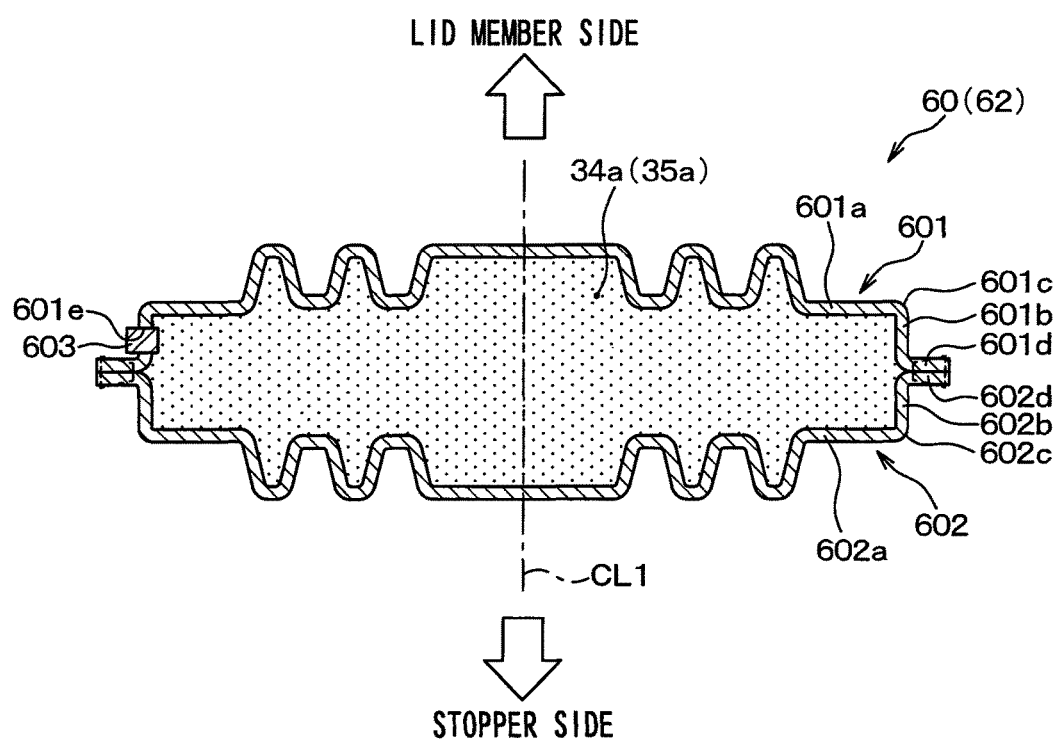
FIG. 52 is a cross-sectional view illustrating a first power element 60 in FIG. 51 which is cut by a section including the uniaxial axis CL1.

FIG. 52 illustrates a detailed view of the first power element 60 illustrated in FIG. 51. FIG. 52 is a cross-sectional view illustrating the first power element 60 which is cut by a section including the uniaxial axis CL1.

As illustrated in FIGS. 51 and 52, the first power element 60 includes a first diaphragm 601 instead of the first diaphragm 341 according to the eighth embodiment, and includes a second diaphragm 602 instead of the second diaphragm 342 according to the eighth embodiment. The first power element 60 does not include an interposing member 343 included in the first power element 34 according to the eighth embodiment, and a first collar 344 and a second collar 345.

As illustrated in FIG. 52, the first diaphragm 601 is configured to include a thin spring member, similarly to the first diaphragm 341 according to the eighth embodiment. The first diaphragm 601 is molded by carrying out press work, for example, and includes a first pressure-sensing deformation portion 601a and a first peripheral edge portion 601b.

The first pressure-sensing deformation portion 601a has a disc shape which is orthogonal to the direction of the uniaxial center CL1, and is deformed so as to expand in the direction of the uniaxial center CL1 in accordance with an internal pressure of a first closed space 34a. That is, the first pressure-sensing deformation portion 601a has a function which is the same as that of the first diaphragm 341 according to the first embodiment.

The first peripheral edge portion 601b has a cylindrical shape formed around the uniaxial center CL1. A base end 601c of the first peripheral edge portion 601b is connected to a peripheral edge of the first pressure-sensing deformation portion 601a. The base end 601c of the first peripheral edge portion 601b, that is, the peripheral edge of the first pressure-sensing deformation portion 601a serves as a fulcrum when the first pressure-sensing deformation portion 601a expands due to the internal pressure of the first closed space 34a. In other words, the first pressure-sensing deformation portion 601a is deformed so as to expand using the base end 601c of the first peripheral edge portion 601b as a fulcrum.

As illustrated in FIG. 52, the second diaphragm 602 also has a configuration which is the same as that of the first diaphragm 601. That is, the second diaphragm 602 includes a second pressure-sensing deformation portion 602a corresponding to the first pressure-sensing deformation portion 601a, and a second peripheral edge portion 602b corresponding to the first peripheral edge portion 601b. The second pressure-sensing deformation portion 602a has a function which is the same as that of the second diaphragm 342 according to the eighth embodiment. A base end 602c of the second peripheral edge portion 602b, that is, the peripheral edge of the second pressure-sensing deformation portion 602a serves as a fulcrum when the second pressure-sensing deformation portion 602a expands due to the internal pressure of the first closed space 34a.

A distal end 601d of the first peripheral edge portion 601b is joined to a distal end 602d of the second peripheral edge portion 602b. For example, a joined portion therebetween is welded over the entire circumference around the uniaxial center CL1 so as to be air-tight. The first closed portion 34a is provided by the first peripheral edge portion 601b and the second peripheral edge portion 602b being joined to each other in this way.

As is understood from FIG. 52, the first diaphragm 601 is provided by the distal end 601d of the first peripheral edge portion 601b which serves as a joined portion between the first diaphragm 601 and the second diaphragm 602 being separated from the base end 601c of the first peripheral edge portion 601b which serves as a fulcrum when the first pressure-sensing deformation portion 601a expands.

Similarly, the second diaphragm 602 is provided by the distal end 602d of the second peripheral edge portion 602b which serves as the joined portion between the first diaphragm 601 and the second diaphragm 602 being separated from the base end 602c of the second peripheral edge portion 602b which serves as a fulcrum when the second pressure-sensing deformation portion 602a expands.

The first peripheral edge portion 601b has a fluid introduction path 601e provided for introducing the first fluid into the first closed space 34a. The fluid introduction path 601e is closed by a plug 603 after the above-described first fluid is introduced into the first closed space 34a.

The second power element 62 is the same as the above-described first power element 60, except for the fluid enclosed therein. For example, a second closed space 35a having a second fluid enclosed therein is provided in the second power element 62. The second closed space 35a has the same shape as the first closed space 34a. In FIG. 52, the reference numerals 35a and 62 are illustrated in parentheses.

According to this embodiment, similarly to the above-described eighth embodiment, the temperature type expansion valve 12 includes the first power element 60 having the first fluid sealed therein and the second power element 62 having the second fluid sealed therein. Accordingly, similarly to the eighth embodiment, flow rate control characteristics of a valve mechanism 32 can be easily and optionally obtained.

According to this embodiment, when the first diaphragm 601 and the second diaphragm 602 are deformed, the first diaphragm 601 and the second diaphragm 602 are bent using a position deviated from the joined portion between the first diaphragm 601 and the second diaphragm 602 as a fulcrum. Accordingly, a stress concentration point during the deformation of the first diaphragm 601 and the second diaphragm 602 is separated from the above-described joined portion. Therefore, the durability of the first diaphragm 601 and the second diaphragm 602 can be improved.

(Seventeenth Embodiment)

Next, a seventeenth embodiment of this disclosure will be described. In this embodiment, points which are different from those in the above-described eighth embodiment will be mainly described.

Figure 53:
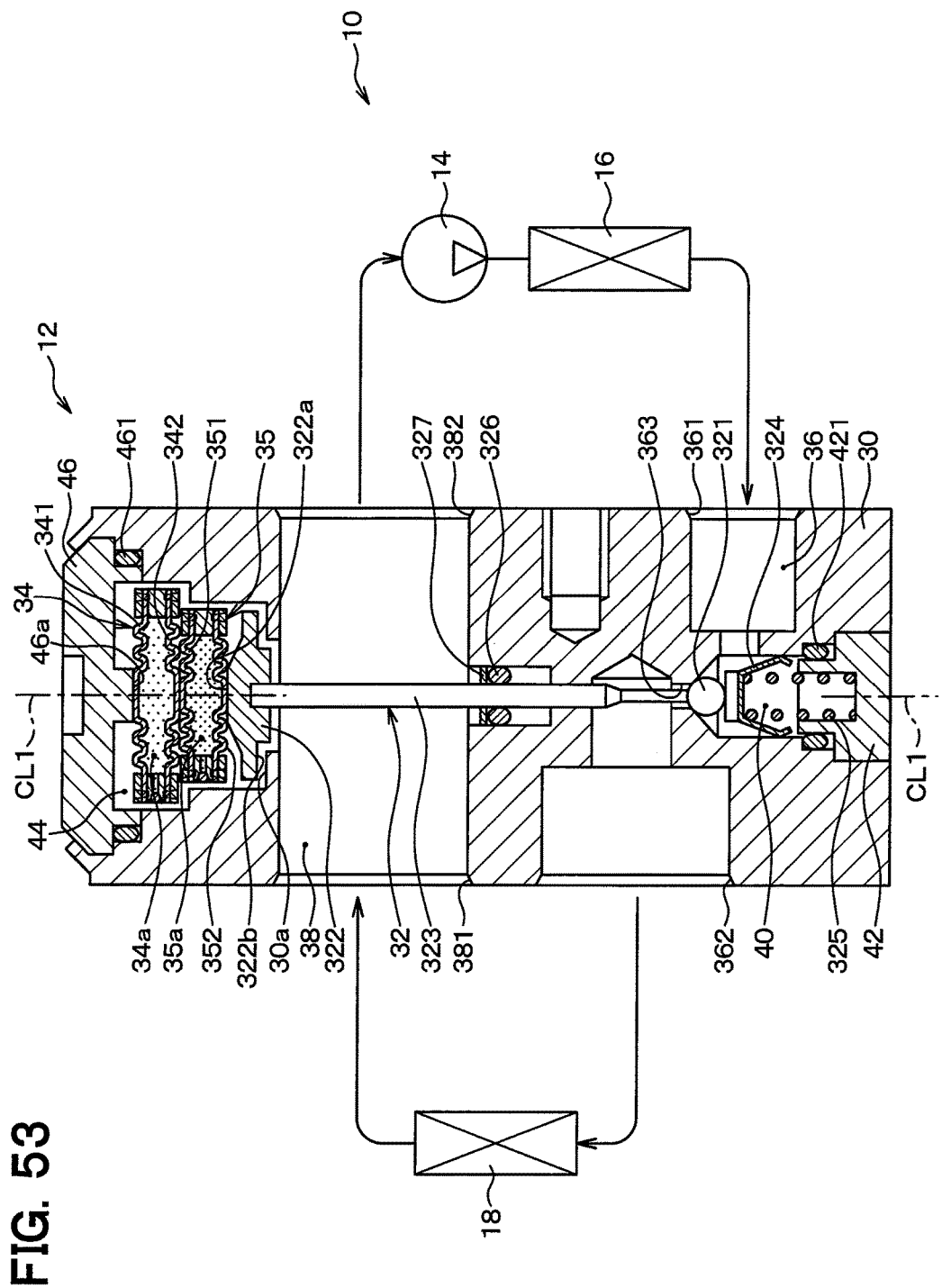
FIG. 53 is a cross-sectional view of the temperature type expansion valve 12 according to a seventeenth embodiment.

FIG. 53 is a cross-sectional view of a temperature type expansion valve 12 according to this embodiment. As illustrated in FIG. 53, the temperature type expansion valve 12 according to this embodiment has a second power element 35 which is different from that according to the eighth embodiment. On the other hand, a first power element 34 is the same as that according to the eighth embodiment.

Specifically, a diameter of the second power element 35 according to this embodiment is smaller than that according to the eighth embodiment. Therefore, as illustrated in FIG. 53, the diameter of the second power element 35 is smaller than the diameter of the first power element 34. That is, each diameter of a third diaphragm 351 and a fourth diaphragm 352 which configure the second diaphragm 35 is smaller than each diameter of a first diaphragm 341 and a second diaphragm 342 which configure the first power element 34.

Therefore, according to this embodiment, all plate thicknesses of the diaphragms 341, 342, 351, and 352 are the same as each other. However, a spring constant k2 of the third diaphragm 351 and the fourth diaphragm 352 when the second power element 35 expands in a direction of a uniaxial center CL1 is greater than a spring constant k1 of the first diaphragm 341 and the second diaphragm 342 of the first power element 34.

In short, each shape, for example, each diameter of the first diaphragm 341 and the second diaphragm 342 is different from that of the third diaphragm 351 and the fourth diaphragm 352. Accordingly, a first expansion characteristic which indicates a relationship between a pressure of a first fluid enclosed in a first closed space 34a and an expansion amount of the first power element 34, and a second expansion characteristic which indicates a relationship between a pressure of a second fluid enclosed in a second closed space 35a and an expansion amount of the second power element 35 are different from each other.

According to this embodiment, similarly to the eighth embodiment, the flow rate control characteristic of a valve mechanism 32 has, as a whole, an intermediate value between a first flow rate control characteristic of only the first power element 34 having the first fluid sealed therein and a second flow rate control characteristic of only the second power element 35 having the second fluid sealed therein. Accordingly, the flow rate control characteristics of the valve mechanism 32 can be more easily obtained as intended. Furthermore, the spring constant k1 of the first power element 34 is less than the spring constant k2 of the second power element 35. Accordingly, an internal pressure change in the first closed space 34a is more likely to be reflected in an operation of a spherical valve 321 of the valve mechanism 32 than an internal pressure change in the second closed space 35a. Therefore, the flow rate control characteristic of the valve mechanism 32 can be made closer to the first flow rate control characteristic than the above-described second flow rate control characteristic. This will be described in detail with reference to FIG. 54.

Figure 54:
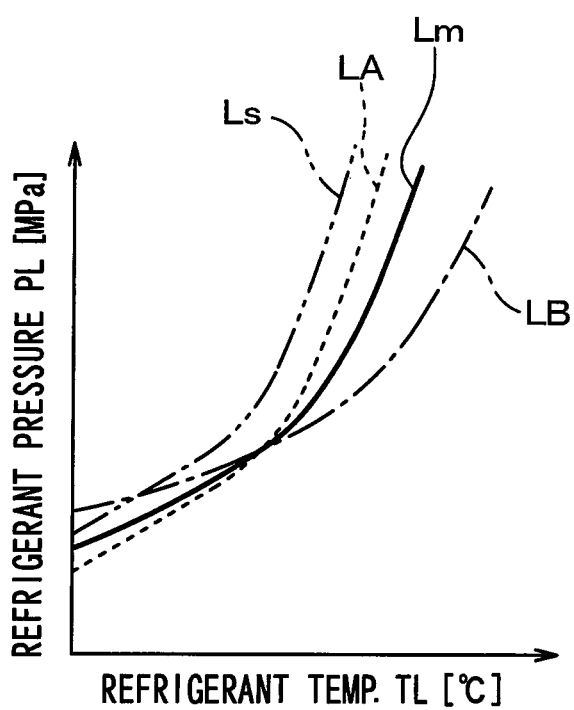
FIG. 54 is a view corresponding to FIG. 48, and is a view illustrating a flow rate control characteristic according to the seventeenth embodiment.

FIG. 54 is a view corresponding to FIG. 27 described above, and is a view illustrating the flow rate control characteristics according to this embodiment. Similar to FIG. 27, a two-dot chain line Ls illustrated in FIG. 54 represents a saturation temperature characteristic of a refrigerant in a second refrigerant passage 38. A broken line LA represents the above-described first flow rate control characteristic. A one-dot line LB represents the above-described second flow rate control characteristic. A solid line Lm represents a flow rate control characteristic of the valve mechanism 32.

According to this embodiment, the solid line Lm is illustrated by a curve which is different from that illustrated in FIG. 27. As described above, the internal pressure change in the first closed space 34a is more likely to be reflected in the operation of the spherical valve 321 of the valve mechanism 32 than the internal pressure change in the second closed space 35a. Therefore, the flow rate control characteristic of the valve mechanism 32 which is represented by the solid line Lm can be made closer to the first flow rate control characteristic represented by the broken line LA than the second flow rate control characteristic represented by the one-dot chain line LB.

In this manner, the flow rate control characteristic of the valve mechanism 32 can be determined in accordance with the first fluid and the second fluid. In addition, the flow rate control characteristic of the valve mechanism 32 can also be determined in accordance with the first expansion characteristic of the first power element 34 and the second expansion characteristic of the second power element 35.

This embodiment can also be combined with any one of the above-described ninth to sixteenth embodiments.

(Other Embodiments)

(1) In the above-described eighth to seventeenth embodiments, a first fluid includes a refrigerant which is the same type as a refrigerant flowing in a second refrigerant passage 38. However, instead of the refrigerant of the same type, the first fluid may include a refrigerant of different types.

(2) In the above-described twelfth embodiment, a power element 50 includes a first adsorbent 506 and a second adsorbent 508. However, the power element 50 may include only any one of the first adsorbent 506 and the second adsorbent 508, and may not include the other one.

(3) In FIG. 44 according to the above-described thirteenth embodiment, a first wall member 512 covers a first inner peripheral surface 501j and a first bottom surface 501k of a first narrowed portion 501f. However, in addition to this configuration or instead of this configuration, the first wall member 512 may cover a first outer peripheral surface 501p which provides an outer periphery of the first narrowed portion 501f. Similarly, a second wall member 514 may also cover a second outer peripheral surface 501q which provides an outer periphery of a second narrowed portion 501g.

Figure 55:
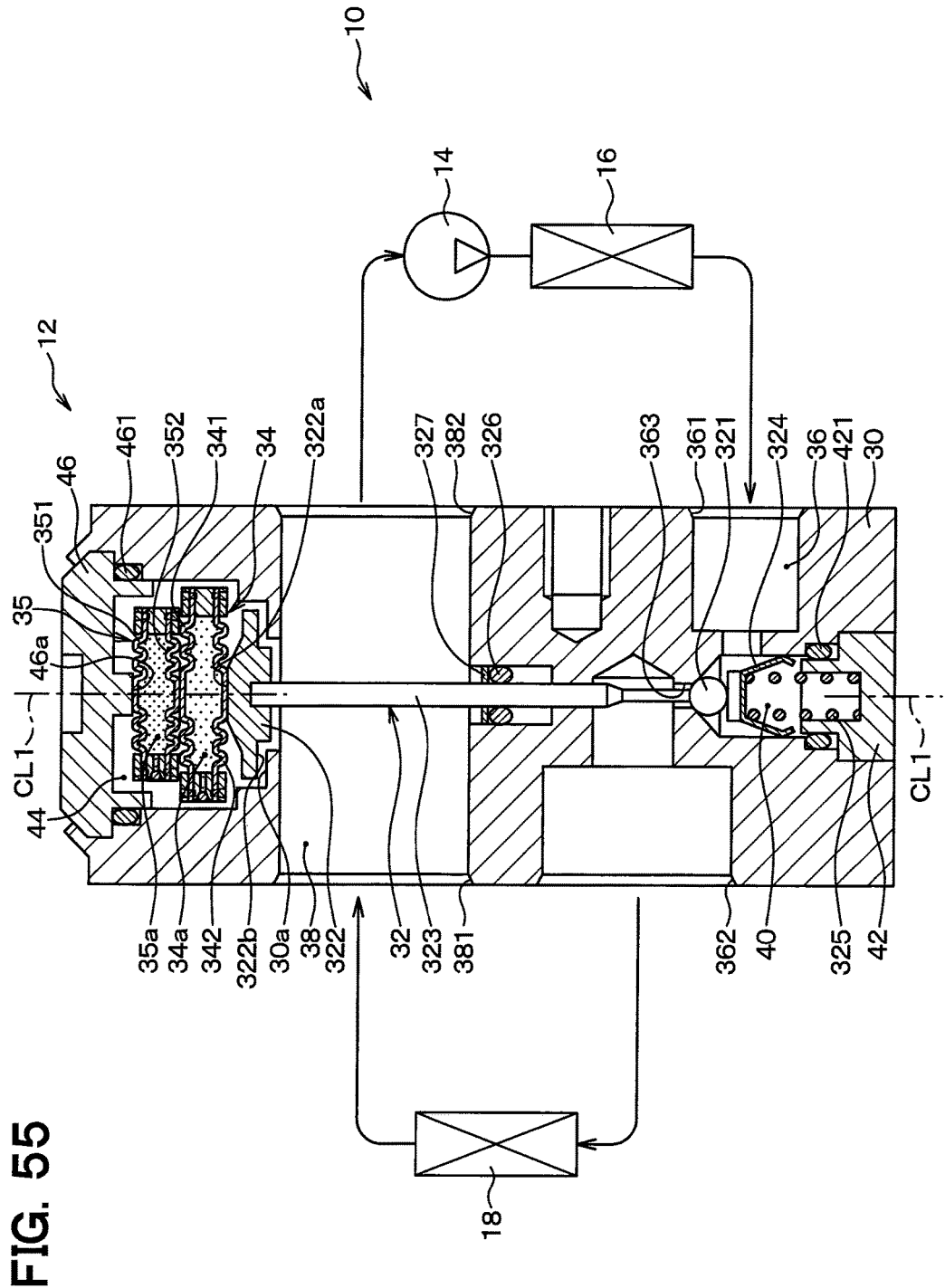
FIG. 55 is a cross-sectional view of the temperature type expansion valve 12 which illustrates a modification example according to the seventeenth embodiment.

(4) In FIG. 53 according to the above-described seventeenth embodiment, a first power element 34 is interposed between a contact surface 46a of a lid member 46 and a second power element 35 in a direction of a uniaxial center CL1. However, as illustrated in FIG. 55, the second power element 35 may be interposed between the contact surface 46a of the lid member 46 and the first power element 34.

(5) In the above-described seventeenth embodiment, a diameter of a second power element 35 is smaller than that of a first power element 34. However, conversely, the diameter of the second power element 35 may be larger than that of the first power element 34. According to this configuration, conversely to the seventeenth embodiment, an internal pressure change in a second closed space 35a is more likely to be reflected in an operation of a spherical valve 321 of a valve mechanism 32 than an internal pressure change in a first closed space 34a. Therefore, a flow rate control characteristic of the valve mechanism 32 which is represented by a solid line Lm in FIG. 54 can be made closer to a second flow rate control characteristic represented by a one-dot chain line LB than a first flow rate control characteristic represented by a broken line LA.

(6) In FIG. 53 according to the above-described seventeenth embodiment, both diameters of a first diaphragm 341 and a second diaphragm 342 are larger than those of a third diaphragm 351 and a fourth diaphragm 352. However, the diameters of the first diaphragm 341 and the second diaphragm 342 may be different from each other, and any one diameter of the first diaphragm 341 and the second diaphragm 342 may be larger than any one diameter or both diameters of the third diaphragm 351 and the fourth diaphragm 352.

(7) In the above-described seventeenth embodiment, both diameters of a first diaphragm 341 and a second diaphragm 342 are different from both diameters of a third diaphragm 351 and a fourth diaphragm 352. In contrast, any one plate thickness or both plate thicknesses of the first diaphragm 341 and the second diaphragm 342 may be different from any one plate thickness or both plate thicknesses of the third diaphragm 351 and the fourth diaphragm 352. In this manner, a first expansion characteristic of a first power element 34 and a second expansion characteristic of a second power element 35 may be different from each other.

(8) In the above-described ninth embodiment, a first fluid introduction path 481e and a second fluid introduction path 481f are provided in an interposing member 481. However, both of these may be provided in another member.

(9) In the above-described eighth to eleventh embodiments, respective circumferences of a first diaphragm 341 and a second diaphragm 342 are welded to interposing members 343, 481, 485, and 501, thereby ensuring air-tightness of power elements 34, 35, 48, and 50. In contrast, as long as the air-tightness is ensured for the power elements 34, 35, 48, and 50, the first diaphragm 341 and the second diaphragm 342 may be respectively welded to the interposing members 343, 481, 485, and 501 by using a method other than the welding.

(10) In the above-described eighth to eleventh embodiments, power elements 34, 35, 48, and 50 have an outer shape which is symmetrical with respect to a virtual plane FCx, but may not have the symmetrical outer shape.

(11) In the above-described eighth to seventeenth embodiments, an expansion valve 12 configures a part of a vapor compression type refrigeration cycle 10, but may be used for another application.

(12) In the above-described eighth embodiment, an expansion valve 12 has a configuration in which a first power element 34 and a second power element 35 expand in accordance with a refrigerant temperature in a second refrigerant passage 38. However, the expansion valve 12 may have a configuration in which the first power element 34 and the second power element 35 expand in accordance with temperatures other than the refrigerant temperature in the second refrigerant passage 38. This advantageous effect is similarly achieved by the ninth to seventeenth embodiments.

(13) In the above-described respective embodiments, a refrigerant which is a fluid the same as that in a first refrigerant passage 36 flows in a second refrigerant passage 38. However, a fluid which is different from that in the first refrigerant passage 36 may flow in the second refrigerant passage 38.

(14) In the above-described eighth embodiment, either a first fluid enclosed in a first power element 34 or a second fluid enclosed in a second power element 35 is a fluid mixture in which a refrigerant and inert gas are mixed with each other, but may be only a refrigerant. Furthermore, the first fluid and the second fluid are not particularly limited as long as the first fluid and the second fluid are fluids whose volume expands in accordance with temperature rising. This advantageous effect is similarly achieved by the ninth to seventeenth embodiments.

(15) In the above-described ninth to thirteenth and fifteenth embodiments, within two diaphragms included in an expansion valve 12, the diaphragm located on a lid member 46 side is referred to as a first diaphragm 341, and the diaphragm located on a stopper 322 side is referred to as a second diaphragm 342. However, conversely, the diaphragm located on the lid member 46 side may be referred to as the second diaphragm 342, and the diaphragm located on the stopper 322 side may be referred to as the first diaphragm 341.

(16) In the above-described ninth to thirteenth and fifteenth embodiments, a temperature type expansion valve 12 includes one of power elements 48 and 50. However, for example, as in the temperature type expansion valve 12 in FIG. 22, the temperature type expansion valve 12 may include multiple power elements 48 and 50 so as to be stacked in a direction of a uniaxial center CL1.

Figure 56:
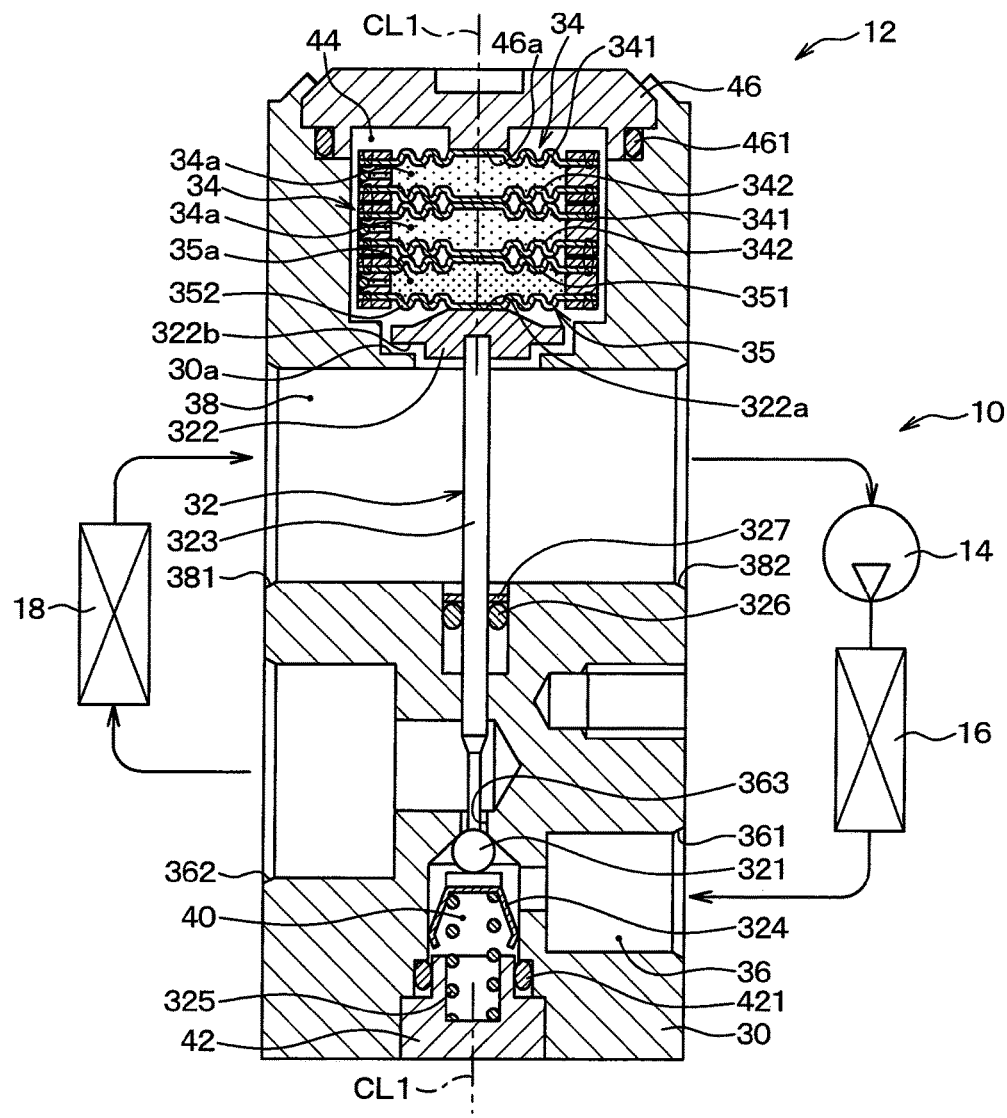
FIG. 56 is a cross-sectional view of the temperature type expansion valve 12 which illustrates a modification example according to the eighth embodiment.

(17) In the above-described eighth embodiment, a temperature type expansion valve 12 includes each one of a first power element 34 and a second power element 35 which are stacked in a direction of a uniaxial center CL1. However, as illustrated in FIG. 56, the temperature type expansion valve 12 may include one more first power element 34. That is, the temperature type expansion valve 12 may include two first power elements 34 which are stacked in the direction of the uniaxial center CL1 and one second power element 35. According to the configuration illustrated in FIG. 56, a volume change in a first fluid in accordance with a temperature change is more likely to be reflected in an operation of a spherical valve 321 of a valve mechanism 32 than a volume change in a second fluid. Therefore, similarly to the above-described seventeenth embodiment, a flow rate control characteristic of the valve mechanism 32 can be made closer to a first flow rate control characteristic than a second flow rate control characteristic.

(18) In the above-described fourteenth embodiment, a first power element 54 does not include a first diaphragm 341, and includes a second diaphragm 342. However, conversely, the first power element 54 may not include the second diaphragm 342, and may include the first diaphragm 341. In this case, a cover member 541 provides a first enclosing space 34a by being joined to the first diaphragm 341.

(19) In the above-described twelfth embodiment, an adsorption characteristic of a first adsorbent 506 is different from that of a second adsorbent 508, but may be the same as that of the second adsorbent 508.

(20) In the above-described eighth, fourteenth, and sixteenth embodiments, first power elements 34, 54, and 60 and second power elements 35, 56, and 62 have shapes which are the same as each other, but may have shapes which are different from each other.

What is claimed is:

1. An expansion valve comprising:
an expansion unit that has a first diaphragm and a second diaphragm stacked with the first diaphragm in an axial direction of a uniaxial center, a fluid enclosing space in which an enclosed fluid is sealed being defined between the first diaphragm and the second diaphragm, each of the first diaphragm and the second diaphragm outwardly expanding in the axial direction of the uniaxial center as a pressure inside the fluid enclosing space increases;
a first channel through which a flowing fluid flows, the first channel having a decompressing channel to decompress the flowing fluid; and
a flow rate control unit that controls a flow rate of the flowing fluid in the first channel in accordance with deformation of the first diaphragm and the second diaphragm in the axial direction of the uniaxial center, wherein
the expansion unit includes an interposing member interposed between the first diaphragm and the second diaphragm,
the interposing member is interposed between the first diaphragm and the second diaphragm to define the fluid enclosing space,
the interposing member has a fluid introduction path to introduce the enclosed fluid into the fluid enclosing space, and
the fluid introduction path is configured to be closed.

2. The expansion valve according to claim 1, wherein
the interposing member includes an annular contact surface in contact with a peripheral edge portion of the first diaphragm, and
the interposing member is joined to an outer side of the first diaphragm, the outer side of the first diaphragm being outward of an inner peripheral end of the contact surface in a radial direction of the uniaxial center.

3. The expansion valve according to claim 2, wherein
the expansion unit includes an annular collar disposed on a side of the first diaphragm opposite to the contact surface of the interposing member in the axial direction of the uniaxial center, and
the collar includes a collar contact surface in contact with the first diaphragm, the collar being joined to an outer side of the first diaphragm outward of an inner peripheral end of the collar contact surface in the radial direction of the uniaxial center.

4. The expansion valve according to claim 3, wherein
the collar includes a prohibiting portion that prohibits the first diaphragm from expanding to be deformed.

5. The expansion valve according to claim 4, wherein
the prohibiting portion extends radially inward from the collar and prohibits the deformation of the first diaphragm by coming into contact with the first diaphragm when the first diaphragm expands to be deformed.

6. The expansion valve according to claim 1, wherein
the expansion unit has an outer shape symmetrical with respect to a virtual plane that passes through a center of the expansion unit and that is orthogonal to the uniaxial center.

7. The expansion valve according to claim 1, further comprising a body unit that has the first channel defined therein, the body unit accommodating the flow rate control unit, wherein the expansion unit is accommodated inside the body unit.

8. The expansion valve according to claim 7, further comprising a resin-made lid member that isolates the expansion unit from an outer space, wherein the lid member is in contact with the expansion unit.

9. The expansion valve according to claim 8, further comprising a fixed surface that is not movable in the axial direction of the uniaxial center, wherein the flow rate control unit includes an operation member that increases or decreases a flow rate of the flowing fluid in the first channel by being displaced in the axial direction of the uniaxial center, and one of the first diaphragm and the second diaphragm is pressed against the fixed surface in the axial direction of the uniaxial center, and the other of the first diaphragm and the second diaphragm displaces the operation member in the axial direction of the uniaxial center.

10. The expansion valve according to claim 8, wherein the lid member includes a fixed surface that is not movable in the axial direction of the uniaxial center when the expansion unit is operated, the flow rate control unit includes an operation member that increases or decreases a flow rate of the flowing fluid in the first channel by being displaced in the axial direction of the uniaxial center, and one of the first diaphragm and the second diaphragm is pressed against the fixed surface in the axial direction of the uniaxial center, and the other of the first diaphragm and the second diaphragm displaces the operation member in the axial direction of the uniaxial center.

11. The expansion valve according to claim 1, wherein the interposing member includes an interposing portion interposed between the first diaphragm and the second diaphragm in the axial direction of the uniaxial center, a first pinching portion extending from the interposing portion and pinching the first diaphragm with the interposing portion, and a second pinching portion extending from the interposing portion and pinching the second diaphragm with the interposing portion.

12. The expansion valve according to claim 1, wherein a plurality of the expansion unit are stacked with each other in the axial direction of the uniaxial center.

13. An expansion valve comprising:

an expansion unit that has a first diaphragm and a second diaphragm stacked with the first diaphragm in an axial direction of a uniaxial center, a fluid enclosing space in which an enclosed fluid is sealed being defined between the first diaphragm and the second diaphragm, each of the first diaphragm and the second diaphragm outwardly expanding in the axial direction of the uniaxial center as a pressure inside the fluid enclosing space increases;

a first channel through which a flowing fluid flows, the first channel having a decompressing channel to decompress the flowing fluid; and a valve configured to open or close the first channel in accordance with deformation of the first diaphragm and the second diaphragm in the axial direction of the uniaxial center, thereby controlling a flow rate of the flowing fluid in the first channel, wherein the expansion unit includes an interposing member interposed between the first diaphragm and the second diaphragm, the interposing member is interposed between the first diaphragm and the second diaphragm to define the fluid enclosing space, the interposing member has a fluid introduction path to introduce the enclosed fluid into the fluid enclosing space, and the fluid introduction path is configured to be closed.

* * * * *